US012800799B2

(12) United States Patent
Gonta et al.

(10) Patent No.: US 12,800,799 B2
(45) Date of Patent: Nov. 17, 2026

(54) HIGH COLOR, HIGH HARDNESS OPTICAL FILM STRUCTURES AND COVER ARTICLES WITH CONSTANT HUE

(71) Applicant: CORNING INCORPORATED, Corning, NY (US)

(72) Inventors: Casey James Gonta, Painted Post, NY (US); Shandon Dee Hart, Elmira, NY (US); Karl William Koch, III, Elmira, NY (US); Carlo Anthony Kosik Williams, Painted Post, NY (US); Lin Lin, Painted Post, NY (US); Rui Luo, Fremont, CA (US)

(73) Assignee: CORNING INCORPORATED, Corning, NY (US)

( * ) Notice: Subject to any disclaimer, the term of this patent is extended or adjusted under 35 U.S.C. 154(b) by 343 days.

(21) Appl. No.: 18/616,640

(22) Filed: Mar. 26, 2024

(65) Prior Publication Data

US 2024/0329281 A1 Oct. 3, 2024

Related U.S. Application Data

(60) Provisional application No. 63/455,670, filed on Mar. 30, 2023.

(51) Int. Cl.

*G02B 1/14* (2015.01)
*G02B 5/28* (2006.01)

(52) U.S. Cl.

CPC ............... *G02B 1/14* (2015.01); *G02B 5/285* (2013.01)

(58) Field of Classification Search

None
See application file for complete search history.

(56) References Cited

U.S. PATENT DOCUMENTS 8,312,739 B2 11/2012 Lee et al.
8,561,429 B2 10/2013 Allan et al.
(Continued)

FOREIGN PATENT DOCUMENTS

WO 2015/076914 A1 5/2015
WO 2023/163913 A1 8/2023

OTHER PUBLICATIONS

Oliver et al., "An improved technique for determining hardness and elastic modulus using load and displacement sensing indentation experiments". J. Mater. Res., vol. 7, No. 6, 1992, pp. 1564-1583.
(Continued)

*Primary Examiner* — Jyotsna V Dabbi
(74) *Attorney, Agent, or Firm* — William J. Tucker

(57) ABSTRACT

A cover article is described herein that includes: a substrate comprising an outer and an inner primary surface, the outer and inner primary surfaces opposite of one another; and an optical film structure comprising an outermost surface disposed on the outer or inner primary surface of the substrate. The optical film structure comprises a plurality of alternating high refractive index and low refractive index layers. Each of the high index layers has a refractive index greater than a refractive index of each of the low index layers. Further, the cover article exhibits a substantially constant hue in reflectance with a D65 illuminant, as given by: (a) an exhibited color with a variation in Hue Angle (h*) of less than 60 degrees over a viewing angle range from 0 to 60 degrees; or (b) an exhibited grey hue or silver hue, each with a Chroma (c*) of less than 10.

17 Claims, 28 Drawing Sheets

(56) References Cited

U.S. PATENT DOCUMENTS

| | | | | |
|---|---|---|---|---|
| 9,703,011 | B2 | 7/2017 | Adib et al. | |
| 10,162,084 | B2 | 12/2018 | Hart et al. | |
| 2014/0113083 | A1 | 4/2014 | Lee et al. | |
| 2014/0376094 | A1 * | 12/2014 | Bellman | G02B 1/10 428/428 |
| 2015/0322270 | A1 | 11/2015 | Amin et al. | |
| 2020/0192002 | A1 | 6/2020 | Bellman et al. | |
| 2022/0317340 | A1 | 10/2022 | Amin et al. | |
| 2023/0324584 | A1 * | 10/2023 | Kobayashi | B29D 11/0073 428/141 |
| 2024/0230957 | A1 * | 7/2024 | Ding | G02C 7/108 |

OTHER PUBLICATIONS

Oliver et al., "Measurement of Hardness and Elastic Modulus by Instrument Indentation: Advances in Understanding and Refinements to Methodology". J. Mater. Res., vol. 19, No. 1, 2004, pp. 3-20.

Corning Inc., "Information Related to Coatings on Commercially Available Tablet Devices—Supplying data related to the Apple iPad Air 2 (released Oct. 2014), Apple iPad Pro 2nd Generation (released Jun. 2017), and Apple iPad Air 4th Generation (released Oct. 2020)" 28 pages. This document has not been published in a book, magazine, journal, etc.

International Search Report and Written Opinion of the International Searching Authority; PCT/US2024/021560; dated Jun. 21, 2024; 11 pages; European Patent Office.

* cited by examiner

HIGH COLOR, HIGH HARDNESS OPTICAL FILM STRUCTURES AND COVER ARTICLES WITH CONSTANT HUE

CLAIM OF PRIORITY

This application claims the benefit of priority under 35 U.S.C. § 119 of U.S. Provisional Application No. 63/455,670 filed Mar. 30, 2023. The entire contents of this application are hereby incorporated herein by reference for all purposes.

FIELD OF THE DISCLOSURE

The disclosure relates to durable and scratch resistant optical film structures and cover articles, and more particularly to optical film structures and cover articles exhibiting high hardness, particular colors or hues, high color saturation and low variation in color or hue over various viewing angles.

BACKGROUND

Cover articles are often used to protect critical devices within electronic products, to provide a user interface for input and/or display, and/or for many other functions. Such products include mobile devices, such as smart phones, mp3 players, smart watches, and computer tablets. Cover articles also include architectural articles, transportation articles (e.g., articles used in automotive applications, trains, aircraft, sea craft, etc.), appliance articles, or any article that requires some transparency, scratch-resistance, abrasion resistance, or a combination thereof. These applications often demand scratch-resistance (e.g., as manifested by high hardness) and strong optical performance characteristics, e.g., in terms of maximum light transmittance and minimum reflectance.

These cover articles, for example, can be used as protective covers for display devices (e.g., smart phone faces) and/or cover substrates for housings (e.g., a back cover of a smart phone face). In addition, some applications for these cover articles benefit from or otherwise require the appearance of color in reflectance and/or limited color in transmittance (e.g., a smart phone face with a red hue in reflectance). The need for these cover articles to exhibit certain colors or hues may be for function (e.g., to enhance digital display characters) and/or customer-desired aesthetics (e.g., a smart phone with a blue color as a fashion accent). There is also a need for such cover articles to exhibit a desired color or hue with high saturation and limited variability in color across various viewing angles.

SUMMARY

Generally, the disclosure is directed to optical film structures and cover articles that address the aforementioned needs and other needs in the prior art. The disclosed cover articles employ an optical film structure disposed on a substrate (e.g., a glass substrate, Corning® Gorilla Glass® products, a glass-ceramic substrate, etc.). These optical film structures and cover articles have high hardness and advantageous optical properties suitable for various applications, including smart phone and mobile phone displays and covers. The optical film structure of the cover article is a designed, multilayer film structure, and the cover articles of the disclosure reflect new system-level designs configured to exhibit particular colors or hues, with high saturation and limited color variability over a wide viewing angle range.

According to an aspect of the disclosure, a cover article is provided that includes: a substrate comprising an outer primary surface and an inner primary surface, the outer and inner primary surfaces are opposite of one another; and an optical film structure comprising an outermost surface disposed on the outer or inner primary surface of the substrate. The optical film structure comprises a plurality of alternating high refractive index and low refractive index layers. Each of the high refractive index layers has a refractive index greater than a refractive index of each of the low refractive index layers. Further, the cover article exhibits a substantially constant hue in reflectance with a D65 illuminant, as given by an exhibited color with a variation in Hue Angle ($h^*$) of less than 50 degrees over a viewing angle range from 0 to 60 degrees. This aspect can serve as a durable and/or scratch resistant cover article for electronic devices and, more particularly, a cover article exhibiting hardness, a particular color or hue, a high color saturation and a low variation in color or hue over various viewing angles.

According to an aspect of the disclosure, a cover article is provided that includes: a substrate comprising an outer primary surface and an inner primary surface, the outer and inner primary surfaces are opposite of one another; and an optical film structure comprising an outermost surface disposed on the outer or inner primary surface of the substrate. The optical film structure comprises a plurality of alternating high refractive index and low refractive index layers. Each of the high refractive index layers has a refractive index greater than a refractive index of each of the low refractive index layers. Further, the cover article exhibits a substantially neutral color in reflectance with a D65 illuminant, as given by an exhibited grey hue or silver hue, each with a Chroma ($c^*$) of less than 10. This aspect can serve as a durable and/or scratch resistant cover article for electronic devices and, more particularly, a cover article exhibiting hardness, a neutral color, a high neutral color saturation and a low variation in neutral color over various viewing angles.

According to another aspect of the disclosure, a cover article is provided that includes: a substrate comprising an outer primary surface and an inner primary surface, the outer and inner primary surfaces are opposite of one another; and an optical film structure comprising an outermost surface disposed on the outer or inner primary surface of the substrate. The optical film structure comprises a plurality of alternating high refractive index and low refractive index layers. Each of the high refractive index layers has a refractive index greater than a refractive index of each of the low refractive index layers. In addition, the optical film structure has a physical thickness that ranges from 1000 nm to 4000 nm. One of the high refractive index layers is a scratch resistant layer having a physical thickness from 500 nm to 3000 nm. One of the low refractive index layers is a capping layer disposed over the scratch resistant layer. A portion of the plurality of the plurality of alternating high refractive index and low refractive index layers is between the scratch resistant layer and the substrate. Further, the optical film structure exhibits a hardness of at least 12 GPa, as measured with a Berkovich Indenter Hardness Test from the outermost surface of the optical film structure to a depth from about 100 nm to about 300 nm. In addition, the cover article exhibits a substantially constant hue in reflectance with a D65 illuminant, as given by an exhibited color with a variation in Hue Angle ($h^*$) of less than 50 degrees over a viewing angle range from 0 to 60 degrees. This aspect can serve as a durable and/or scratch resistant cover article for electronic devices and, more particularly, a cover article exhibiting high hardness, a particular color or hue, a high color saturation and a low variation in color or huc over various viewing angles.

According to another aspect of the disclosure, a cover article is provided that includes: a substrate comprising an outer primary surface and an inner primary surface, the outer and inner primary surfaces are opposite of one another; and an optical film structure comprising an outermost surface disposed on the outer or inner primary surface of the substrate. The optical film structure comprises a plurality of alternating high refractive index and low refractive index layers. Each of the high refractive index layers has a refractive index greater than a refractive index of each of the low refractive index layers. In addition, the optical film structure has a physical thickness that ranges from 1000 nm to 4000 nm. One of the high refractive index layers is a scratch resistant layer having a physical thickness from 500 nm to 3000 nm. One of the low refractive index layers is a capping layer disposed over the scratch resistant layer. A portion of the plurality of alternating high refractive index and low refractive index layers is between the scratch resistant layer and the substrate. Further, the optical film structure exhibits a hardness of at least 12 GPa, as measured with a Berkovich Indenter Hardness Test from the outermost surface of the optical film structure to a depth from about 100 nm to about 300 nm. In addition, the cover article exhibits a substantially neutral color in reflectance with a D65 illuminant, as given by an exhibited grey hue or silver hue, each with a Chroma (c*) of less than 10. This aspect can serve as a durable and/or scratch resistant cover article for electronic devices and, more particularly, a cover article exhibiting high hardness, a neutral color, a high neutral color saturation and a low variation in neutral color over various viewing angles.

According to a further aspect of the disclosure, a cover article is provided that includes: a substrate comprising an outer primary surface and an inner primary surface, the outer and inner primary surfaces are opposite of one another; and an optical film structure comprising an outermost surface disposed on the outer or inner primary surface of the substrate. The optical film structure comprises a plurality of alternating high refractive index and low refractive index layers. Each of the high refractive index layers has a refractive index greater than a refractive index of each of the low refractive index layers. In addition, the optical film structure has a physical thickness that ranges from 250 nm to 1000 nm. Further, the optical film structure exhibits a hardness of at least 8 GPa, as measured with a Berkovich Indenter Hardness Test from the outermost surface of the optical film structure to a depth from about 100 nm to about 300 nm. In addition, the cover article exhibits a substantially constant hue in reflectance with a D65 illuminant, as given by an exhibited color with a variation in Huc Angle (h*) of less than 50 degrees over a viewing angle range from 0 to 60 degrees. This aspect can serve as a durable and/or scratch resistant cover article for electronic devices and, more particularly, a cover article exhibiting hardness, a particular color or hue, a high color saturation and a low variation in color or hue over various viewing angles.

According to a further aspect of the disclosure, a cover article is provided that includes: a substrate comprising an outer primary surface and an inner primary surface, the outer and inner primary surfaces are opposite of one another; and an optical film structure comprising an outermost surface disposed on the outer or inner primary surface of the substrate. The optical film structure comprises a plurality of alternating high refractive index and low refractive index layers. Each of the high refractive index layers has a refractive index greater than a refractive index of each of the low refractive index layers. In addition, the optical film structure has a physical thickness that ranges from 250 nm to 1000 nm. Further, the optical film structure exhibits a hardness of at least 8 GPa, as measured with a Berkovich Indenter Hardness Test from the outermost surface of the optical film structure to a depth from about 100 nm to about 300 nm. In addition, the cover article exhibits a substantially neutral color in reflectance with a D65 illuminant, as given by an exhibited grey hue or silver hue, each with a Chroma (c*) of less than 10. This aspect can serve as a durable and/or scratch resistant cover article for electronic devices and, more particularly, a cover article exhibiting hardness, a neutral color, a high neutral color saturation and a low variation in neutral color over various viewing angles.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
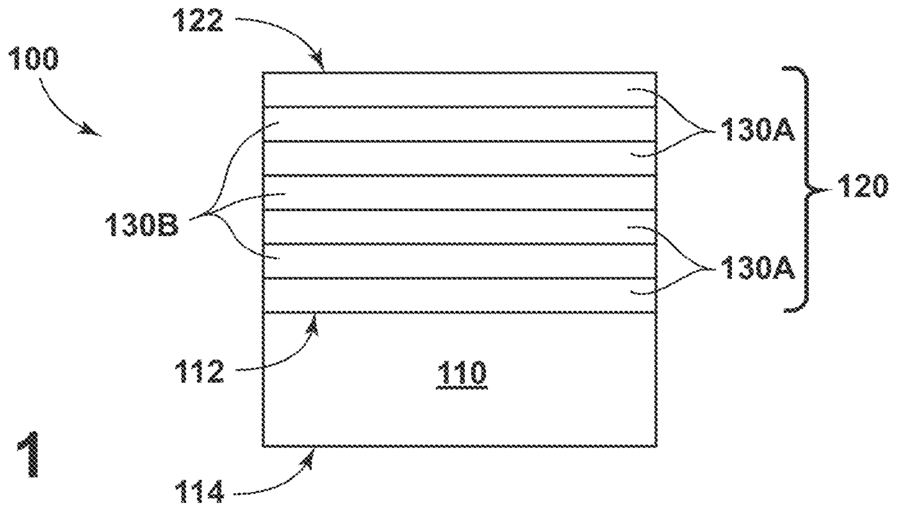
FIGS. 1, 1A, and 1B are cross-sectional side views of a cover article, according to one or more embodiments of the disclosure.

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example "up," "down," "right," "left," "front," "back," "top," "bottom"—are made only with reference to the figures as drawn and are not intended to imply absolute orientation.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used herein, the singular forms "a," "an" and "the" include plural referents unless the context clearly dictates otherwise. Thus, for example, reference to a "component" includes aspects having two or more such components, unless the context clearly indicates otherwise.

As used herein, the term "dispose" includes coating, depositing, and/or forming a material onto a surface using any known or to be developed method in the art. The disposed material may constitute a layer, as defined herein. As used herein, the phrase "disposed on" includes forming a material onto a surface such that the material is in direct contact with the surface and embodiments where the material is formed on a surface with one or more intervening material(s) disposed between the material and the surface. The intervening material(s) may constitute a layer, as defined herein.

As used herein, the terms "low RI layer" and "high RI layer" refer to the relative values of the refractive index ("RI") of layers of an optical film structure of a cover article according to the disclosure (i.e., low RI layer<high RI layer). Hence, low RI layers have refractive index values that are less than the refractive index values of high RI layers. Further, as used herein, "low RI layer" and "low index layer" are interchangeable with the same meaning. Likewise, "high RI layer" and "high index layer" are interchangeable with the same meaning.

As used herein, the term "strengthened substrate" refers to a substrate employed in a cover article of the disclosure that has been chemically strengthened, for example through ion-exchange of larger ions for smaller ions in the surface of the substrate. However, other strengthening methods known in the art, such as thermal tempering, or utilizing a mismatch of the coefficient of thermal expansion between portions of the substrate to create compressive stress and central tension regions, may be utilized to form strengthened substrates.

As used herein, the "Berkovich Indenter Hardness Test" and "Berkovich Hardness Test" are used interchangeably to refer to a test for measuring the hardness of a material on a surface thereof by indenting the surface with a diamond Berkovich indenter. The Berkovich Indenter Hardness Test includes indenting the outermost surface (e.g., an exposed surface) of an outer layered film of a cover article of the disclosure (e.g., the optical film structure 120 shown in FIGS. 1-1B and discussed in detail below) with the diamond Berkovich indenter to form an indent to an indentation depth in the range from about 50 nm to about 1000 nm (or the entire thickness of the optical film structure, whichever is less) and measuring the maximum hardness from this indentation along the entire indentation depth range or a segment of this indentation depth (e.g., in the range from about 100 nm to about 600 nm, from about 100 nm to about 500 nm, to a depth of 200 nm, etc.), generally using the methods set forth in Oliver, W. C.; Pharr, G. M. An improved technique for determining hardness and elastic modulus using load and displacement sensing indentation experiments. J. Mater. Res., Vol. 7, No. 6, 1992, 1564-1583; and Oliver, W. C.; Pharr, G. M. Measurement of Hardness and Elastic Modulus by Instrument Indentation: Advances in Understanding and Refinements to Methodology. J. Mater. Res., Vol. 19, No. 1, 2004, 3-20. As used herein, each of "hardness" and "maximum hardness" interchangeably refers to a maximum hardness as measured along a range of indentation depths, and not an average hardness.

Typically, in nanoindentation measurement methods (such as the Berkovich Indenter Hardness Test) of a coating or film that is harder than the underlying substrate, the measured hardness may appear to increase initially due to development of the plastic zone at shallow indentation depths and then increases and reaches a maximum value or plateau at deeper indentation depths. Thereafter, hardness begins to decrease at even deeper indentation depths due to the effect of the underlying substrate. Where a substrate having an increased hardness compared to the coating is utilized, the same effect can be seen; however, the hardness increases at deeper indentation depths due to the effect of the underlying substrate. The indentation depth range and the hardness values at certain indentation depth range(s) can be selected to identify a particular hardness response of the optical film structures and layers thereof, described herein, without the effect of the underlying substrate.

When measuring hardness of the outer layered film of the cover articles of the disclosure according to the Berkovich Indenter Hardness Test, the region of permanent deformation (plastic zone) of a material is associated with the hardness of the material. During indentation, an elastic stress field extends well beyond this region of permanent deformation. As indentation depth increases, the apparent hardness and modulus are influenced by stress field interactions with the underlying substrate. The substrate influence on hardness occurs at deeper indentation depths (i.e., typically at depths greater than about 10% of the optical film structure or layer thickness). Moreover, a further complication is that the hardness response requires a certain minimum load to develop full plasticity during the indentation process. Prior to that certain minimum load, the hardness shows a generally increasing trend.

At shallow indentation depths (which also may be characterized as small loads) (e.g., up to about 50 nm), the apparent hardness of a material appears to increase dramatically versus indentation depth. This shallow indentation depth regime does not represent a true metric of hardness, but instead reflects the development of the aforementioned plastic zone, which is related to the finite radius of curvature of the indenter. At intermediate indentation depths, the apparent hardness approaches maximum levels. At deeper indentation depths, the influence of the substrate becomes more pronounced as the indentation depths increase. Hardness may begin to drop dramatically once the indentation depth exceeds about 30% of the outer layered film of the cover articles of the disclosure (e.g., the optical film structure 120 shown in FIGS. 1-1B and discussed in detailed below).

As used herein, the term "transmittance" is defined as the percentage of incident optical power within a given wavelength range transmitted through a material (e.g., the cover article, the substrate, the outer layered film, or portions thereof). The term "reflectance" is similarly defined as the percentage of incident optical power within a given wavelength range that is reflected from a material (e.g., the cover article, the substrate, or the outer layered film, or portions thereof). Transmittance and reflectance are measured using a specific linewidth. As used herein, an "average transmittance" refers to the average amount of incident optical power transmitted through a material over a defined wavelength regime. As used herein, an “average reflectance” refers to the average amount of incident optical power reflected by the material.

In addition, “average reflectance” can be determined over the visible spectrum, infrared spectrum, or over other wavelength ranges, according to measurement principles understood by those skilled in the field of the disclosure. Unless otherwise noted, all reflectance values reported or otherwise referenced in this disclosure are associated with testing through the outer layered film of the cover articles and off of the primary surface of the substrate on which the outer layered film is disposed, e.g., a “first-surface” average reflectance over a specified range of wavelengths, a “first-surface” reflectance at a particular wavelength, etc.

In addition, “average transmittance” can be determined over the visible spectrum, infrared spectrum or other wavelength ranges, according to measurement principles understood by those skilled in the field of the disclosure. Unless otherwise noted, all transmittance values reported or otherwise referenced in this disclosure are associated with testing through both primary surfaces of the substrate and the outer layered film of the cover articles, e.g., a “two-surface” average transmittance over a specified range of wavelengths, a “two-surface” transmittance at a particular wavelength, etc.

As used herein, “reflected color” and “transmitted color” refers to the color reflected or transmitted through the cover articles of the disclosure with regard to color in the CIE L*,a*,b* colorimetry system under a D65 illuminant. More specifically, the “reflected color” or “transmitted color” can be given by V (a*2+b*2) or as a*, b* coordinates, as these color coordinates are measured through reflectance or transmittance of a D65 illuminant through the primary surfaces of the substrate of the cover article over an incident angle range, e.g., from 0 degrees to 10 degrees, from 0 degrees to 45 degrees, from 0 degrees to 90 degrees, etc.

Figure 2:
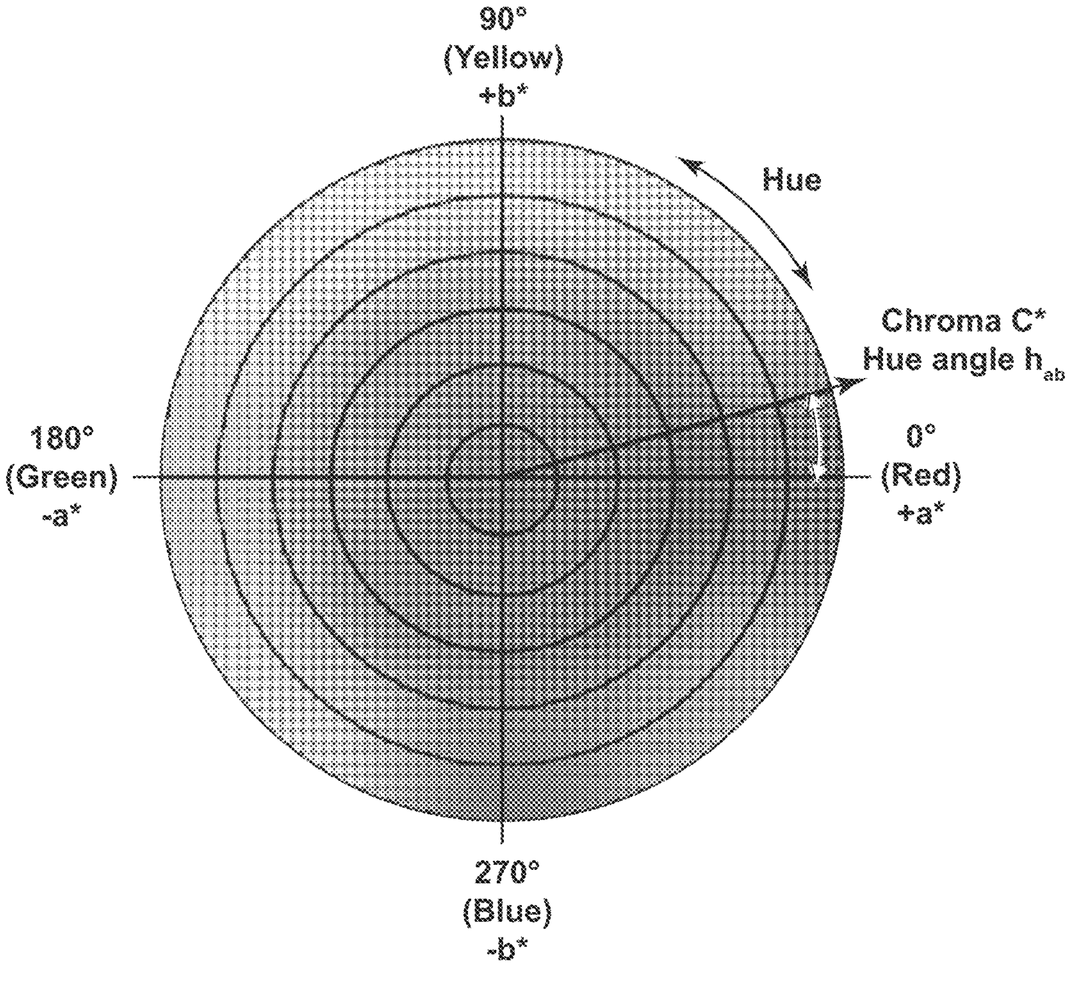
FIG. 2 is a schematic that illustrates the expression of color through Hue angle (h*) and Chroma (c*) in the 1964 CIE (L*, c*, and h*) color space.

As used herein, in a cylindrical 1964 CIE (L*, C*, h*) color space, “Chroma (c*)” is the magnitude of the distance from the origin (c*$_{(ab)}$)); “Hue Angle (h*)” is the angle from 0° to 360° (h*$_{(ab)}$); and color saturation is defined as s*($_{(ab)}$=(c*($_{(ab)}$)/L* (scc FIG. 2). It should be understood that the Hue Angle (h*) shown in FIG. 2 should not be confused with viewing angles (e.g., from 0° to) 90°, which are indicative of the angle between a viewer and a particular cover article (or product employing such a cover article). Further, as is also evident from FIG. 2, and as used herein, the “variation in Hue Angle (h*)” over a given viewing angle range (e.g., 0° to) 90° is used to quantify the constancy of an exhibited color of the cover articles of the disclosure. Accordingly, a small variation in the Hue Angle over a given viewing angle range (e.g., 0° to 30°, 0° to 60°, 0° to 90°, etc.) is indicative of a cover article with high color constancy. In addition, high Chroma (c*) values are indicative of a high degree of color saturation by cover articles of the disclosure. As is also evident from FIG. 2, a Hue angle (h*) of approximately 90° corresponds to a yellow color, a Hue angle (h*) of about 0° corresponds to a red color, a Hue angle (h*) of about 270° corresponds to a blue color, and a Hue angle (h*) of about 180° corresponds to a green color for the cover articles of the disclosure having a Chroma (c*) value of ≥10. Cover articles with Hue angles between the foregoing values can exhibit other colors, e.g., a cover article with a Hue angle (h*)>270 and <360° can exhibit a purple color (see FIG. 2). Further, cover articles with low Chroma (c*) values<10 exhibit a grey or silver hue, independent of Hue angle (h*).

Aspects of the disclosure are directed to cover articles that employ an optical film structure disposed on a substrate (e.g., a glass substrate, Corning® Gorilla Glass® products, a glass-ceramic substrate, etc.). These cover articles, and their optical film structures, have high hardness and advantageous optical properties suitable for various applications, including smart phone and mobile phone displays and covers. The optical film structures of the cover articles are indicative of a designed, multilayer film structure, and the cover articles of the disclosure reflect new system-level designs configured to exhibit particular colors or hues, with high saturation and low color variability over a wide viewing angle range.

The cover articles and optical film structures of the disclosure can be employed in a variety of applications, including as protective covers for display devices (e.g., smart phone faces) and/or cover substrates for housings (e.g., a back cover of a smart phone face). In addition, some applications for these cover articles benefit from or otherwise require the appearance of color in reflectance and/or no to limited color in transmittance (e.g., a smart phone face with a red hue in reflectance). The need for these cover articles to exhibit certain colors or hues may be for function (e.g., to enhance digital display characters) and/or customer-desired aesthetics (e.g., a smart phone with a blue color as a fashion accent). It is also desirable for such cover articles to exhibit a desired color or hue with high saturation and limited variability in color across various viewing angles. In some configurations, ink can be applied to the backside of these cover articles to provide enhanced color reflectance or even a gradient of ink color for different decorative color reflection effects. Conversely, for certain applications with no ink where transmission is desired, the cover articles of the disclosure can exhibit little to no color which can be attractive for dead front applications (e.g., as a cover article for a smart phone display; see also the exemplary electronic device of FIG. 2C and corresponding description below). In contrast, conventional cover articles in the field of this disclosure have exhibited beneficial hardness levels and desired optical properties, but they have suffered from high variability in exhibited color and/or hue as a function of viewing angle, low color saturation and/or limited flexibility in terms of exhibiting a desired color or hue across viewing angle ranges.

In some implementations, cover articles of the disclosure employ optical film structures having a physical thickness from 1000 to 4000 nm (or 2500 to 4000 nm) can be classified according to five categories in the 1964 CIE (L*, c*, and h*) color space: A) pink or red with a Hue Angle (h*) of 320° to 40°; B) yellow with a Hue Angle (h*) of 40° to 135°; C) green with a Hue Angle (h*) of 135° to 200°; D) blue or purple with a Hue Angle (h*) of 200° to 320°; and E) silver or grey with a Hue Angle (h*) of any angle and a Chroma (c*)<10. According to other implementations, cover articles of the disclosure employ optical film structures having a physical thickness from 250 to 1000 nm (or 400 to 700 nm) and exhibit colors and hues according to the foregoing Categories A)-E).

Figure 1A:
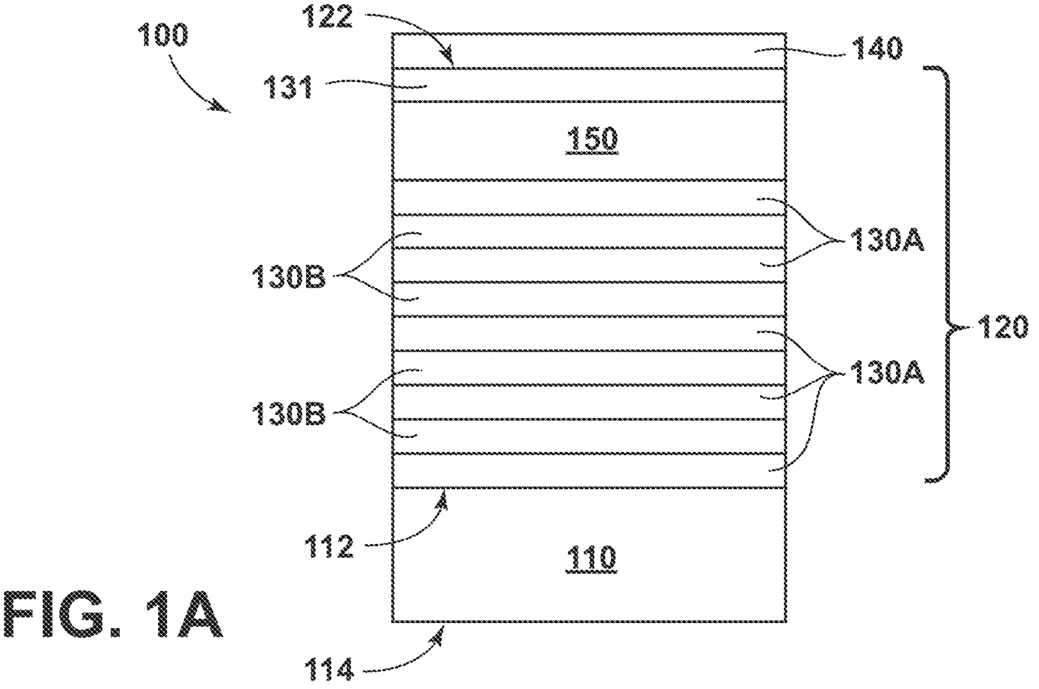
Figure 1B:
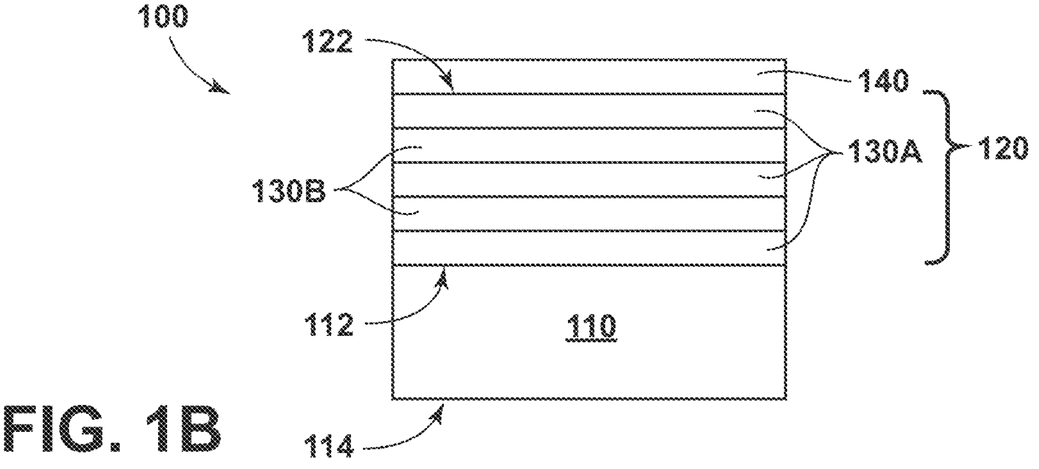

Reference will now be made in detail to various embodiments of cover articles, examples of which are illustrated in the accompanying drawings. Referring to FIGS. 1-1B, a cover article 100, according to one or more embodiments disclosed herein, may include a substrate 110, and an optical film structure 120 disposed on the substrate 110. The substrate 110 may include opposing primary surfaces 112, 114. The optical film structure 120 is shown in FIGS. 1-1B as being disposed on an outer primary surface 112; however, the optical film structure 120 may be disposed on the inner primary surface 114 of the substrate 110, in addition to or instead of being disposed on the outer primary surface 112. The optical film structure 120 forms an outermost surface 122. Further, the optical film structure 120 can include a scratch-resistant layer 150 (as shown in FIG. 1A). In some implementations, the outermost surface 122 of the optical film structure 120 forms an air-interface and generally defines the edge of optical film structure 120 as well as the edge of the overall cover article 100 (e.g., as shown in FIG. 1). In other implementations, an additional coating 140 is disposed on the outermost surface 122 of the optical film structure 120 (e.g., as shown in FIGS. 1A and 1B). According to some embodiments, the substrate 110 may be substantially transparent, as described herein.

The optical film structure 120 includes at least one layer of at least one material. The term "layer" may include a single layer or may include one or more sub-layers. Such sub-layers may be in direct contact with one another. The sub-layers may be formed from the same material or two or more different materials. In one or more alternative embodiments, such sub-layers may have intervening layers of different materials disposed therebetween. In one or more embodiments, a layer may include one or more contiguous and uninterrupted layers and/or one or more discontinuous and interrupted layers (i.e., a layer having different materials formed adjacent to one another). A layer or sub-layers may be formed by any known method in the art, including discrete deposition or continuous deposition processes. In one or more embodiments, the layer may be formed using only continuous deposition processes, or, alternatively, only discrete deposition processes.

The physical thickness of the optical film structure 120, as depicted in FIGS. 1-1B, may be about 0.25 μm (250 nm) or greater. In some examples, the physical thickness of the optical film structure 120 may be in the range from about 0.25 μm to about 10 μm, from about 0.25 μm to about 7.5 μm, from about 0.25 μm to about 5 μm, from about 0.5 μm to about 5 μm, from about 0.5 μm to about 4 μm, and all thickness values of the optical film structure 120 between these thickness values. In some implementations, the physical thickness of the optical film structure 120 can be 250 nm to 1000 nm, 300 nm to 900 nm, 400 nm to 700 nm, and all thickness values and ranges of thickness values between the foregoing ranges. In other implementations, the physical thickness of the optical film structure 120 can be 1000 nm to 5000 nm, 1000 nm to 4000 nm, 1500 nm to 3500 nm, 2000 nm to 4000 nm, 2500 nm to 4000 nm, and all thickness values and ranges of thickness values between the foregoing ranges. For example, the physical thickness of the optical film structure 120 can be about 0.25 μm, 0.3 μm, 0.4 μm, 0.5 μm, 0.6 μm, 0.7 μm, 0.8 μm, 0.9 μm, 1 μm, 1.25 μm, 1.5 μm, 1.75 μm, 2 μm, 3 μm, 4 μm, 5 μm, 6 μm, 7 μm, 8 μm, 9μ, 10 μm, and all thickness values between these thicknesses.

As also shown in FIGS. 1-1B, the optical film structure 120 includes a plurality of alternating layers (130A, 130B). In one or more embodiments, the optical film structure 120 may include a period comprising two or more layers. In one or more embodiments, the two or more layers may be characterized as having different refractive indices from each another. In one embodiment, the period includes a first low RI layer 130A and a second high RI layer 130B. The difference in the refractive index of the first low RI layer 130A and the second high RI layer 130B may be about 0.01 or greater, about 0.05 or greater, about 0.1 or greater, or even about 0.2 or greater.

As shown in FIGS. 1 and 1A, the optical film structure 120 may include alternating low and high refractive index layers 130A and 130B constituting a plurality of periods. A single period may include a low RI layer 130A and a high RI layer 130B, such that when a plurality of periods are provided, the first low RI layer 130A (designated for illustration as "L") and the second high RI layer 130B (designated for illustration as "H") alternate in the following sequence of layers: L/H/L/H or H/L/H/L, such that the low RI layer 130A and the high RI layer 130B appear to alternate along the physical thickness of the optical film structure 120. In the example depicted in FIG. 1, the optical film structure 120 includes three (3) periods, each of which includes a low RI layer 130A and a high RI layer 130B, along with an additional low RI layer 130A (i.e., an outermost low RI layer 130A). In the example depicted in FIG. 1A, the optical film structure 120 includes four (4) periods, each of which includes a low RI layer 130A and a high RI layer 130B, along with an additional low RI layer 130A, a scratch resistant layer 150 and a capping layer 131. In the example depicted in FIG. 1B, the optical film structure 120 includes two (2) periods, each of which includes a low RI layer 130A and a high RI layer 130B, along with an additional low RI layer 130A (i.e., an outermost low RI layer 130A).

In some embodiments, the optical film structure 120 may include up to twenty-five (25) periods. For example, the optical film structure 120, as depicted in FIGS. 1-1B, may include from about 2 to about 25 periods, from about 2 to about 20 periods, from about 2 to about 15 periods, from about 2 to about 10 periods, or any other number of periods within these ranges. For example, the optical film structure 120 may include 2, 3, 4, 5, 6, 7, 8, 9, 10, 11, 12, 13, 14, 15, 16, 17, 18, 19, 20, 21, 22, 23, 24, or 25 periods of alternating low and high RI layers 130A, 130B.

In the embodiments shown in FIG. 1A, the optical film structure 120 may include an additional capping layer 131, which may include a lower refractive index material than the high RI layer 130B. In some embodiments, one of the low refractive index layers 130A of the optical film structure 120 is designated as a capping layer (e.g., as shown in FIGS. 1 and 1B).

As used herein, the terms "low RI" and "high RI" refer to the relative values for the refractive index of the layers 130A and 130B relative to one another (e.g., low RI<high RI). In one or more embodiments, the term "low RI" when used with the low RI layers 130A, includes a range from about 1.3 to about 1.7 or 1.75. In one or more embodiments, the term "high RI" when used with the high RI layers 130B, includes a range from about 1.7 to about 2.6 (e.g., about 1.85 or greater).

Materials suitable for use in the optical film structure 120 include: $SiO_2$, $Al_2O_3$, $GeO_2$, SiO, $AlO_xN_y$, AlN, $SiN_x$, $SiO_xN_y$, $Si_uAl_vO_xN_y$, $Ta_2O_5$, $Nb_2O_5$, $TiO_2$, $ZrO_2$, TiN, MgO, $MgF_2$, $BaF_2$, $CaF_2$, $SnO_2$, $HfO_2$, $Y_2O_3$, $MoO_3$, $DyF_3$, $YbF_3$, $YF_3$, $CeF_3$, polymers, fluoropolymers, plasma-polymerized polymers, siloxane polymers, silsesquioxanes, polyimides, fluorinated polyimides, polyetherimide, polyethersulfone, polyphenylsulfone, polycarbonate, polyethylene terephthalate, polyethylene naphthalate, acrylic polymers, urethane polymers, polymethylmethacrylate, other materials cited below as suitable for use in a scratch resistant layer, and other materials known in the art. Some examples of suitable materials for use in the low RI layers 130A include $SiO_2$, $Al_2O_3$, $GeO_2$, SiO, $AlO_xN_y$, $SiO_xN_y$, $Si_uAl_vO_xN_y$, MgO, $MgAl_2O_4$, $MgF_2$, $BaF_2$, $CaF_2$, $DyF_3$, $YbF_3$, $YF_3$, and $CeF_3$. The nitrogen content of the materials for use in the first low RI layer may be minimized (e.g., in materials such as $Al_2O_3$ and $MgAl_2O_4$). Some examples of suitable materials for use in the high RI layers 130B include $Si_uAl_vO_xN_y$, $Ta_2O_5$, $Nb_2O_5$, AlN, $Si_3N_4$, $AlO_xN_y$, $SiO_xN_y$, $SiN_x$, $SiN_x$:$H_y$, $HfO_2$, $TiO_2$, $ZrO_2$, $Y_2O_3$, $Al_2O_3$, $MoO_3$ and diamond-like carbon.

In examples, the high RI layer 130B may also be a high hardness layer or a scratch resistant layer (e.g., scratch resistant layer 150 as shown in FIG. 1A), and the high RI materials listed above may also comprise high hardness or scratch resistance. In some implementations, the oxygen content of the materials for the high RI layer 130B and/or the scratch resistant layer 150 may be minimized, especially in $SiN_x$ or $AlN_x$ materials. In other implementations, each of the high RI layer 130B and/or the scratch resistant layer 150 comprises $SiN_x$ or $SiO_xN_y$. In some embodiments, $AlO_xN_y$ materials may be considered to be oxygen-doped $AlN_x$. That is, these oxygen-doped $AlN_x$ materials may have an $AlN_x$ crystal structure (e.g., wurtzite) and need not have an AlON crystal structure.

The hardness of the high RI layers 130B and/or the scratch resistant layer 150 may be characterized specifically. In some embodiments, the maximum hardness of the high RI layers 130B and/or a scratch resistant layer 150, as measured by the Berkovich Indenter Hardness Test at an indentation depth of about 100 nm or greater, may be about 8 GPa or greater, about 10 GPa or greater, about 12 GPa or greater, about 15 GPa or greater, about 18 GPa or greater, or about 20 GPa or greater. In some cases, the high RI layer 130B material may be deposited as a single layer and may be characterized as a scratch resistant layer (e.g., scratch resistant layer 150), and this single layer may have a thickness between about 200 nm and 10000 nm for repeatable hardness determination. In other embodiments in which the high RI layer 130B is deposited as a single layer (e.g., as a scratch-resistant layer 150, as depicted in FIG. 1A), this layer may have a physical thickness from about 200 nm to about 10000 nm, from about 200 nm to about 5000 nm, from about 500 nm to about 5000 nm, from about 1000 nm to about 4000 nm, from about 1500 nm to about 4000 nm, from about 1500 nm to about 3000 nm, and all thickness values between these thicknesses.

In one or more embodiments, one or more of the low RI layers 130A and high RI layers 130B of the optical film structure 120 may include a specific physical thickness range. These layer(s) 130A and/or 130B of the optical film structure 120 may include a physical thickness in the range from about 1 nm to about 400 nm, from about 5 nm to about 300 nm, from about 5 nm to about 200 nm, from about 10 nm to about 200 nm, or from about 10 nm to about 250 nm. In some embodiments, all or a majority of the layers in the optical film structure 120 may each have a physical thickness in the range from about 1 nm to about 400 nm, from about 5 nm to about 300 nm, from about 5 nm to about 200 nm, from about 10 nm to about 200 nm, or from about 10 nm to about 250 nm. In some embodiments, the outermost high refractive index layer 130B of the cover article 100 has a physical thickness of greater than 150 nm, greater than 200 nm or even greater than 225 nm. In other implementations of the cover article 100, greater than 50%, greater than 55% or even greater than 60%, of the outermost physical thickness of the optical film structure 120 comprises high refractive index material, i.e., the material of high RI layers 130B. In further implementations, the outermost high RI layer 130B has a physical thickness that exceeds the physical thickness of the outermost low RI layer 130A or capping layer 131, which can enhance hardness values of the optical film structure 120 and its cover article 100.

In some embodiments, as shown in exemplary form in FIGS. 1A and 1B, an additional coating 140 may be disposed on top of the outermost low RI layer 130A or capping layer 131. This additional coating 140 may include a low-friction coating, an olcophobic coating, or an easy-to-clean (ETC) coating. In some embodiments, the outermost low RI layer 130A and/or capping layer 131 exhibits a very low thickness (e.g., about 10 nm or less, about 5 nm or less, or about 2 nm or less), which has a minimal influence on the optical performance when added to a substantially thicker outermost high RI layer 130B or scratch resistant layer 150 (e.g., as shown in exemplary form in FIGS. 1A and 1B). The low RI layer 130A having a very low thickness may include $SiO_2$, an oleophobic or low-friction layer, or a combination of $SiO_2$ and an oleophobic material. Exemplary low-friction layers may include diamond-like carbon. Such materials (or one or more layers of the optical film structure 120) may exhibit a coefficient of friction less than 0.4, less than 0.3, less than 0.2, or even less than 0.1.

In one or more embodiments, the combined physical thickness of the high RI layer(s) 130B may be characterized. The combined thickness is the calculated combination of the thicknesses of the individual high RI layer(s) 130B in the optical film structure 120, even when there are intervening low RI layer(s) 130A or other layer(s). In some embodiments, the combined physical thickness of the high RI layer(s) 130B, which may also comprise a high-hardness material (e.g., a nitride or an oxynitride material), may be greater than 30% of the total physical thickness of the optical film structure 120. For example, the combined physical thickness of the high RI layer(s) 130B may be about 25% or greater, 30% or greater, 35% or greater, 40% or greater, about 50% or greater, or even about 60% or greater, of the total physical thickness of the optical film structure 120.

As noted earlier, the cover article 100 may include one or more additional coatings 140 disposed on the optical film structure 120, as shown in exemplary form in FIGS. 1A and 1B. In one or more embodiments, the additional coating 140 may include an easy-to-clean (ETC) coating. An example of a suitable ETC coating is described in U.S. patent application Ser. No. 13/690,904, entitled "Process for Making of Glass Articles with Optical and Easy-to-Clean Coatings," filed on Nov. 30, 2012, and published as U.S. Patent Application Publication No. 2014/0113083 on Apr. 24, 2014, and the salient portions of this application are incorporated by reference herein in their entirety. The easy-to-clean coating may have a thickness in the range from about 5 nm to about 50 nm and may include known materials such as fluorinated silanes. The easy-to-clean coating may alternately or additionally comprise a low-friction coating or surface treatment. Exemplary low-friction coating materials may include diamond-like carbon, silanes (e.g., fluorosilanes), phosphonates, alkenes, and alkynes. In some embodiments, the easy-to-clean coating may have a thickness in the range from about 1 nm to about 40 nm, from about 1 nm to about 30 nm, from about 1 nm to about 25 nm, from about 1 nm to about 20 nm, from about 1 nm to about 15 nm, from about 1 nm to about 10 nm, from about 5 nm to about 50 nm, from about 10 nm to about 50 nm, from about 15 nm to about 50 nm, from about 7 nm to about 20 nm, from about 7 nm to about 15 nm, from about 7 nm to about 12 nm or from about 7 nm to about 10 nm, and all ranges and sub-ranges therebetween.

In other embodiments, the additional coating 140 can include a scratch resistant layer or layers (e.g., with a composition similar to scratch resistant layer 150). In some embodiments, the additional coating includes a combination of easy-to-clean material and scratch resistant material. In one example, the combination includes an easy-to-clean material and diamond-like carbon. Such additional coatings may have a thickness in the range from about 5 nm to about 20 nm. The constituents of the additional coating may be provided in separate layers. For example, the diamond-like carbon may be disposed as a first layer and the easy-to-clean material can be disposed as a second layer on the first layer of diamond-like carbon. The thicknesses of the first layer and the second layer may be in the ranges provided above for the additional coating. For example, the first layer of diamond-like carbon may have a thickness of about 1 nm to about 20 nm or from about 4 nm to about 15 nm (or more specifically about 10 nm) and the second layer of easy-to-clean material may have a thickness of about 1 nm to about 10 nm (or more specifically about 6 nm). The diamond-like coating may include tetrahedral amorphous carbon (Ta—C), Ta—C: H, and/or a-C—H.

As mentioned herein, the optical film structure 120 of the cover article 100 depicted in FIG. 1A includes a scratch resistant layer 150, which may be disposed within the optical film structure 120 (as shown in FIG. 1A), directly on the substrate 110 (not shown) or at the outermost surface 122 of the optical film structure 120 (not shown). In some embodiments, the scratch resistant layer 150 can be disposed between the layers of the optical film structure 120 such that portions of the optical film structure 120 are above the scratch resistant layer 150 (e.g., an antireflective region) and another portion of the optical film structure 120 is below the layer 150 and above the substrate 110. In other embodiments (e.g., as shown in FIG. 1A), a portion of the plurality of low RI and high RI layers 130A, 130B of the optical film structure 120 is between the scratch resistant layer 150 and the substrate 110 and the remaining portion of the optical film structure 120, a capping layer 131, is disposed over the scratch resistant layer 150. In some embodiments, the portion of the optical film structure 120 below the layer 150 serves as an optical interference layer or region, which can function to bridge the difference in refractive indices of the substrate 110 and the scratch resistant layer 150 and comprises alternating high and low refractive index layers 130B, 130A. The two sections of the optical film structure 120 (i.e., an optical interference region disposed between the scratch resistant layer 150 and the substrate 110, and the antireflective region disposed on the scratch resistant layer 150) may have a different thickness from one another or may have essentially the same thickness as one another. The layers of the two sections of the optical film structure 120 may be the same in composition, order, thickness and/or arrangement as one another or may differ from one another. In addition, the layers of the two sections of the optical film structure 120 may comprise the same number of periods or the number of periods in each of these sections may differ from one another.

Exemplary materials used in the scratch resistant layer 150 (or the scratch resistant layer used as an additional coating, as noted earlier) may include an inorganic carbide, nitride, oxide, diamond-like material, or combination of these. Examples of suitable materials for the scratch resistant layer 150 include metal oxides, metal nitrides, metal oxynitride, metal carbides, metal oxycarbides, and/or combinations thereof. Exemplary metals include B, Al, Si, Ti, V, Cr, Y, Zr, Nb, Mo, Sn, Hf, Ta and W. Specific examples of materials that may be utilized in the scratch resistant layer 150 or coating may include $Al_2O_3$, AlN, $AlO_xN_y$, $Si_3N_4$, $SiN_x$, $SiO_xN_y$, $Si_uAl_vO_xN_y$, diamond, diamond-like carbon, $Si_xC_y$, $Si_xO_yC_z$, $ZrO_2$, $TiO_xN_y$ and combinations thereof. The scratch resistant layer 150 may also comprise nanocomposite materials, or materials with a controlled microstructure to improve hardness, toughness, or abrasion/wear resistance. For example, the scratch resistant layer 150 may comprise nanocrystallites in the size range from about 5 nm to about 30 nm. In embodiments, the scratch resistant layer 150 may comprise transformation-toughened zirconia, partially stabilized zirconia, or zirconia-toughened alumina. In embodiments, the scratch resistant layer 150 exhibits a fracture toughness value greater than about 1 MPa√m and simultaneously exhibits a hardness value greater than about 8 GPa.

The scratch resistant layer 150 may include a single layer (as shown in FIG. 1A), or multiple sub-layers or single layers that exhibit a refractive index gradient. Where multiple layers are used, such layers form a scratch resistant coating. For example, a scratch resistant layer 150 may include a compositional gradient of $Si_uAl_vO_xN_y$ where the concentration of any one or more of Si, Al, O, and N are varied to increase or decrease the refractive index. The refractive index gradient may also be formed using porosity. Such gradients are more fully described in U.S. patent application Ser. No. 14/262,224, entitled "Scratch-Resistant Articles with a Gradient Layer", filed on Apr. 25, 2014, and now issued as U.S. Pat. No. 9,703,011 on Jul. 11, 2017, the salient portions of which are hereby incorporated by reference in their entirety.

The scratch resistant layer 150 (e.g., as shown in FIG. 1A) may have a physical thickness from about 200 nm to about 5000 nm, according to some embodiments. In some implementations, the scratch resistant layer 150 has a physical thickness from about 100 nm to about 10000 nm, from about 200 nm to about 7500 nm, from about 200 nm to about 5000 nm, from about 200 nm to about 3000 nm, from about 500 nm to about 5000 nm, from about 500 nm to about 3000 nm, from about 500 nm to about 2500 nm, from about 1000 nm to about 4000 nm, from about 1500 nm to about 4000 nm, from about 1500 nm to about 3000 nm, from about 1750 nm to about 2250 nm, and all thickness values between these thicknesses. For example, the physical thickness of the scratch resistant layer 150 can be 100 nm, 150 nm, 200 nm, 300 nm, 400 nm, 500 nm, 600 nm, 700 nm, 800 nm, 900 nm, 1000 nm, 1100 nm, 1200 nm, 1300 nm, 1400 nm, 1500 nm, 1600 nm, 1700 nm, 1800 nm, 1900 nm, 2000 nm, 2100 nm, 2200 nm, 2300 nm, 2400 nm, 2500 nm, 2600 nm, 2700 nm, 2800 nm, 2900 nm, 3000 nm, 3500 nm, 4000 nm, 4500 nm, 5000 nm, 7500 nm, 10000 nm, and all thickness sub-ranges and thickness values between the foregoing thicknesses.

In one exemplary embodiment of the cover article 100 of the disclosure, as depicted in exemplary form in FIG. 1, the optical film structure 120 comprises an outermost surface 122 and is disposed on one of the primary surfaces 112, 114 of the substrate 110. The optical film structure 120 includes a plurality of alternating low and high RI layers 130A, 130B, e.g., from 2 to 15 periods. The optical film structure 120 can also include an outermost low RI layer 130A (as shown in FIG. 1). Further, each high RI layer 130B has a greater refractive index than each low RI layer 130A. Such cover articles 100 of the disclosure can exhibit a substantially constant hue in reflectance with a D65 illuminant, as given by: (a) an exhibited color with a variation in Hue Angle (h*) of less than 60° over a viewing angle range from 0° to 60°; or (b) an exhibited grey hue or silver hue, each with a Chroma (c*) of less than 10.

In another exemplary embodiment of the cover article 100 of the disclosure, as depicted in exemplary form in FIG. 1A, the optical film structure 120 comprises an outermost surface 122 and is disposed on one of the primary surfaces 112, 114 of the substrate 110. The optical film structure 120 includes a plurality of alternating low and high RI layers 130A, 130B, e.g., from 2 to 15 periods. Further, each high RI layer 130B has a greater refractive index than each low RI layer 130A. In addition, the optical film structure 120 can have a physical thickness that ranges from 1000 nm to 4000 nm, or 2500 nm to 4000 nm. In addition, one of the high RI layers in the optical film structure 120 is a scratch-resistant layer 150 having a physical thickness from 500 nm to 3000 nm. The optical film structure 120 can also include an outermost low RI layer 130A or capping layer 131 disposed on the scratch-resistant layer 150 (as shown in FIG. 1A), along with an optional additional coating 140. Further, in this configuration, a portion of the plurality of low and high RI layers 130A, 130B of the optical film structure 120 is disposed between the scratch-resistant layer 150 and the substrate 110. Such cover articles 100 of the disclosure can exhibit a substantially constant hue in reflectance with a D65 illuminant, as given by: (a) an exhibited color with a variation in Hue Angle (h*) of less than 60° over a viewing angle range from 0° to 60°; or (b) an exhibited grey hue or silver hue, each with a Chroma (c*) of less than 10. In addition, such cover articles 100 can exhibit a hardness of at least 12 GPa, as measured with a Berkovich Indenter Hardness Test from the outermost surface 122 of the optical film structure 120 to a depth from about 100 nm to about 300 nm.

In certain implementations of the cover article 100 depicted in FIG. 1A, the scratch resistant layer 150 is a nitride or an oxynitride and has a physical thickness from 1750 nm to 2250 nm, and the capping layer 131 is an oxide. In some embodiments, the capping layer 131 is in contact with scratch-resistant layer 150, serves as the outermost layer of the optical film structure 120, and has a physical thickness of from 20 nm to 250 nm. According to one embodiment, one of the low RI layers 130A of the optical film structure 120 is in contact with the outer or inner primary surface 112, 114 of the substrate 110, and the optical film structure 120 includes a total of 5 to 19 layers.

In an additional exemplary embodiment of the cover article 100 of the disclosure, as depicted in exemplary form in FIG. 1B, the optical film structure 120 comprises an outermost surface 122 and is disposed on one of the primary surfaces 112, 114 of the substrate 110. The optical film structure 120 includes a plurality of alternating low and high RI layers 130A, 130B, e.g., from 2 to 15 periods. The optical film structure 120 can also include an outermost low RI layer 130A (as shown in FIG. 1). Further, each high RI layer 130B has a greater refractive index than each low RI layer 130A. In addition, the optical film structure 120 can have a physical thickness that ranges from 250 nm to 1000 nm, or 400 nm to 700 nm. Such cover articles 100 of the disclosure can exhibit a substantially constant hue in reflectance with a D65 illuminant, as given by: (a) an exhibited color with a variation in Hue Angle (h*) of less than 60° over a viewing angle range from 0° to 60°; or (b) an exhibited grey hue or silver hue, each with a Chroma (c*) of less than 10. In addition, such cover articles 100 can exhibit a hardness of at least 8 GPa, as measured with a Berkovich Indenter Hardness Test from the outermost surface 122 of the optical film structure 120 to a depth from about 100 nm to about 300 nm.

In certain implementations of the cover article 100 depicted in FIG. 1B, each of the high RI layers 130B of the optical film structure 120 is a nitride or an oxynitride and each of the low RI layers 130A is an oxide. In some embodiments, one of the low RI layers 130A is in contact with the outer or inner primary surface 112, 114 of the substrate 110, and the optical film structure 120 includes a total of 5 to 12 layers. In some implementations, the high RI layers 130B collectively comprise greater than 50% of the volume or physical thickness of the optical film structure 120.

The optical film structure 120 and/or the cover article 100 may be described in terms of a hardness measured by the Berkovich Indenter Hardness Test. As noted earlier, the Berkovich Indenter Hardness Test includes indenting the outermost surface 122 of the cover article 100 (see FIGS. 1-1B) or the surface of any one or more of the layers in the optical film structure 120 with the diamond Berkovich indenter to form an indent to an indentation depth in the range from about 50 nm to about 1000 nm (or the entire thickness of the optical film structure 120 or layer thereof, whichever is less) or from about 100 nm to about 500 nm, and measuring the maximum hardness from this indentation along the entire indentation depth range or a segment of this indentation depth (e.g., in the range from about 100 nm to about 250 nm, at an indentation depth of 100 nm or greater, etc.).

In some embodiments, the cover article 100 (e.g., as depicted in FIGS. 1-1B) may exhibit a hardness of about 8 GPa or greater, about 10 GPa or greater, or about 12 GPa or greater (e.g., about 14 GPa or greater, about 16 GPa or greater, about 18 GPa or greater, or about 20 GPa or greater) when measured at the outermost surface 122. Such measured hardness values may be exhibited by the optical film structure 120 and/or the cover article 100 along an indentation depth of about 50 nm or greater, or about 100 nm or greater (e.g., from about 50 nm to about 300 nm, from about 50 nm to about 400 nm, from about 50 nm to about 500 nm, from about 50 nm to about 600 nm, from about 100 nm to about 300 nm, from about 100 nm to about 400 nm, from about 100 nm to about 500 nm, from about 100 nm to about 600 nm, from about 200 nm to about 300 nm, from about 200 nm to about 400 nm, from about 200 nm to about 500 nm, or from about 200 nm to about 600 nm). Such hardness values can also be measured from the outermost surface 122 of the optical film structure 120 to a depth of 200 nm. In one or more embodiments, the cover article 100 exhibits a hardness that is greater than the hardness of the substrate 110 (which can be measured on the opposite surface from the outermost surface 122, e.g., the inner primary surface 114).

According to some implementations of the cover articles 100 of the disclosure, as depicted in exemplary form in FIGS. 1-1B, the cover article additionally exhibits a two-surface average photopic transmittance of greater than about 60%, 70%, 80%, or even 85%, at a normal or near-normal viewing angle (0° to) 6°. For example, the cover article 100 can exhibit a two-surface average photopic transmittance of 60%, 65%, 70%, 75%, 80%, 85%, 90%, and all transmittance values between these levels, at a normal or a near-normal viewing angle. Further, in some implementations, the cover articles 100 can exhibit a transmitted color with a Chroma (c*) of less than 20, less than 15, less than 10, less than 8, or even less than 5.

Cover articles 100 of the disclosure, as depicted in exemplary form in FIGS. 1-1B, exhibit a substantially constant hue in reflectance with a D65 illuminant, as given by (a) an exhibited color with a variation in Hue Angle (h*) of less than 60 degrees over a viewing angle range from 0 to 60 degrees; or (b) an exhibited grey hue or silver hue, each with a Chroma (c*) of less than 10. For those embodiments of the cover article 100 exhibiting a color, the variation in Hue Angle (h*) can be less than 225 degrees, 200 degrees, 175 degrees, 150 degrees, 125 degrees, 100 degrees, less than 80 degrees, less than 60 degrees, less than 40 degrees, less than 20 degrees, less than 10 degrees, or even less than 5 degrees, over viewing angle ranges from 0-30°, 0-60°, or even 0-90°. For these embodiments exhibiting color, near-normal incidence or maximum Chroma (c*) value can be high, e.g., greater than 15, greater than 30, greater than 40, greater than 50, or even greater than 60. For those embodiments of the cover article 100 exhibiting a grey or silver hue, Hue Angle (h*) can vary without limitation while the Chroma (c*) exhibited by these articles is less than 10, less than 7.5, less than 5, or even less than 2.5 over viewing angle ranges from 0-30°, 0-60°, or even 0-90°.

In some implementations of the cover articles 100 of the disclosure, as depicted in exemplary form in FIGS. 1-1B, the cover article can exhibit a substantially constant hue in reflectance with a D65 illuminant, as given by an exhibited pink or red color with a Hue Angle (h*) of from 320 degrees to 40 degrees and a Chroma (c*) of greater than 15.

In some implementations of the cover articles 100 of the disclosure, as depicted in exemplary form in FIGS. 1-1B, the cover article can exhibit a substantially constant hue in reflectance with a D65 illuminant, as given by an exhibited yellow color with a Hue Angle (h*) of from 40 degrees to 135 degrees and a Chroma (c*) of greater than 15.

In some implementations of the cover articles 100 of the disclosure, as depicted in exemplary form in FIGS. 1-1B, the cover article can exhibit a substantially constant hue in reflectance with a D65 illuminant, as given by an exhibited green color with a Hue Angle (h*) of from 135 degrees to 200 degrees and a Chroma (c*) of greater than 15.

In some implementations of the cover articles 100 of the disclosure, as depicted in exemplary form in FIGS. 1-1B, the cover article can exhibit a substantially constant hue in reflectance with a D65 illuminant, as given by an exhibited blue or purple color with a Hue Angle (h*) of from 200 degrees to 320 degrees and a Chroma (c*) of greater than 15.

In some implementations of the cover articles 100 of the disclosure, as depicted in exemplary form in FIGS. 1-1B, the cover article can exhibit a substantially constant hue in reflectance with a D65 illuminant, as given by an exhibited grey or silver hue with any Hue Angle (h*) (e.g., from 0 to 320 degrees) and a Chroma (c*) of less than 5, or even less than 2.5.

The substrate 110 may include an inorganic material and may include an amorphous substrate, a crystalline substrate, or a combination thereof. The substrate 110 may be formed from man-made materials and/or naturally occurring materials (e.g., quartz and polymers). For example, in some instances, the substrate 110 may be characterized as organic and may specifically be polymeric. Examples of suitable polymers include, without limitation: thermoplastics including polystyrene (PS) (including styrene copolymers and blends), polycarbonate (PC) (including copolymers and blends), polyesters (including copolymers and blends, including polyethyleneterephthalate and polyethyleneterephthalate copolymers), polyolefins (PO) and cyclicpolyolefins (cyclic-PO), polyvinylchloride (PVC), acrylic polymers including polymethyl methacrylate (PMMA) (including copolymers and blends), thermoplastic urethanes (TPU), polyetherimide (PEI) and blends of these polymers with each other. Other exemplary polymers include epoxy, styrenic, phenolic, melamine, and silicone resins.

In some specific embodiments, the substrate 110 may specifically exclude polymeric, plastic and/or metal materials. The substrate 110 may be characterized as alkali-including substrates (i.e., the substrate 110 includes one or more alkalis). In one or more embodiments, the substrate 110 exhibits a refractive index in the range from about 1.45 to about 1.55. In specific embodiments, the substrate 110 may exhibit an average strain-to-failure at a surface on one or more opposing primary surfaces that is 0.5% or greater, 0.6% or greater, 0.7% or greater, 0.8% or greater, 0.9% or greater, 1% or greater, 1.1% or greater, 1.2% or greater, 1.3% or greater, 1.4% or greater, 1.5% or greater or even 2% or greater, as measured using ball-on-ring testing using at least 5, at least 10, at least 15, or at least 20 samples, as understood by those skilled in the field of this disclosure. In specific embodiments, the substrate 110 may exhibit an average strain-to-failure at its surface on one or more opposing primary surfaces of about 1.2%, about 1.4%, about 1.6%, about 1.8%, about 2.2%, about 2.4%, about 2.6%, about 2.8%, or about 3% or greater.

Suitable substrates 110 may exhibit an elastic modulus (or Young's modulus) in the range from about 30 GPa to about 120 GPa. In some instances, the elastic modulus of the substrate may be in the range from about 30 GPa to about 110 GPa, from about 30 GPa to about 100 GPa, from about 30 GPa to about 90 GPa, from about 30 GPa to about 80 GPa, from about 30 GPa to about 70 GPa, from about 40 GPa to about 120 GPa, from about 50 GPa to about 120 GPa, from about 60 GPa to about 120 GPa, from about 70 GPa to about 120 GPa, and all ranges and sub-ranges therebetween.

In one or more embodiments, the amorphous substrate may include glass, which may be strengthened or non-strengthened. Examples of suitable glass include soda lime glass, alkali aluminosilicate glass, alkali containing borosilicate glass and alkali aluminoborosilicate glass. In some variants, the glass may be free of lithia. In one or more alternative embodiments, the substrate 110 may include crystalline substrates such as glass ceramic substrates (which may be strengthened or non-strengthened) or may include a single crystal structure, such as sapphire. In one or more specific embodiments, the substrate 110 includes an amorphous base (e.g., glass) and a crystalline cladding (e.g., a sapphire layer, a polycrystalline alumina layer and/or or a spinel ($MgAl_2O_4$) layer).

The substrate 110 of one or more embodiments may have a hardness that is less than the hardness of the overall cover article 100 (as measured by the Berkovich Indenter Hardness Test described herein). Unless otherwise noted, the hardness of the substrate 110 is measured using the Berkovich Indenter Hardness Test.

The substrate 110 may be substantially optically clear, transparent and free from light scattering elements. In such embodiments, the substrate 110 may exhibit an average light transmittance over the optical wavelength regime of about 85% or greater, about 86% or greater, about 87% or greater, about 88% or greater, about 89% or greater, about 90% or greater, about 91% or greater, or about 92% or greater. In some embodiments, these light reflectance and transmittance values may be a total reflectance or total transmittance (taking into account reflectance or transmittance on both primary surfaces 112, 114 of the substrate 110) or may be observed on a single side of the substrate 110 (i.e., on the outermost surface 122 of the optical film structure 120 only, without taking into account the opposite surface). Unless otherwise specified, the average reflectance or transmittance of the substrate 110 alone is measured at an incident illumination angle of 0 degrees relative to the substrate primary surface 112 (however, such measurements may be provided at incident illumination angles of 45 degrees or 60 degrees). The substrate 110 may optionally exhibit a color, such as white, black, red, blue, green, yellow, orange, etc.

Additionally or alternatively, the physical thickness of the substrate 110 may vary along one or more of its dimensions for aesthetic and/or functional reasons. For example, the edges of the substrate 110 may be thicker as compared to more central regions of the substrate 110. The length, width and physical thickness dimensions of the substrate 110 may also vary according to the application or use of the cover article 100.

The substrate 110 may be provided using a variety of different processes. For instance, where the substrate 110 includes an amorphous substrate such as glass, various forming methods can include float glass processes and down-draw processes such as fusion draw and slot draw.

Once formed, a substrate 110 may be strengthened to form a strengthened substrate. As used herein, the term "strengthened substrate" may refer to a substrate that has been chemically strengthened, for example through ion-exchange of larger ions for smaller ions in the surface of the substrate. However, other strengthening methods known in the art, such as thermal tempering, or utilizing a mismatch of the coefficient of thermal expansion between portions of the substrate to create compressive stress and central tension regions, may be utilized to form strengthened substrates.

Where the substrate 110 is chemically strengthened by an ion exchange process, the ions in the surface layer of the substrate are replaced by—or exchanged with—larger ions having the same valence or oxidation state. Ion exchange processes are typically carried out by immersing a substrate in a molten salt bath containing the larger ions to be exchanged with the smaller ions in the substrate. It will be appreciated by those skilled in the art that parameters for the ion exchange process, including, but not limited to, bath composition and temperature, immersion time, the number of immersions of the substrate in a salt bath (or baths), use of multiple salt baths, additional steps such as annealing, washing, and the like, are generally determined by the composition of the substrate and the desired compressive stress (CS), depth of compressive stress layer (or depth of layer DOL, or depth of compression DOC) of the substrate that result from the strengthening operation. By way of example, ion exchange of alkali metal-containing glass substrates may be achieved by immersion in at least one molten bath containing a salt such as, but not limited to, nitrates, sulfates, and chlorides of the larger alkali metal ion. The temperature of the molten salt bath typically is in a range from about 380° C. up to about 450° C., while immersion times range from about 15 minutes up to about 40 hours. However, temperatures and immersion times different from those described above may also be used.

In addition, non-limiting examples of ion exchange processes in which glass substrates are immersed in multiple ion exchange baths, with washing and/or annealing steps between immersions, are described in U.S. patent application Ser. No. 12/500,650, filed Jul. 10, 2009, by Douglas C. Allan et al., entitled "Glass with Compressive Surface for Consumer Applications" and claiming priority from U.S. Provisional Patent Application No. 61/079,995, filed Jul. 11, 2008, in which glass substrates are strengthened by immersion in multiple, successive, ion exchange treatments in salt baths of different concentrations; and U.S. Pat. No. 8,312,739, by Christopher M. Lee et al., issued on Nov. 20, 2012, and entitled "Dual Stage Ion Exchange for Chemical Strengthening of Glass," and claiming priority from U.S. Provisional Patent Application No. 61/084,398, filed Jul. 29, 2008, in which glass substrates are strengthened by ion exchange in a first bath diluted with an effluent ion, followed by immersion in a second bath having a smaller concentration of the effluent ion than the first bath. The contents of U.S. patent application Ser. No. 12/500,650 and U.S. Pat. No. 8,312,739 are incorporated herein by reference in their entirety.

The degree of chemical strengthening achieved by ion exchange may be quantified based on the parameters of central tension (CT), surface CS, and depth of compression (DOC). Compressive stress (including surface CS) is measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety. Maximum CT values are measured using a scattered light polariscope (SCALP) technique known in the art. As used herein, DOC means the depth at which the stress in the chemically strengthened alkali aluminosilicate glass article described herein changes from compressive to tensile. DOC may be measured by FSM or SCALP depending on the ion exchange treatment. Where the stress in the glass article is generated by exchanging potassium ions into the glass article, FSM is used to measure DOC. Where the stress is generated by exchanging sodium ions into the glass article, SCALP is used to measure DOC. Where the stress in the glass article is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass articles is measured by FSM.

In one embodiment, a substrate 110 can have a surface CS of 200 MPa or greater, 250 MPa or greater, 300 MPa or greater, e.g., 400 MPa or greater, 450 MPa or greater, 500 MPa or greater, 550 MPa or greater, 600 MPa or greater, 650 MPa or greater, 700 MPa or greater, 750 MPa or greater or 800 MPa or greater. The strengthened substrate may have a DOC (formerly DOL) of 10 μm or greater, 15 μm or greater, 20 μm or greater (e.g., 25 μm, 30 μm, 35 μm, 40 μm, 45 μm, 50 μm or greater) and/or a CT of 10 MPa or greater, 20 MPa or greater, 30 MPa or greater, 40 MPa or greater (e.g., 42 MPa, 45 MPa, or 50 MPa or greater) but less than 100 MPa (e.g., 95, 90, 85, 80, 75, 70, 65, 60, 55 MPa or less). In one or more specific embodiments, the strengthened substrate has one or more of the following: a surface CS greater than 500 MPa, a DOC (formerly DOL) greater than 15 μm, and a CT greater than 18 MPa.

Example glasses that may be used in the substrate 110 may include alkali aluminosilicate glass compositions or alkali aluminoborosilicate glass compositions, though other glass compositions are contemplated. Such glass compositions are capable of being chemically strengthened by an ion exchange process. One example glass composition comprises $SiO_2$, $B_2O_3$ and $Na_2O$, where $(SiO_2+B_2O_3)\geq66$ mol. %, and $Na_2O\geq9$ mol. %. In an embodiment, the glass composition includes at least 6 wt. % aluminum oxide. In a further embodiment, the substrate includes a glass composition with one or more alkaline earth oxides, such that a content of alkaline earth oxides is at least 5 wt. %. Suitable glass compositions, in some embodiments, further comprise at least one of $K_2O$, MgO, and CaO. In a particular embodiment, the glass compositions used in the substrate can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example glass composition suitable for the substrate 110 comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. %≤$(Li_2O+Na_2O+K_2O)$≤20 mol. % and 0 mol. %≤(MgO+CaO)≤10 mol. %.

A still further example glass composition suitable for the substrate 110 comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. %≤$(Li_2O+Na_2O+K_2O)$≤18 mol. % and 2 mol. %≤(MgO+CaO)≤7 mol. %.

In a particular embodiment, an alkali aluminosilicate glass composition suitable for the substrate 110 comprises alumina, at least one alkali metal and, in some embodiments, greater than 50 mol. % $SiO_2$, in other embodiments at least 58 mol. % $SiO_2$, and in still other embodiments at least 60 mol. % $SiO_2$, wherein the ratio $(Al_2O_3+B_2O_3)$/Emodifiers (i.e., sum of modifiers) is greater than 1, where in the ratio the components are expressed in mol. % and the modifiers are alkali metal oxides. This glass composition, in particular embodiments, comprises: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $(Al_2O_3+B_2O_3)$/Emodifiers (i.e., sum of modifiers) is greater than 1.

In still another embodiment, the substrate 110 may include an alkali aluminosilicate glass composition comprising: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. %≤$SiO_2+B_2O_3$+CaO≤69 mol. %; $Na_2O+K_2O+B_2O_3$+MgO+CaO+SrO>10 mol. %; 5 mol. %≤MgO+CaO+SrO≤8 mol. %; $(Na_2O+B_2O_3)—Al_2O_3$≤2 mol. %; 2 mol. %≤$Na_2O$ $Al_2O_{3\le6}$ mol. %; and 4 mol. %≤$(Na_2O+K_2O)—Al_2O_3$≤10 mol. %.

In an alternative embodiment, the substrate 110 may comprise an alkali aluminosilicate glass composition comprising: 2 mol. % or more of $Al_2O_3$ and/or $ZrO_2$, or 4 mol. % or more of $Al_2O_3$ and/or $ZrO_2$.

Where the substrate 110 includes a crystalline substrate, the substrate may include a single crystal, which may include $Al_2O_3$. Such single crystal substrates are referred to as sapphire. Other suitable materials for a crystalline substrate include polycrystalline alumina layer and/or spinel ($MgAl_2O_4$).

Optionally, the substrate 110 may be crystalline and include a glass ceramic substrate, which may be strengthened or non-strengthened. Examples of suitable glass ceramics may include $Li_2O—Al_2O_3—SiO_2$ system (i.e., LAS-System) glass ceramics, $MgO—Al_2O_3—SiO_2$ system (i.e., MAS-System) glass ceramics, and/or glass ceramics that include a predominant crystal phase including β-quartz solid solution, β-spodumene ss, cordierite, and lithium disilicate. The glass ceramic substrates may be strengthened using the chemical strengthening processes disclosed herein. In one or more embodiments, MAS-System glass ceramic substrates may be strengthened in $Li_2SO_4$ molten salt, whereby an exchange of $2Li^+$ for $Mg^{2+}$ can occur.

The substrate 110 according to one or more embodiments can have a physical thickness ranging from about 50 μm to about 5 mm in various portions of the substrate 110. Example substrate 110 physical thicknesses range from about 50 μm to about 500 μm (e.g., 50, 75, 100, 200, 300, 400 or 500 μm). Further example substrate 110 physical thicknesses can range from about 50 μm to about 5000 μm (e.g., 50, 75, 100, 250, 500, 600, 700, 800, 900, 1000, 1250, 1500, 1750, 2000, 2500, 3000, 3500, 4000, 4500, or 5000 μm). The substrate 110 may have a physical thickness greater than about 1 mm (e.g., about 2, 3, 4, or 5 mm). In one or more specific embodiments, the substrate 110 may have a physical thickness of 2 mm or less, or less than 1 mm. The substrate 110 may be acid polished or otherwise treated to remove or reduce the effect of surface flaws.

Referring again to the cover articles 100 of the disclosure, as depicted in exemplary form in FIGS. 1-1B, the optical film structure 120 can be formed through various deposition techniques readily understood by those skilled in the field of the disclosure, e.g., reactive sputtering. Further, given the relatively high number of layers and total thickness associated with embodiments of the optical film structure 120, a reactive sputtering deposition can be tuned to lower power levels (e.g., 1-2.5 kW in the inductive coupling, reactive plasma zone in a metal-mode sputter drum coater) to minimize substrate temperature to less than 300° C. during deposition. Without being bound by theory, such process adjustments can be useful to retain the maximum level of chemical-strengthened, induced compressive stress in a strengthened glass or transparent glass-ceramic substrate 110.

The cover articles 100, as depicted in exemplary form in FIGS. 1-1B and disclosed herein, may be incorporated into another article such as an article with a display (or display articles) (e.g., consumer electronics, including mobile phones, tablets, computers, navigation systems, and the like), architectural articles, transportation articles (e.g., automotive, trains, aircraft, sea craft, etc.), appliance articles, or any article with one or more sensors that require protection (e.g., scratch-resistance, abrasion resistance, hardness, chemical durability or a combination thereof) and optical band-pass filtering capabilities.

Figure 2C:
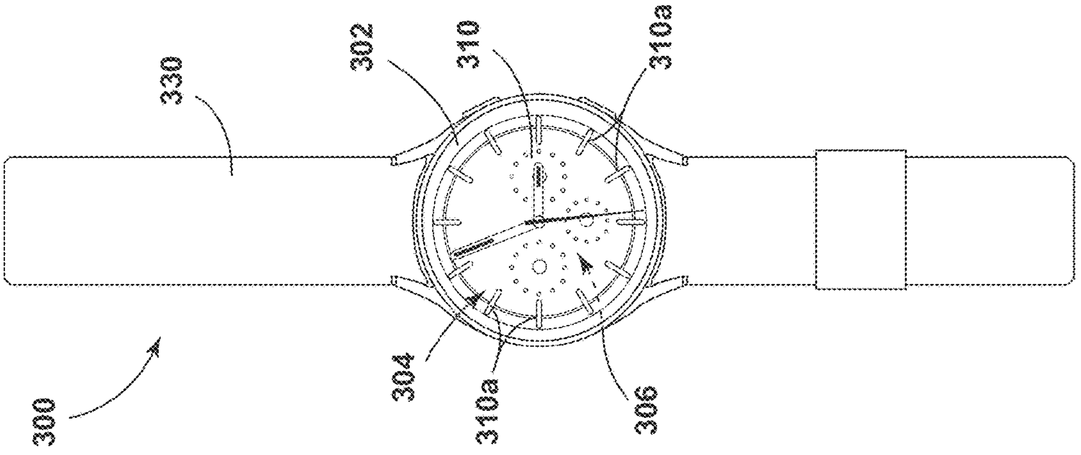
FIG. 2C is a schematic of the front of the exemplary article of FIGS. 2A and 2B in an "ON" state, according to one or more embodiments of the disclosure.
Figure 2B:
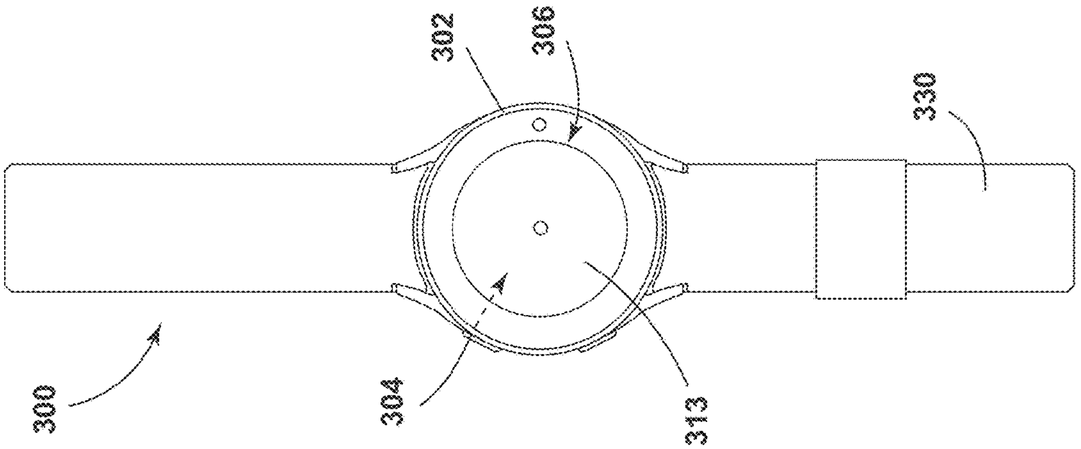
FIGS. 2A and 2B are respective front and back schematics of an exemplary article in an "OFF" state that can incorporate any of the cover articles of the disclosure.
Figure 2A:
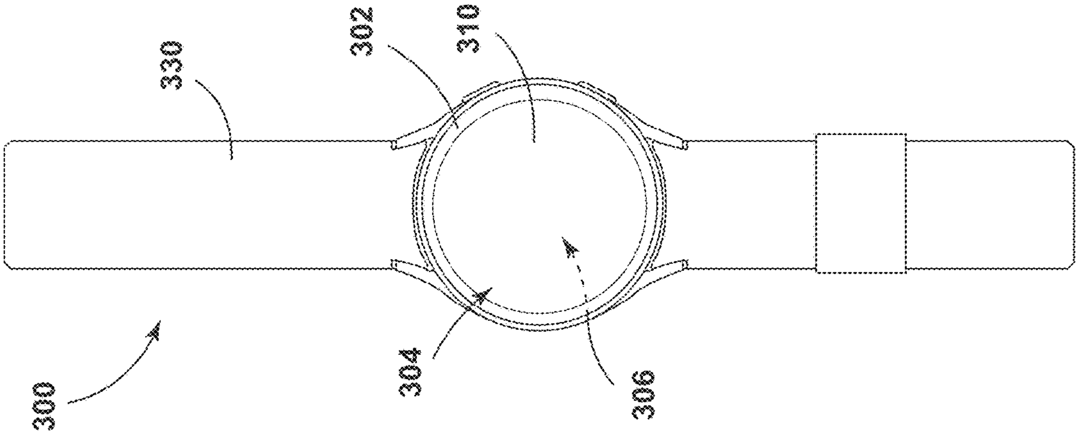

An exemplary article incorporating any of the cover articles disclosed herein is a wearable electronic device 300, as depicted in FIGS. 2A and 2B, such as a smartwatch, smart ring, or smart glasses. In this configuration, wearable electronic device 300 includes a band 330, housing 302 having a front surface 304, a back surface 306; electronic components (not shown) that are at least partially inside or entirely within the housing 302; and a display 310. Further, the display 310 is at or adjacent to the front surface 304 of the housing 302. In addition, a cover 313 is disposed over or coincident with the back surface 306. Further, at least one of the cover 313 or a portion of the housing 302 may include any of the cover articles 100 disclosed herein. Accordingly, the wearable electronic device 300, particularly its cover 313 and/or housing 302 at the front and/or back surfaces 304, 306, can advantageously exhibit a desired color (e.g., blue, red, etc.) or a desired neutral color (e.g., neutral grey or silver) with minimal variation in color or hue over a wide viewing angle range.

Further, as shown in FIG. 2A, the wearable electronic device 300, particularly its cover 313 and/or housing 302 at the front and/or back surfaces 304, 306, can advantageously exhibit a desired color (e.g., blue, red, etc.) or a desired neutral color (e.g., neutral grey or silver) when in an "OFF" state with minimal variation in color or hue over a wide viewing angle range. In addition, as shown in FIG. 2C, the wearable electronic device 300 may operate as a dead-front display in an "ON" state in which very little amounts (if any)

of transmitted color are present as compared to the "OFF" state (e.g., as depicted in FIG. 2A), e.g., for allowing readability of display indications 310*a*.

EXAMPLES

Various embodiments will be further clarified by the following examples, as consistent with the cover articles depicted in FIG. 1A (Exs. 1-4, 4A, 4B and 5) and cover articles depicted in FIG. 1B (Exs. 6-9, 9A and 10), along with two comparative examples (Comp. Ex. 1 and Comp. Ex. 2). The optical properties (e.g., first surface reflectance, first surface reflected color in CIE L*, a* and b* coordinate system, and first surface reflected color in CIE L, c* and h* cylindrical coordinate system) of the examples were modeled using computational techniques, particularly transfer matrix modeling techniques, to model thin film performance as understood by those of skill in the field of this disclosure. Thin film properties (e.g., refractive index values) obtained from prior thin film reactive sputtering of films (e.g., high RI layers of $SiO_xN_y$ and $SiN_x$), lab experiments, and higher volume sputter manufacturing, were used in the modeling.

The refractive indices (as a function of wavelength) of each of the formed layers and the glass substrate were measured using spectroscopic ellipsometry in prior experiments. The refractive indices thus measured were then used to calculate reflectance spectra for the examples. The examples use a single refractive index value in their descriptive tables for convenience, which corresponds to a point selected from the dispersion curves at about 550 nm wavelength.

In the following examples, the articles exhibit an optimized, selected color or hue attribute (e.g., a red color in reflectance, etc.) with minimal color variation (e.g., low variation in Hue Angle (h*)) or an optimized hue (e.g., neutral grey in reflectance) with minimal hue variation (e.g., as given by a low Chroma (c*)<10) over a large range of viewing angles, and a combination of desirable mechanical properties (e.g., high hardness). The comparative articles, in contrast, may exhibit good mechanical properties, but they suffer from high color variation as a function of viewing angle.

Comparative Example 1

A strengthened glass substrate was coated with the optical film structure of Table 1 below, designated Comp. Ex. 1. In particular, the optical film structure of Comp. Ex. 1 has a total of 13 layers with a total thickness of 2513.8 nm, including alternating high and low refractive index layers, a low RI layer in contact with the substrate (i.e., layer 13 with a thickness of 25.0 nm) and an oxide-containing capping layer at the outermost position of the stack (i.e., layer 1 with a thickness of 88.5 nm).

Figure 3A:
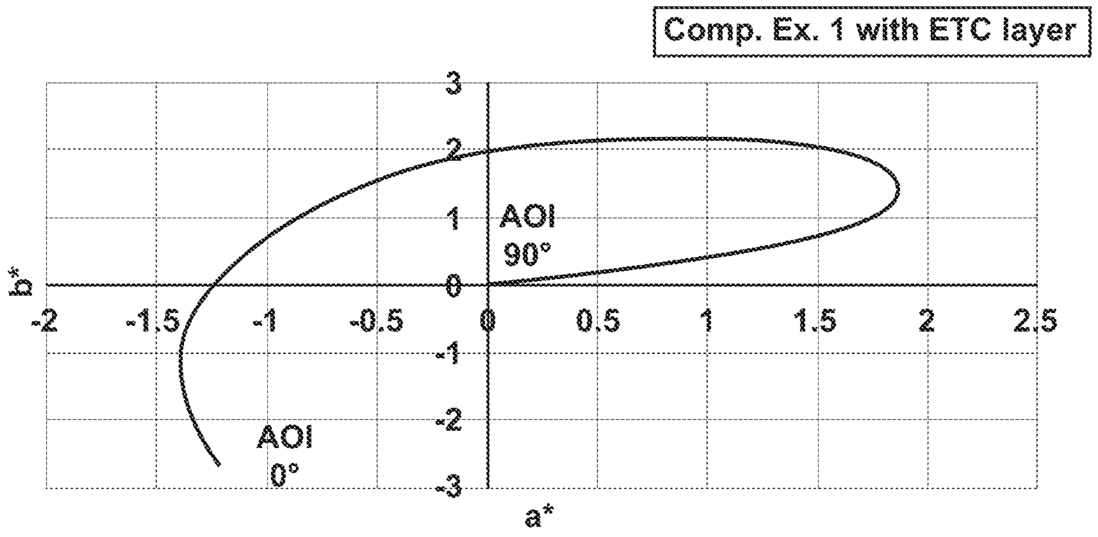
FIG. 3A is a plot of first-surface reflected color (a* and b*) over viewing angles from 0° to 90° exhibited by a comparative cover article example.

Referring to FIG. 3A, a plot is provided of first-surface reflected color (a* and b*) over viewing angles from 0° to 90° for Comp. Ex. 1. As is evident from FIG. 3A, the color exhibited by this cover article changes drastically as a function of viewing angle. In particular, this comparative example exhibits a variation in Hue Angle (h*) of >225° over a viewing angle range of 0° to 90° and the perceived color is not particularly vibrant with a maximum Chroma (c*) of about 2.9.

TABLE 1

Comp. Ex. 1, Cover Article

| Layer | Material | Refractive Index | Extinction Coefficient | Physical Thickness (nm) |
|---|---|---|---|---|
| | Air | 1 | 0 | |
| 1 | $SiO_2$ | 1.47812 | 0 | 88.5 |
| 2 | $Si_3N_4$ | 2.02212 | 0.00007 | 143.6 |
| 3 | $SiO_2$ | 1.47812 | 0 | 16.8 |
| 4 | $Si_3N_4$ | 2.02212 | 0.00007 | 40.9 |
| 5 | SiO2 | 1.47812 | 0 | 10.6 |
| 6 | $SiO_xN_y$ | 1.95316 | 0.00017 | 2015 |
| 7 | $SiO_2$ | 1.47812 | 0 | 8.8 |
| 8 | $SiO_xN_y$ | 1.95316 | 0.00017 | 44.8 |
| 9 | $SiO_2$ | 1.47812 | 0 | 30.1 |
| 10 | $SiO_xN_y$ | 1.95316 | 0.00017 | 26.4 |
| 11 | $SiO_2$ | 1.47812 | 0 | 53.7 |
| 12 | $SiO_xN_y$ | 1.95316 | 0.00017 | 9.6 |
| 13 | $SiO_2$ | 1.47812 | 0 | 25 |
| 14 | Glass - Corning ® Gorilla ® Glass 3 | 1.50972 | 0 | 0.4 mm |
| | Air | 1 | 0 | |
| | Total Thickness of Optical Film Structure | | | 2513.8 |

Comparative Example 2

A strengthened glass substrate was coated with the optical film structure of Table 1A below, designated Comp. Ex. 2. In particular, the optical film structure of Comp. Ex. 2 has a total of 11 layers with a total thickness of 2598.2 nm, including alternating high and low refractive index layers, a low RI layer in contact with the substrate (i.e., layer 11 with a thickness of 25.0 nm) and an oxide-containing capping layer at the outermost position of the stack (i.e., layer 1 with a thickness of 78.2 nm).

Figure 3B:
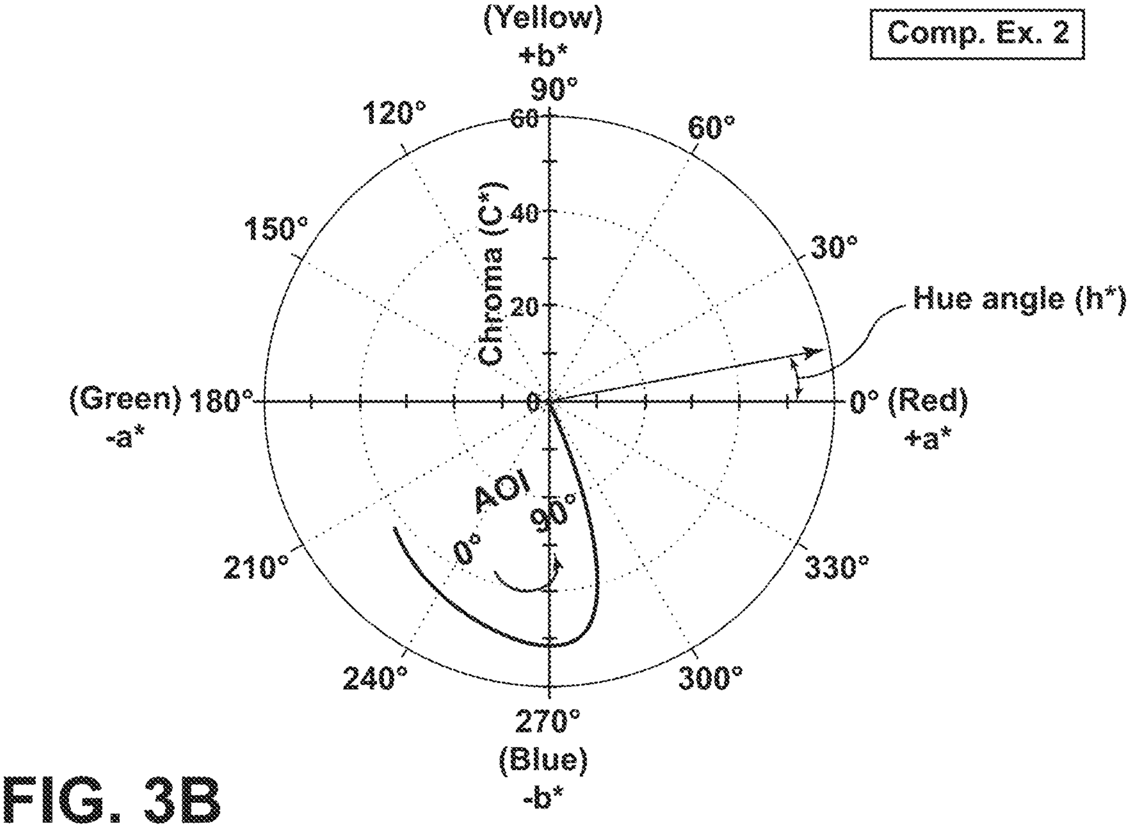
FIG. 3B is a Hue angle (h*) and Chroma (c*) plot over viewing angles from 0° to 90° exhibited by a comparative cover article example.

Referring to FIG. 3B, a plot is provided of Hue angle (h*) and Chroma (c*) over viewing angles from 0° to 90° for Comp. Ex. 2. As is evident from this figure, this example exhibits a blue color with a high variation in color over the viewing angle range from 0° to 90°. Further, at viewing angles of near normal incidence, the Chroma (c*) of this comparative example is low. In particular, the variation in Hue Angle (h*) is more than 20° over the viewing angle (AOI) range from 0-30°, and more than 60° over the viewing angle (AOI) range from 0-60°. More specifically, this comparative example exhibits a maximum Chroma (c*) of 51.41; a maximum saturation (s*) of 1.07; a variation in Hue Angle (h*) of 2.60° over a viewing angle range from 0-10°; a variation in Hue Angle (h*) of 21.40° over a viewing angle range from 0-30°; a variation in Hue Angle (h*) of 60.65° over a viewing angle range from 0-60°; and a variation in Hue Angle (h*) of 102.83° over a viewing angle range from 0-90°.

TABLE 1A

Comp. Ex. 2, Cover Article

| Layer | Material | Refractive Index | Physical Thickness (nm) |
|---|---|---|---|
| | Air | 1 | |
| 1 | $SiO_2$ | 1.47812 | 78.2 |
| 2 | $SiO_xN_y$ | 2.02212 | 2000 |
| 3 | $SiO_2$ | 1.47812 | 64.9 |
| 4 | $SiO_xN_y$ | 2.02212 | 68.3 |
| 5 | $SiO_2$ | 1.47812 | 62.4 |
| 6 | $SiO_xN_y$ | 2.02212 | 76.7 |
| 7 | $SiO_2$ | 1.47812 | 62.9 |

TABLE 1A-continued

| Comp. Ex. 2, Cover Article | | | |
|---|---|---|---|
| Layer | Material | Refractive Index | Physical Thickness (nm) |
| 8 | $SiO_xN_y$ | 2.02212 | 70.4 |
| 9 | $SiO_2$ | 1.47812 | 71.2 |
| 10 | $SiO_xN_y$ | 2.02212 | 18.8 |
| 11 | $SiO_2$ | 1.47812 | 25 |
| 12 | Glass - Corning ® Gorilla ® Glass 3 | 1.51 | 2.16 mm |
| | Air | 1 | |
| Total Thickness of Optical Film Structure | | | 2598.2 |

Example 1

A strengthened glass substrate was coated with the optical film structure of Table 2 below, designated Ex. 1. In particular, the optical film structure of Ex. 1 has a total of 13 layers with a total thickness of 3583.57 nm, including alternating high and low refractive index layers, a low RI layer in contact with the substrate (i.e., layer 13 with a thickness of 25.0 nm) and an oxide-containing capping layer at the outermost position of the stack (i.e., layer 1 with a thickness of 223.50 nm).

Figure 4A:
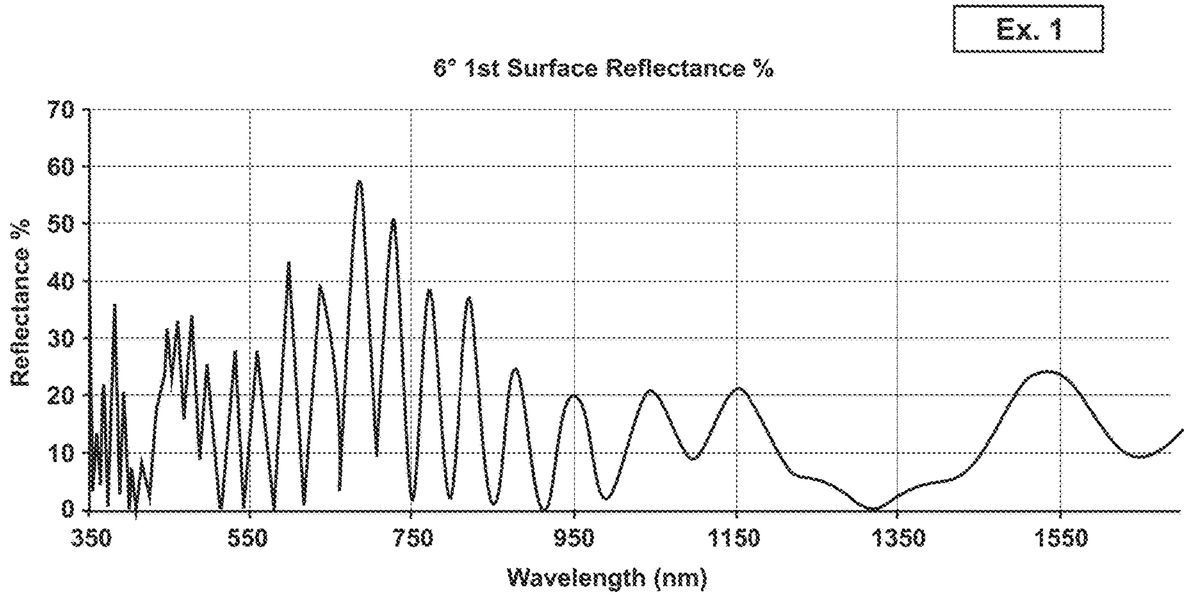
FIG. 4A is a plot of first-surface reflectance over the visible and near-infrared spectrums at a near-normal angle of incidence) (~6° for a cover article of the disclosure.

Referring to FIG. 4A, a plot is provided of first-surface reflectance over the visible and near-infrared spectrums at a near-normal angle of incidence) (~6° for this example cover article. As is evident from the figure, Ex. 1 exhibits a peak reflected wavelength of 683 nm with a reflectance of 57.3% at the peak reflected wavelength.

Figure 4B:
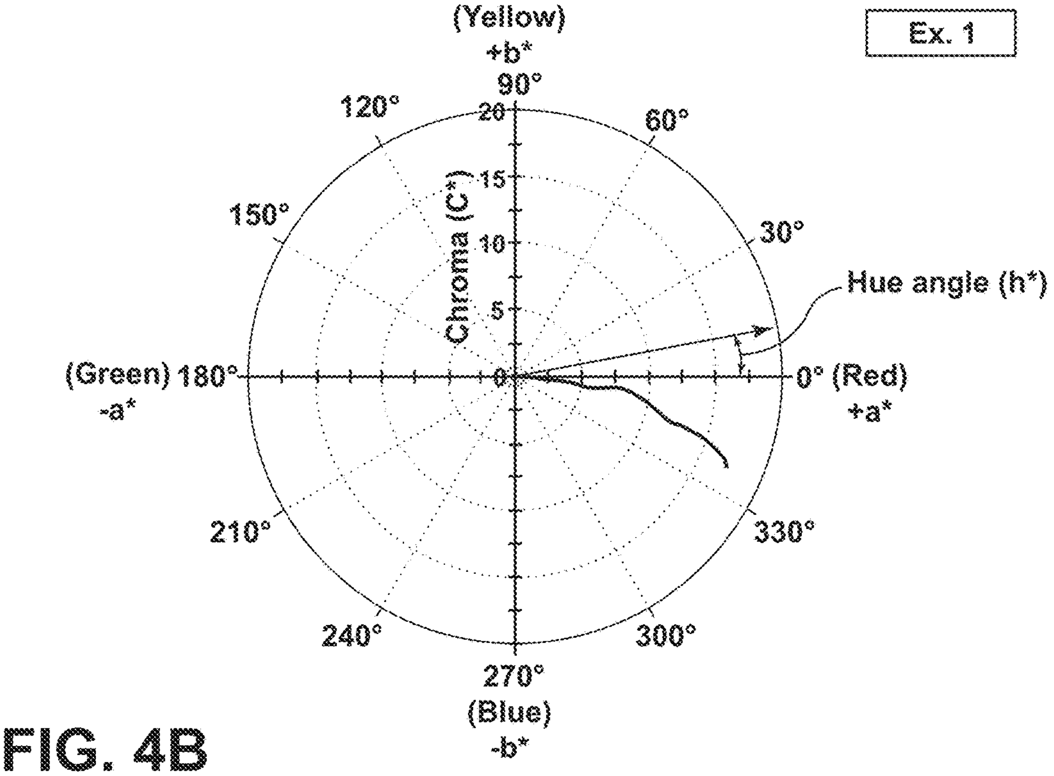
FIG. 4B is a Hue angle (h*) and Chroma (c*) plot over viewing angles from 0° to 90° exhibited by the cover article of FIG. 4A.
Figure 4C:
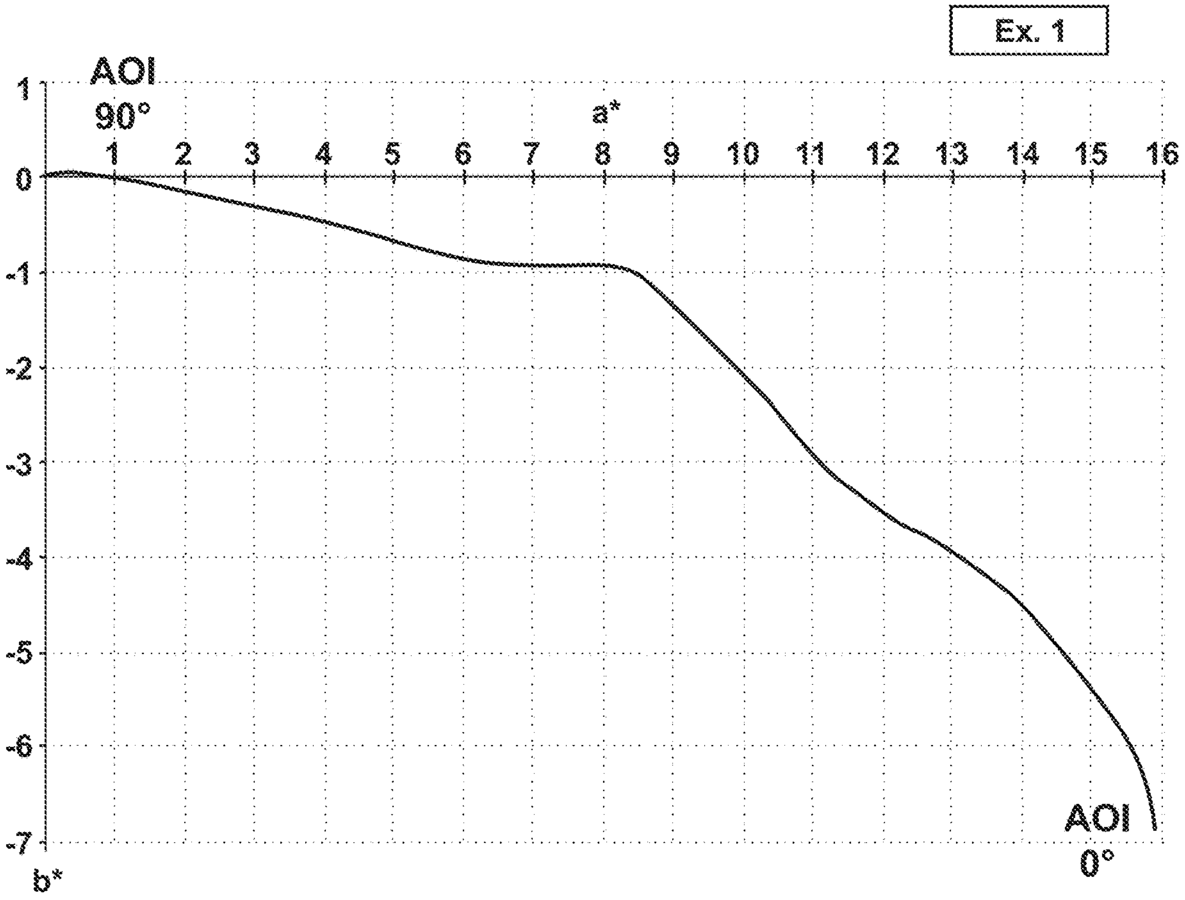
FIG. 4C is a plot of first-surface reflected color (a* and b*) from a D65 illumination source over viewing angles from 0° to 90° exhibited by the cover article of FIG. 4A.

Referring to FIG. 4B, a plot is provided of Hue angle (h*) and Chroma (c*) over viewing angles from 0° to 90° for this example cover article. Further, referring to FIG. 4C, a plot is provided of the first-surface reflected color (a and b*) from a D65 illumination source over viewing angles from 0° to 90° for this example cover article. As is evident from FIGS. 4B and 4C, this example exhibits a pink color with a Hue Angle (h*) from 320-40°, with little to no change in Hue Angle (h*) over the 0-90° viewing angle range, and a high Chroma (c*) value resulting in high saturation. More specifically, this example exhibits a maximum Chroma (c*) of 17.29; a maximum saturation (s*) of 0.35; a variation in Hue Angle (h*) of 0.51° over a viewing angle range from 0-10°; a variation in Hue Angle (h*) of 5.15° over a viewing angle range from 0-30°; a variation in Hue Angle (h*) of 16.57° over a viewing angle range from 0-60°; and a variation in Hue Angle (h*) of 38.04° over a viewing angle range from 0-90°.

TABLE 2

| Ex. 1, Cover Article | | | | |
|---|---|---|---|---|
| Layer | Material | Refractive Index | Extinction Coefficient | Physical Thickness (nm) |
| | Air | 1 | 0 | |
| 1 | $SiO_2$ | 1.47624 | 0 | 223.50 |
| 2 | $SiN_x$ | 2.01355 | 0.00003 | 2000.00 |
| 3 | $SiO_2$ | 1.47624 | 0 | 298.03 |
| 4 | $SiN_x$ | 2.01355 | 0.00003 | 108.96 |
| 5 | $SiO_2$ | 1.47624 | 0 | 26.89 |
| 6 | $SiN_x$ | 2.01355 | 0.00003 | 303.12 |
| 7 | $SiO_2$ | 1.47624 | 0 | 47.73 |
| 8 | $SiN_x$ | 2.01355 | 0.00003 | 147.91 |
| 9 | $SiO_2$ | 1.47624 | 0 | 41.28 |
| 10 | $SiN_x$ | 2.01355 | 0.00003 | 12.96 |

TABLE 2-continued

| Ex. 1, Cover Article | | | | |
|---|---|---|---|---|
| Layer | Material | Refractive Index | Extinction Coefficient | Physical Thickness (nm) |
| 11 | $SiO_2$ | 1.47624 | 0 | 59.78 |
| 12 | $SiN_x$ | 2.01355 | 0.00003 | 288.41 |
| 13 | $SiO_2$ | 1.47624 | 0 | 25.00 |
| 14 | Glass - Corning ® Gorilla ® Glass 6 | 1.51724 | 0 | 0.8 mm |
| | Air | 1 | 0 | |
| Total Thickness of Optical Film Structure | | | | 3583.57 |

Example 2

A strengthened glass substrate was coated with the optical film structure of Table 3 below, designated Ex. 2. In particular, the optical film structure of Ex. 2 has a total of 9 layers with a total thickness of 2684.76 nm, including alternating high and low refractive index layers, a low RI layer in contact with the substrate (i.e., layer 9 with a thickness of 25.0 nm) and an oxide-containing capping layer at the outermost position of the stack (i.e., layer 1 with a thickness of 82.87 nm).

Figure 5A:
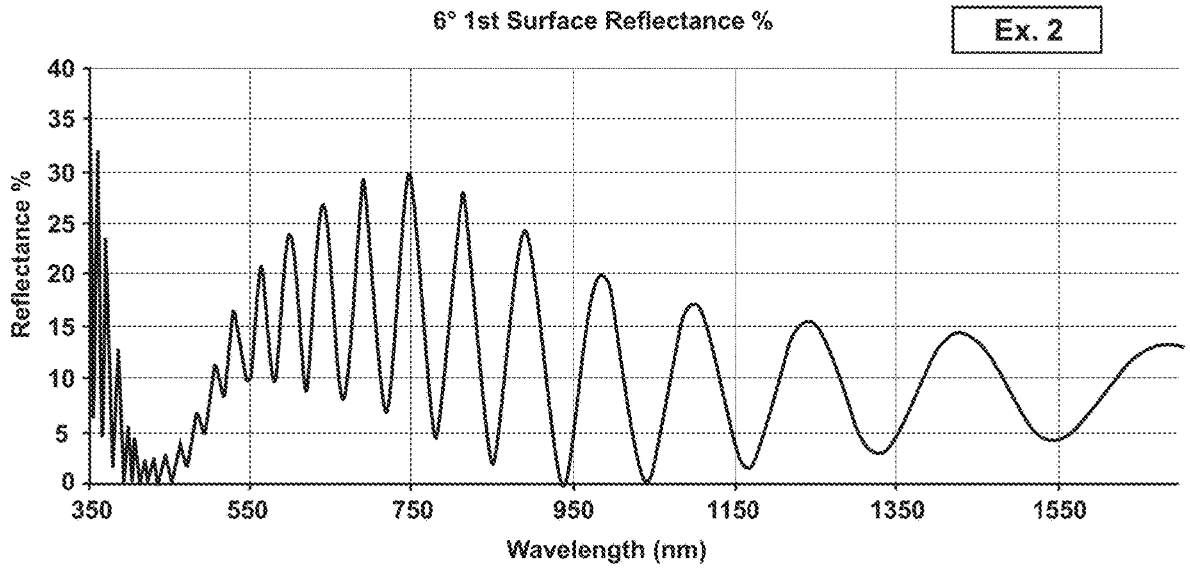
FIG. 5A is a plot of first-surface reflectance over the visible and near-infrared spectrums at a near-normal angle of incidence) (~6° for a cover article of the disclosure.

Referring to FIG. 5A, a plot is provided of first-surface reflectance over the visible and near-infrared spectrums at a near-normal angle of incidence) (~6° for this example cover article. As is evident from the figure, Ex. 2 exhibits a peak reflected wavelength of 690 nm with a reflectance of 29.1% at the peak reflected wavelength.

Figure 5B:
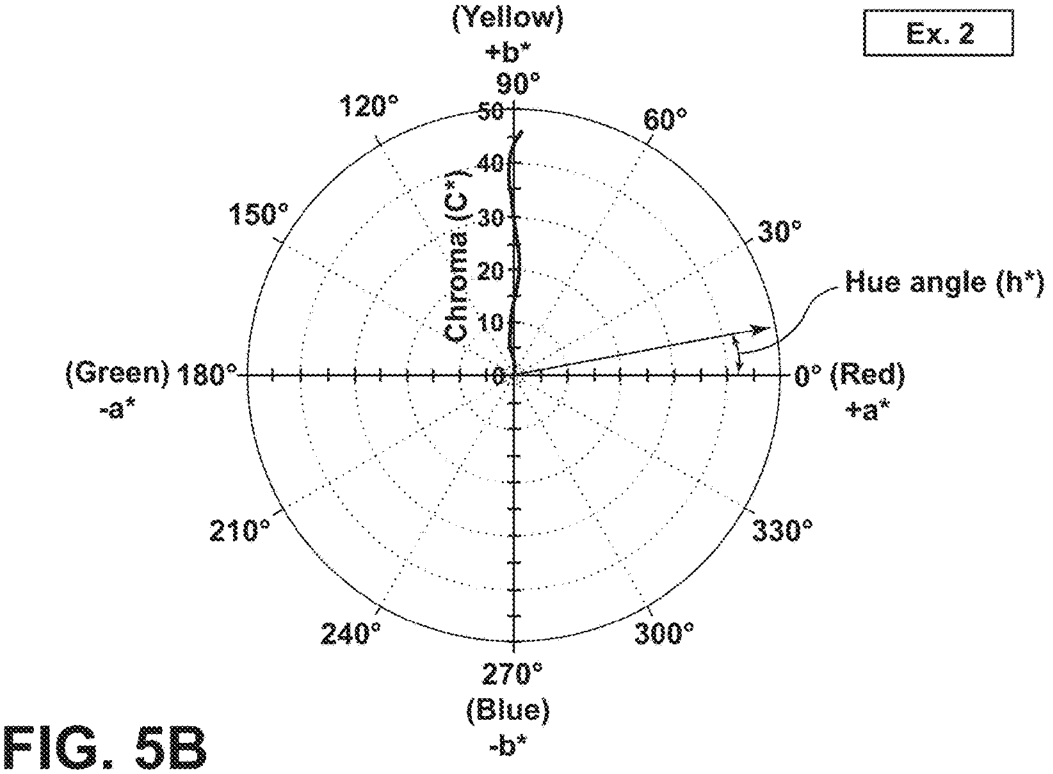
FIG. 5B is a Hue angle (h*) and Chroma (c*) plot over viewing angles from 0° to 90° exhibited by the cover article of FIG. 5A.
Figure 5C:
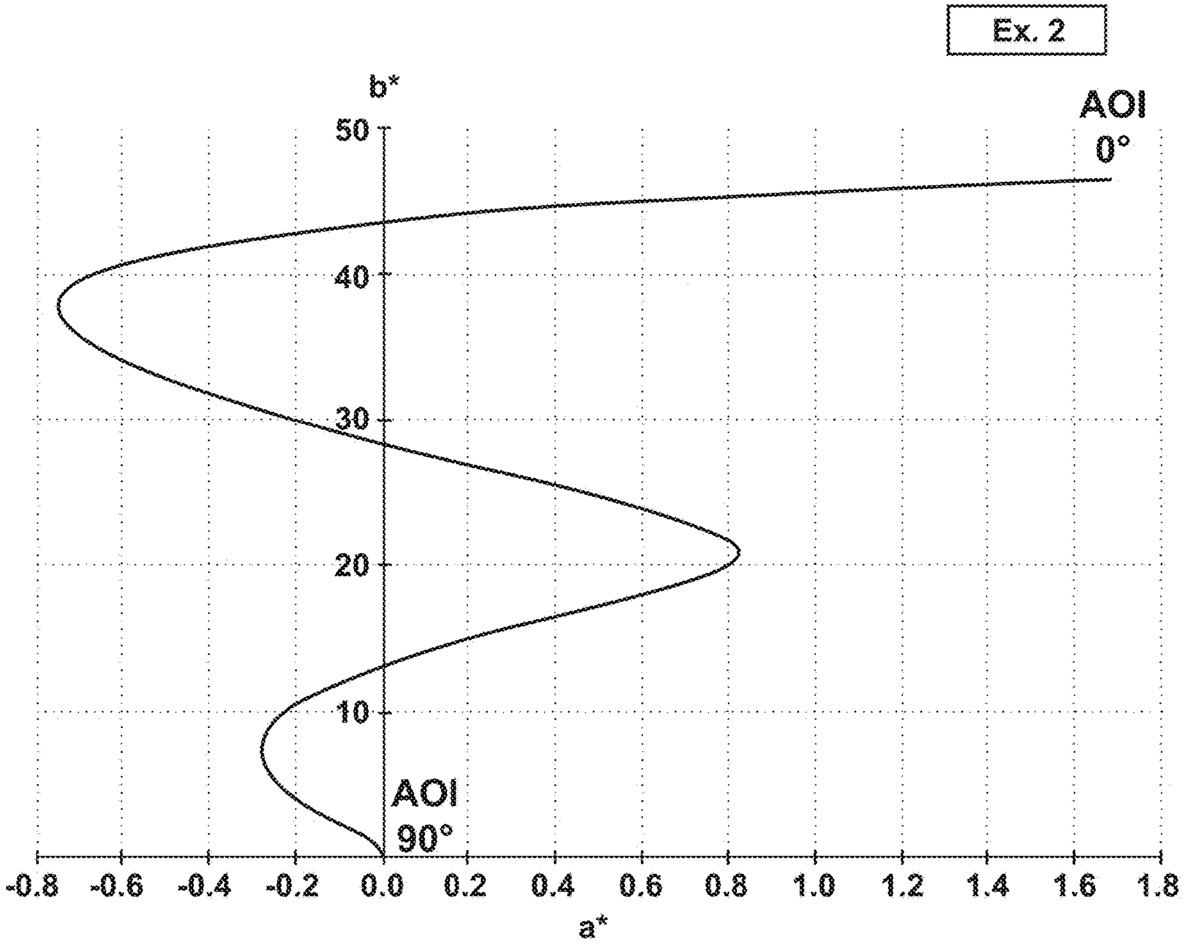
FIG. 5C is a plot of first-surface reflected color (a* and b*) from a D65 illumination source over viewing angles from 0° to 90° exhibited by the cover article of FIG. 5A.

Referring to FIG. 5B, a plot is provided of Hue angle (h*) and Chroma (c*) over viewing angles from 0° to 90° for this example cover article. Further, referring to FIG. 5C, a plot is provided of the first-surface reflected color (a* and b*) from a D65 illumination source over viewing angles from 0° to 90° for this example cover article. As is evident from FIGS. 5B and 5C, this example exhibits a yellow color with a Hue Angle (h*) from 40-125°, with little to no change in Hue Angle (h*) over the 0-90° viewing angle range, and a high Chroma (c*) value resulting in high saturation. More specifically, this example exhibits a maximum Chroma (c*) of 43.07; a maximum saturation (s*) of 1.08; a variation in Hue Angle (h*) of 0.67° over a viewing angle range from 0-10°; a variation in Hue Angle (h*) of 3.18° over a viewing angle range from 0-30°; a variation in Hue Angle (h*) of 3.43° over a viewing angle range from 0-60°; and a variation in Hue Angle (h*) of 5.08° over a viewing angle range from 0-90°.

TABLE 3

| Ex. 2, Cover Article | | | | |
|---|---|---|---|---|
| Layer | Material | Refractive Index | Extinction Coefficient | Physical Thickness (nm) |
| | Air | 1 | 0 | |
| 1 | $SiO_2$ | 1.47624 | 0 | 82.87 |
| 2 | $SiN_x$ | 2.01355 | 0.00003 | 2000.00 |
| 3 | $SiO_2$ | 1.47624 | 0 | 17.99 |
| 4 | $SiN_x$ | 2.01355 | 0.00003 | 128.66 |
| 5 | $SiO_2$ | 1.47625 | 0 | 69.27 |
| 6 | $SiN_x$ | 2.01355 | 0.00003 | 105.32 |
| 7 | $SiO_2$ | 1.47624 | 0 | 246.76 |
| 8 | $SiN_x$ | 2.01355 | 0.00003 | 8.91 |
| 9 | $SiO_2$ | 1.47624 | 0 | 25.00 |

TABLE 3-continued

| Ex. 2, Cover Article | | | | |
|---|---|---|---|---|
| Layer | Material | Refractive Index | Extinction Coefficient | Physical Thickness (nm) |
| 10 | Glass - Corning ® Gorilla ® Glass 3 | 1.50628 | 0 | 2.16 mm |
| | Air | 1 | 0 | |
| | Total Thickness of Optical Film Structure | | | 2.684.76 |

Example 3

A strengthened glass substrate was coated with the optical film structure of Table 4 below, designated Ex. 3. In particular, the optical film structure of Ex. 3 has a total of 17 layers with a total thickness of 3212.53 nm, including alternating high and low refractive index layers, a low RI layer in contact with the substrate (i.e., layer 17 with a thickness of 25.0 nm) and an oxide-containing capping layer at the outermost position of the stack (i.e., layer 1 with a thickness of 85.47 nm).

Figure 6A:
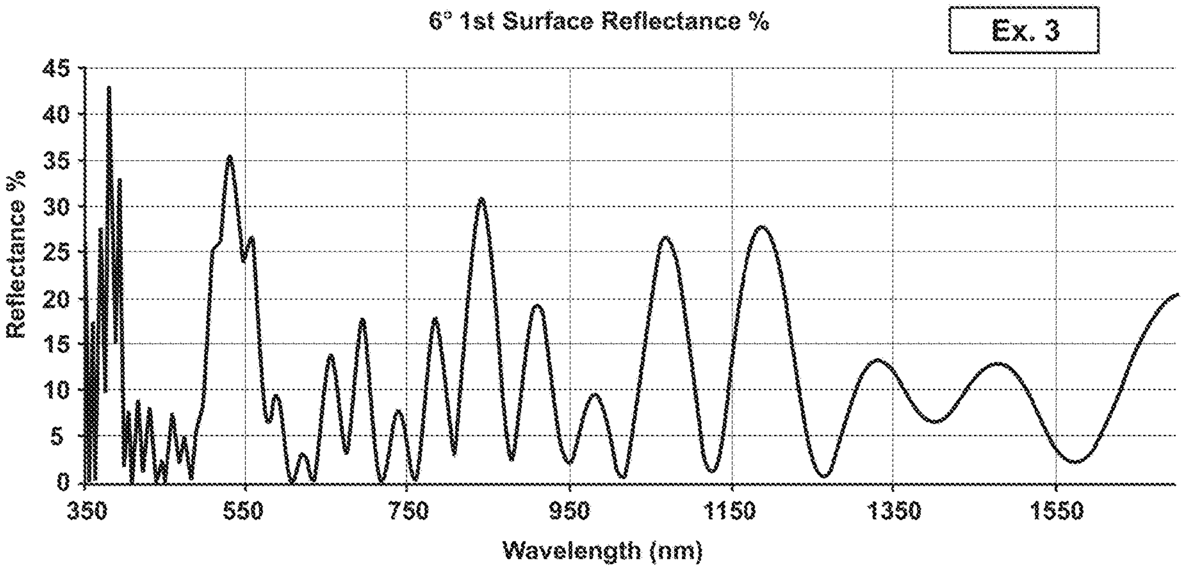
FIG. 6A is a plot of first-surface reflectance over the visible and near-infrared spectrums at a near-normal angle of incidence) (~6° for a cover article of the disclosure.

Referring to FIG. 6A, a plot is provided of first-surface reflectance over the visible and near-infrared spectrums at a near-normal angle of incidence) (~6° for this example cover article. As is evident from the figure, Ex. 3 exhibits a peak reflected wavelength of 532 nm with a reflectance of 35.4% at the peak reflected wavelength.

Figure 6B:
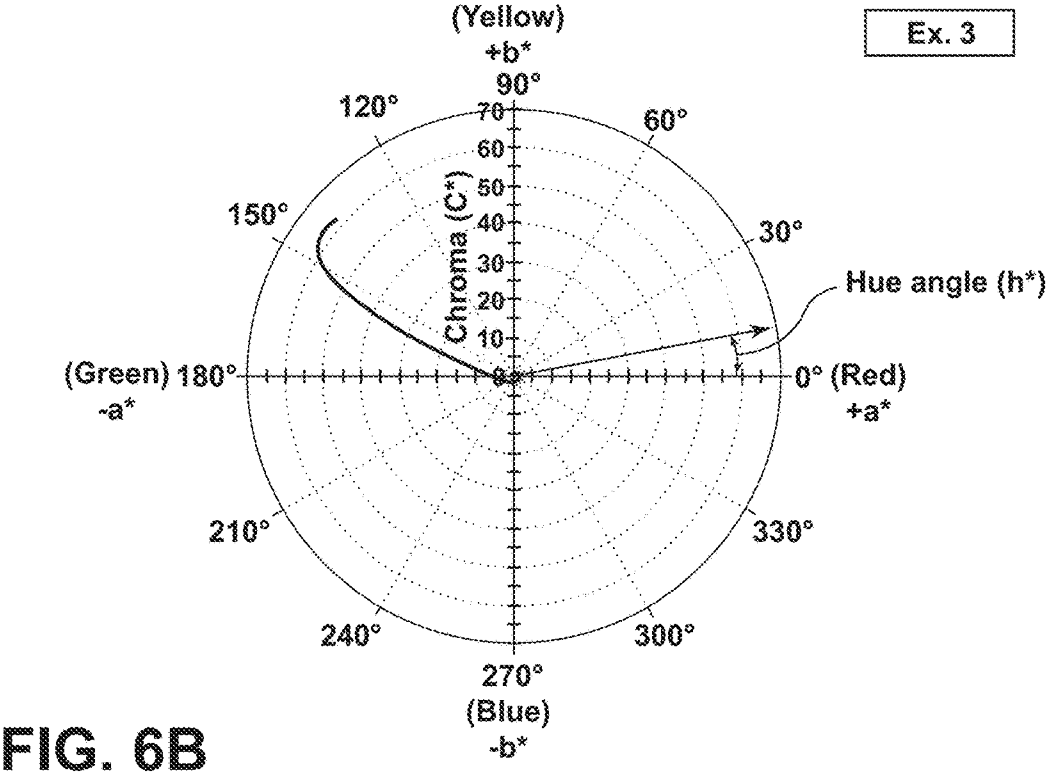
FIG. 6B is a Hue angle (h*) and Chroma (c*) plot over viewing angles from 0° to 90° exhibited by the cover article of FIG. 6A.
Figure 6C:
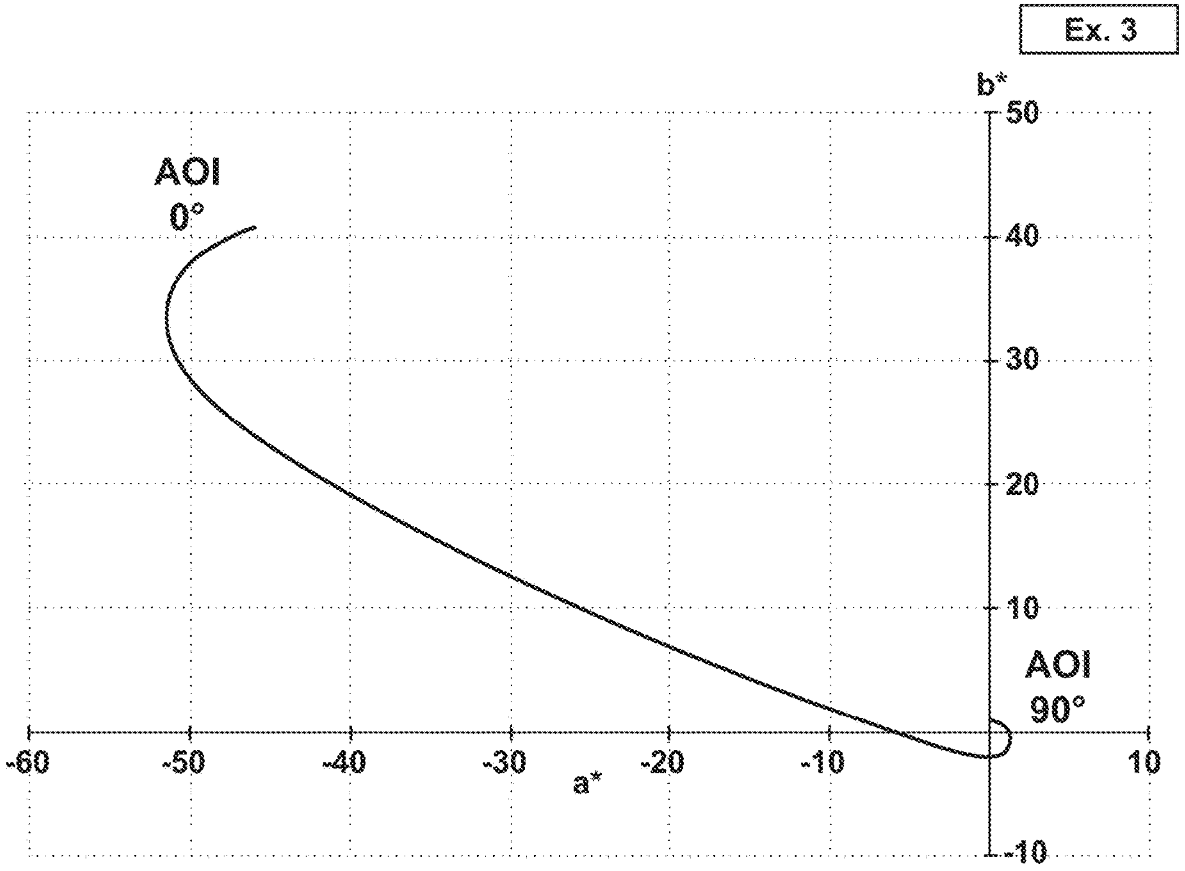
FIG. 6C is a plot of first-surface reflected color (a* and b*) from a D65 illumination source over viewing angles from 0° to 90° exhibited by the cover article of FIG. 6A.

Referring to FIG. 6B, a plot is provided of Hue angle (h*) and Chroma (c*) over viewing angles from 0° to 90° for this example cover article. Further, referring to FIG. 6C, a plot is provided of the first-surface reflected color (a* and b*) from a D65 illumination source over viewing angles from 0° to 90° for this example cover article. As is evident from FIGS. 6B and 6C, this example exhibits a green color with a Hue Angle (h*) from 135-200°, with little to no change in Hue Angle (h*) over the 0-90° viewing angle range, and a high Chroma (c*) value resulting in high saturation. More specifically, this example exhibits a maximum Chroma (c*) of 62.72; a maximum saturation (s*) of 1.36; a variation in Hue Angle (h*) of 1.67° over a viewing angle range from 0-10°; a variation in Hue Angle (h*) of 11.41° over a viewing angle range from 0-30°; a variation in Hue Angle (h+) of 39.13° over a viewing angle range from 0-60°; and a variation in Hue Angle (h+) of 304.15° over a viewing angle range from 0-90°.

TABLE 4

| Ex. 3, Cover Article | | | | |
|---|---|---|---|---|
| Layer | Material | Refractive Index | Extinction Coefficient | Physical Thickness (nm) |
| | Air | 1 | 0 | |
| 1 | $SiO_2$ | 1.47624 | 0 | 85.47 |
| 2 | $SiN_x$ | 2.01355 | 0.00003 | 2000.00 |
| 3 | $SiO_2$ | 1.47624 | 0 | 38.56 |
| 4 | $SiN_x$ | 2.01355 | 0.00003 | 22.55 |
| 5 | $SiO_2$ | 1.47624 | 0 | 20.27 |
| 6 | $SiN_x$ | 2.01355 | 0.00003 | 219.01 |
| 7 | $SiO_2$ | 1.47624 | 0 | 18.72 |
| 8 | $SiN_x$ | 2.01355 | 0.00003 | 119.38 |
| 9 | $SiO_2$ | 1.47624 | 0 | 10.74 |
| 10 | $SiN_x$ | 2.01355 | 0.00003 | 131.96 |
| 11 | $SiO_2$ | 1.47624 | 0 | 15.99 |
| 12 | $SiN_x$ | 2.01355 | 0.00003 | 103.00 |
| 13 | $SiO_2$ | 1.47624 | 0 | 26.59 |
| 14 | $SiN_x$ | 2.01355 | 0.00003 | 122.95 |

TABLE 4-continued

| Ex. 3, Cover Article | | | | |
|---|---|---|---|---|
| Layer | Material | Refractive Index | Extinction Coefficient | Physical Thickness (nm) |
| 15 | $SiO_2$ | 1.47624 | 0 | 234.64 |
| 16 | $SiN_x$ | 2.01355 | 0.00003 | 17.68 |
| 17 | $SiO_2$ | 1.47624 | 0 | 25.00 |
| 18 | Glass - Corning ® Gorilla ® Glass 3 | 1.50628 | 0 | 2.16 mm |
| | Air | 1 | 0 | |
| | Total Thickness of Optical Film Structure | | | 3212.53 |

Example 4

A strengthened glass substrate was coated with the optical film structure of Table 5 below, designated Ex. 4. In particular, the optical film structure of Ex. 4 has a total of 17 layers with a total thickness of 2884.04 nm, including alternating high and low refractive index layers, a low RI layer in contact with the substrate (i.e., layer 17 with a thickness of 25.0 nm) and an oxide-containing capping layer at the outermost position of the stack (i.e., layer 1 with a thickness of 124.93 nm).

Figure 7A:
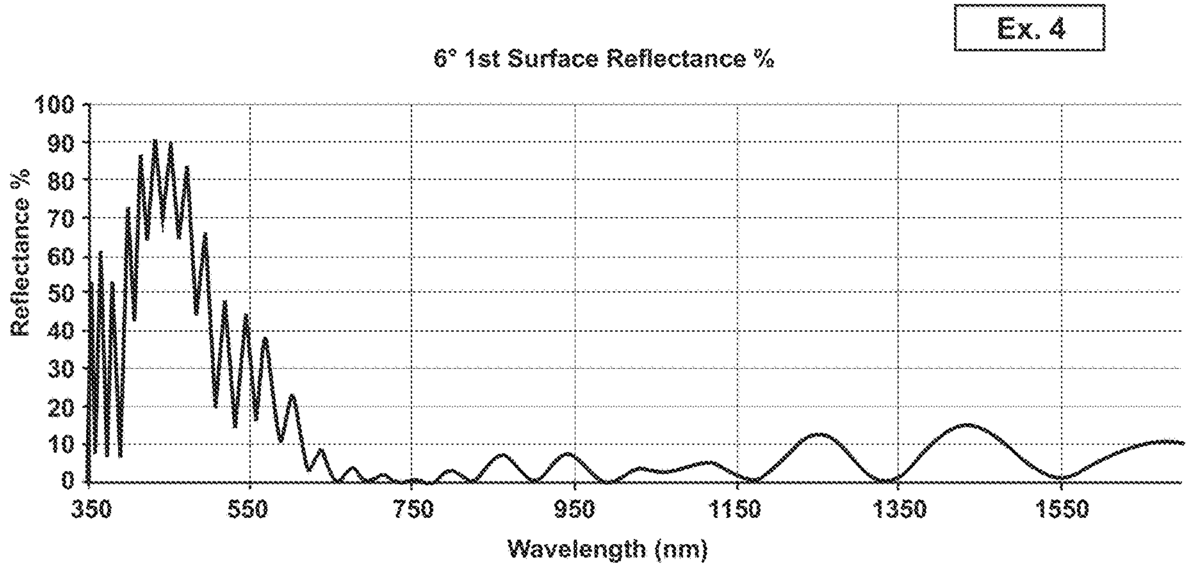
FIG. 7A is a plot of first-surface reflectance over the visible and near-infrared spectrums at a near-normal angle of incidence) (~6° for a cover article of the disclosure.

Referring to FIG. 7A, a plot is provided of first-surface reflectance over the visible and near-infrared spectrums at a near-normal angle of incidence) (~6° for this example cover article. As is evident from the figure, Ex. 4 exhibits a peak reflected wavelength of 435 nm with a reflectance of 90.2% at the peak reflected wavelength.

Figure 7B:
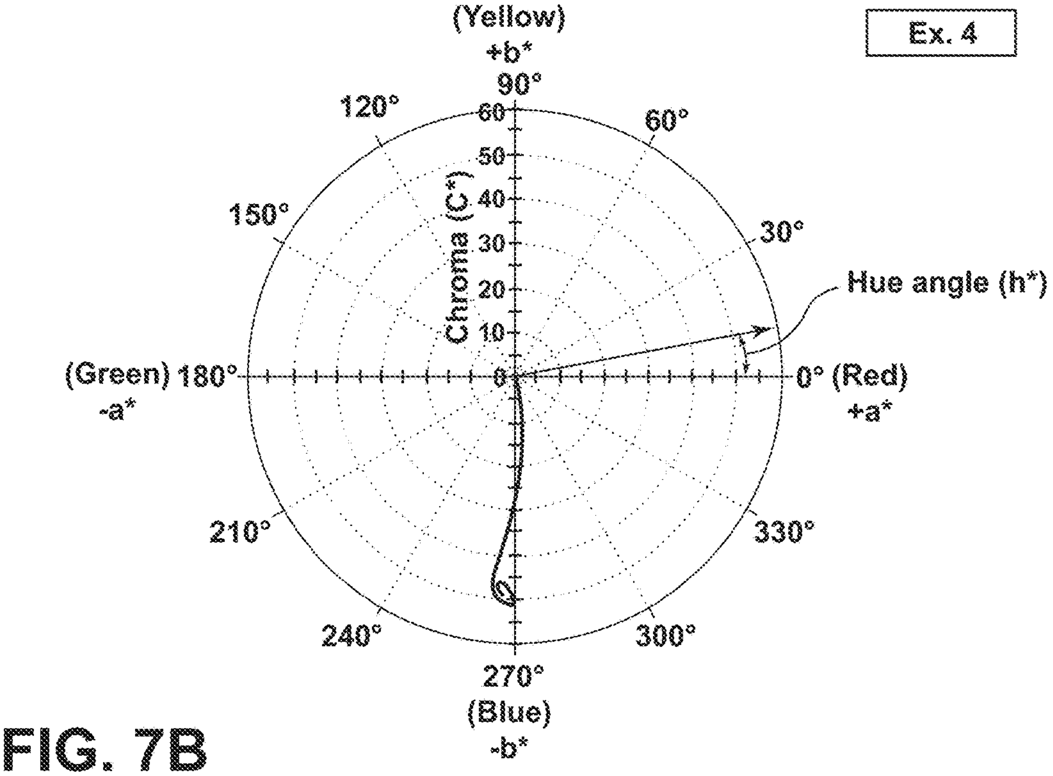
FIG. 7B is a Hue angle (h*) and Chroma (c*) plot over viewing angles from 0° to 90° exhibited by the cover article of FIG. 7A.
Figure 7C:
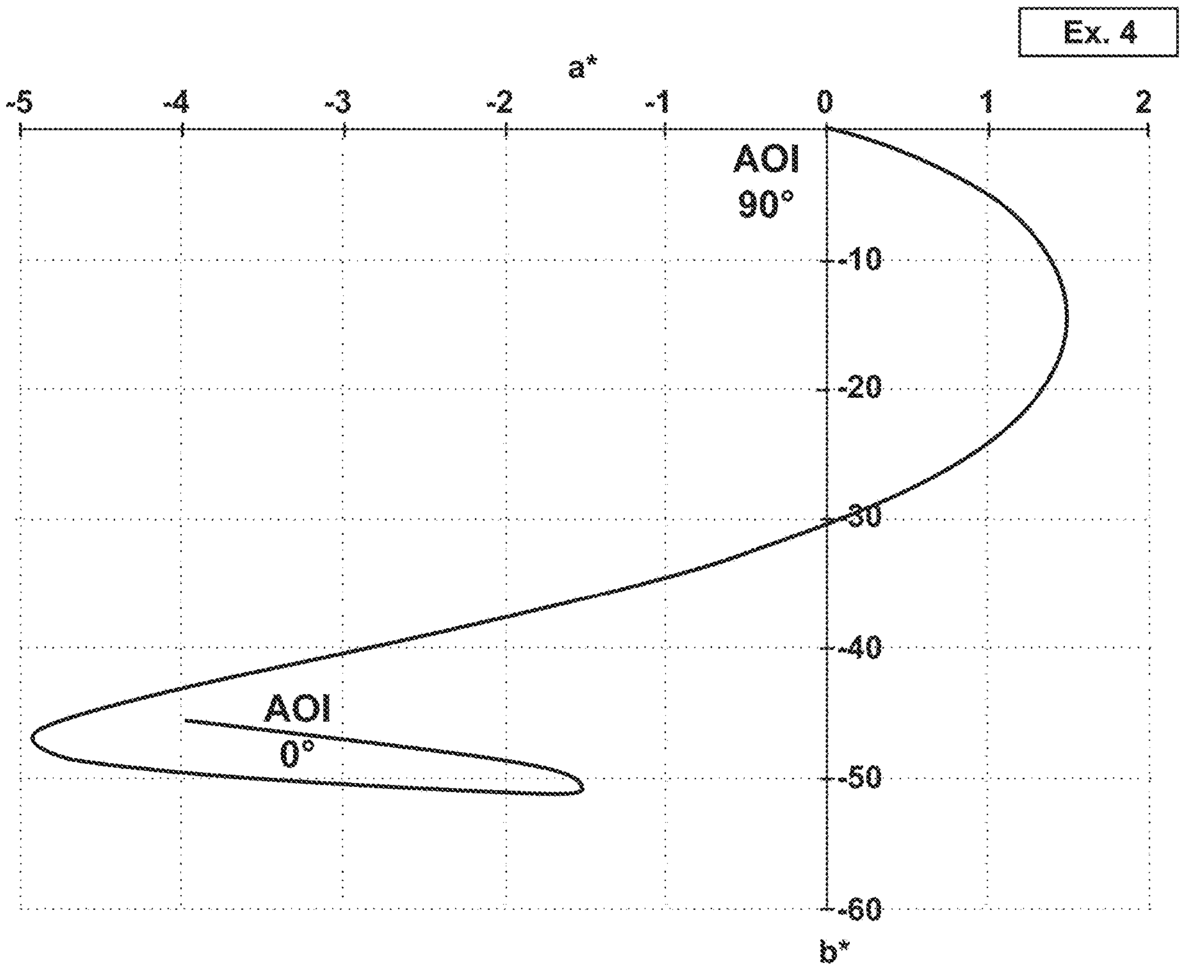
FIG. 7C is a plot of first-surface reflected color (a* and b*) from a D65 illumination source over viewing angles from 0° to 90° exhibited by the cover article of FIG. 7A.

Referring to FIG. 7B, a plot is provided of Hue angle (h*) and Chroma (c*) over viewing angles from 0° to 90° for this example cover article. Further, referring to FIG. 7C, a plot is provided of the first-surface reflected color (a* and b*) from a D65 illumination source over viewing angles from 0° to 90° for this example cover article. As is evident from FIGS. 7B and 7C, this example exhibits a blue or purple color with a Hue Angle (h*) from 200-325°, with little to no change in Hue Angle (h*) over the 0-90° viewing angle range, and a high Chroma (c*) value resulting in high saturation. More specifically, this example exhibits a maximum Chroma (c*) of 51.13; a maximum saturation (s*) of 0.93; a variation in Hue Angle (h*) of 0.86° over a viewing angle range from 0-10°; a variation in Hue Angle (h*) of 3.24° over a viewing angle range from 0-30°; a variation in Hue Angle (h*) of 4.33° over a viewing angle range from 0-60°; and a variation in Hue Angle (h*) of 26.82° over a viewing angle range from 0-90°.

TABLE 5

| Ex. 4, Cover Article | | | | |
|---|---|---|---|---|
| Layer | Material | Refractive Index | Extinction Coefficient | Physical Thickness (nm) |
| | Air | 1 | 0 | |
| 1 | $SiO_2$ | 1.47624 | 0 | 124.93 |
| 2 | $SiN_x$ | 2.01355 | 0.00003 | 2000 |
| 3 | $SiO_2$ | 1.47624 | 0 | 44.1 |
| 4 | $SiN_x$ | 2.01355 | 0.00003 | 46.98 |
| 5 | $SiO_2$ | 1.47624 | 0 | 65.41 |
| 6 | $SiN_x$ | 2.01355 | 0.00003 | 36.83 |
| 7 | $SiO_2$ | 1.47624 | 0 | 8.13 |
| 8 | $SiN_x$ | 2.01355 | 0.00003 | 29.91 |
| 9 | $SiO_2$ | 1.47624 | 0 | 42.11 |
| 10 | $SiN_x$ | 2.01355 | 0.00003 | 56.94 |
| 11 | $SiO_2$ | 1.47624 | 0 | 62.38 |

TABLE 5-continued

| Ex. 4, Cover Article | | | | |
|---|---|---|---|---|
| Layer | Material | Refractive Index | Extinction Coefficient | Physical Thickness (nm) |
| 12 | $SiN_x$ | 2.01355 | 0.00003 | 65.85 |
| 13 | $SiO_2$ | 1.47624 | 0 | 77.39 |
| 14 | $SiN_x$ | 2.01355 | 0.00003 | 66.88 |
| 15 | $SiO_2$ | 1.47624 | 0 | 71.81 |
| 16 | $SiN_x$ | 2.01355 | 0.00003 | 59.39 |
| 17 | $SiO_2$ | 1.47624 | 0 | 25 |
| 18 | Glass - Corning ® Gorilla ® Glass 3 | 1.50628 | 0 | 2.16 mm |
| | Air | 1 | 0 | |
| | Total Thickness of Optical Film Structure | | | 2884.04 |

Example 4A

A strengthened glass substrate was coated with the optical film structure of Table 6 below, designated Ex. 4A. In particular, the optical film structure of Ex. 4A has a total of 17 layers with a total thickness of 2784.11 nm, including alternating high and low refractive index layers, a low RI layer in contact with the substrate (i.e., layer 17 with a thickness of 25.0 nm) and an oxide-containing capping layer at the outermost position of the stack (i.e., layer 1 with a thickness of 25.0 nm). As compared to the cover article of Ex. 4, the cover article in this example (Ex. 4A) possesses a thinner capping layer (25 nm vs. 125 nm), which tends to improve hardness while maintaining strong color performance (e.g., color constancy).

Figure 8A:
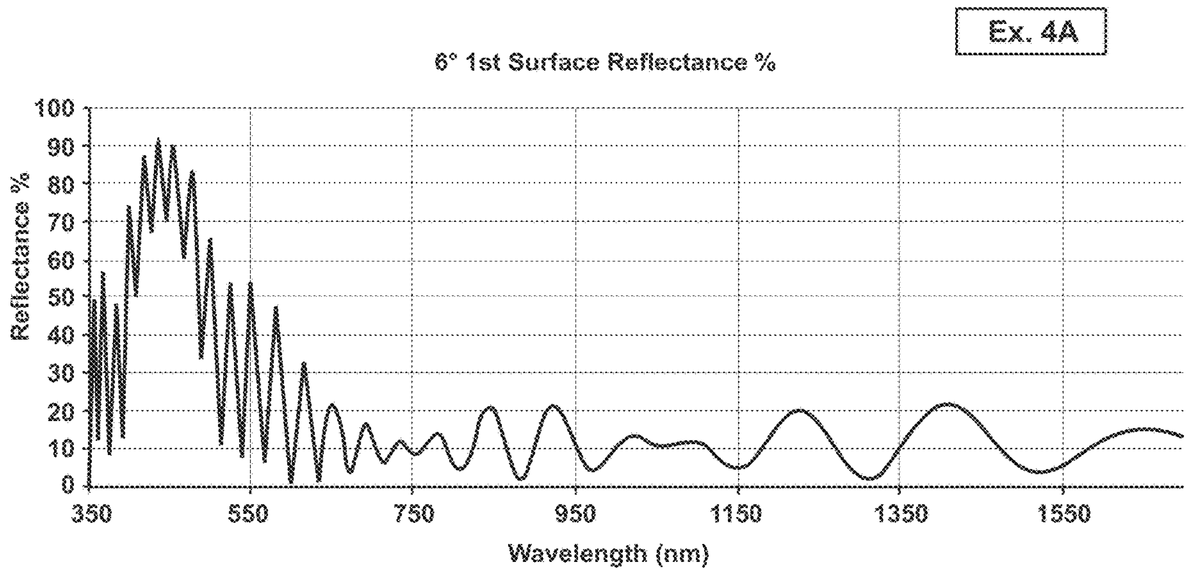
FIG. 8A is a plot of first-surface reflectance over the visible and near-infrared spectrums at a near-normal angle of incidence) (~6° for a cover article of the disclosure.

Referring to FIG. 8A, a plot is provided of first-surface reflectance over the visible and near-infrared spectrums at a near-normal angle of incidence) (~6° for this example cover article. As is evident from the figure, Ex. 4A exhibits a peak reflected wavelength of 439 nm with a reflectance of 90.3% at the peak reflected wavelength.

Figure 8B:
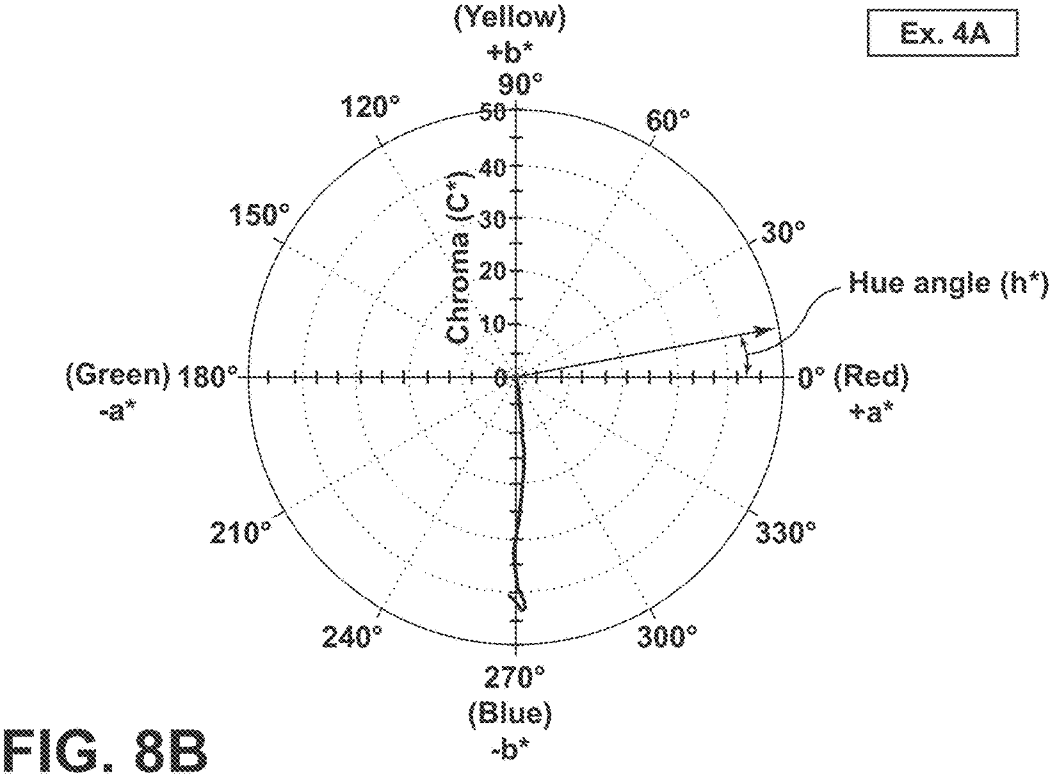
FIG. 8B is a Hue angle (h*) and Chroma (c*) plot over viewing angles from 0° to 90° exhibited by the cover article of FIG. 8A.
Figure 8C:
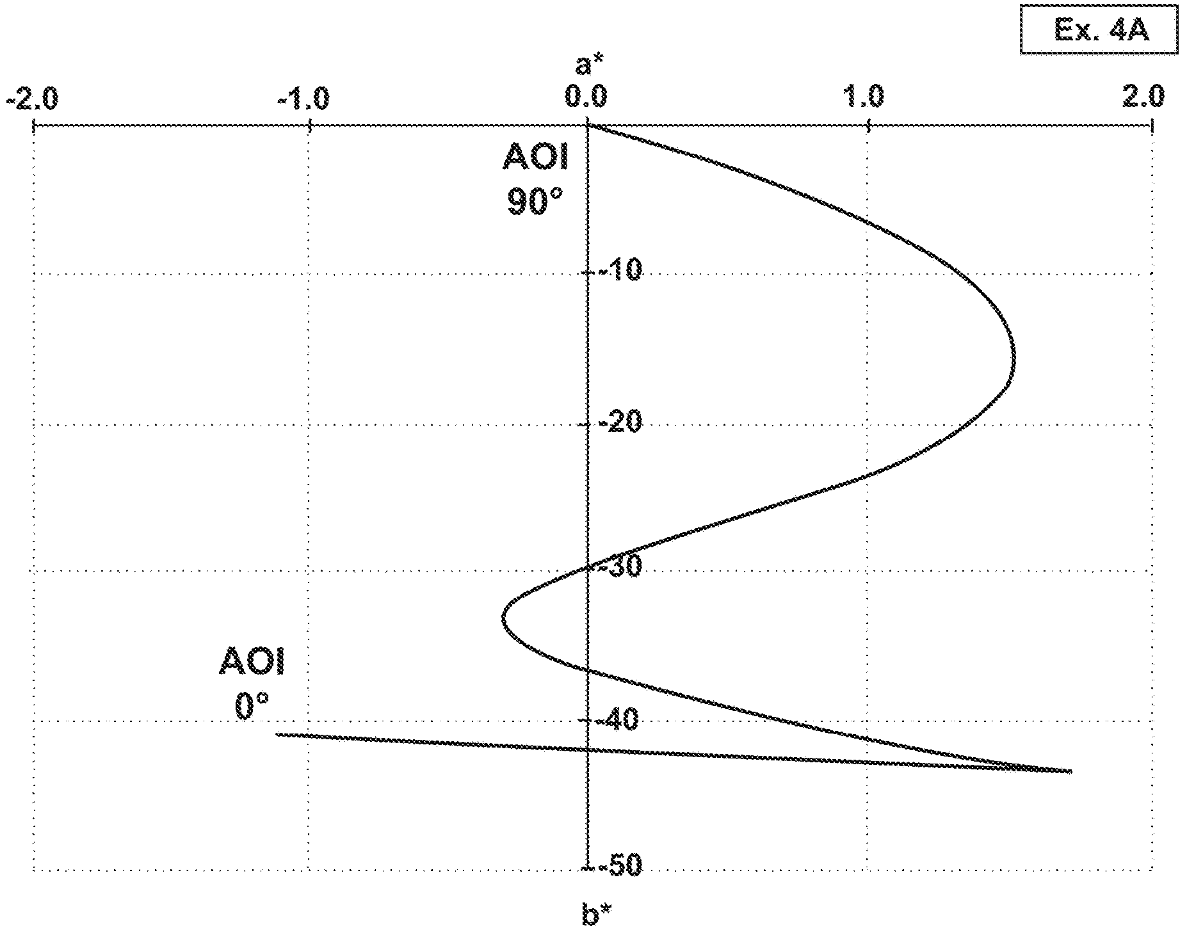
FIG. 8C is a plot of first-surface reflected color (a* and b*) from a D65 illumination source over viewing angles from 0° to 90° exhibited by the cover article of FIG. 8A.

Referring to FIG. 8B, a plot is provided of Hue angle (h*) and Chroma (c*) over viewing angles from 0° to 90° for this example cover article. Further, referring to FIG. 8C, a plot is provided of the first-surface reflected color (a* and b*) from a D65 illumination source over viewing angles from 0° to 90° for this example cover article. As is evident from FIGS. 8B and 8C, this example exhibits a blue or purple color with a Hue Angle (h*) from 200-325°, with little to no change in Hue Angle (h*) over the 0-90° viewing angle range, and a high Chroma (c*) value resulting in high saturation. More specifically, this example exhibits a maximum Chroma (c*) of 43.64; a maximum saturation (s*) of 0.70; a variation in Hue Angle (h*) of 0.95° over a viewing angle range from 0-10°; a variation in Hue Angle (h*) of 3.82° over a viewing angle range from 0-30°; a variation in Hue Angle (h*) of 3.82° over a viewing angle range from 0-60°; and a variation in Hue Angle (h*) of 12.45° over a viewing angle range from 0-90°.

TABLE 6

| Ex. 4A, Cover Article | | | | |
|---|---|---|---|---|
| Layer | Material | Refractive Index | Extinction Coefficient | Physical Thickness (nm) |
| | Air | 1 | 0 | |
| 1 | $SiO_2$ | 1.47624 | 0 | 25 |
| 2 | $SiN_x$ | 2.01355 | 0.00003 | 2000 |
| 3 | $SiO_2$ | 1.47624 | 0 | 44.1 |

TABLE 6-continued

| Ex. 4A, Cover Article | | | | |
|---|---|---|---|---|
| Layer | Material | Refractive Index | Extinction Coefficient | Physical Thickness (nm) |
| 4 | $SiN_x$ | 2.01355 | 0.00003 | 46.98 |
| 5 | $SiO_2$ | 1.47624 | 0 | 65.41 |
| 6 | $SiN_x$ | 2.01355 | 0.00003 | 36.83 |
| 7 | $SiO_2$ | 1.47624 | 0 | 8.13 |
| 8 | $SiN_x$ | 2.01355 | 0.00003 | 29.91 |
| 9 | $SiO_2$ | 1.47624 | 0 | 42.11 |
| 10 | $SiN_x$ | 2.01355 | 0.00003 | 56.94 |
| 11 | $SiO_2$ | 1.47624 | 0 | 62.38 |
| 12 | $SiN_x$ | 2.01355 | 0.00003 | 65.85 |
| 13 | $SiO_2$ | 1.47624 | 0 | 77.39 |
| 14 | $SiN_x$ | 2.01355 | 0.00003 | 66.88 |
| 15 | $SiO_2$ | 1.47624 | 0 | 71.81 |
| 16 | $SiN_x$ | 2.01355 | 0.00003 | 59.39 |
| 17 | $SiO_2$ | 1.47624 | 0 | 25 |
| 18 | Glass - Corning ® Gorilla ® Glass 3 | 1.50628 | 0 | 2.16 mm |
| | Air | 1 | 0 | |
| | Total Thickness of Optical Film Structure | | | 2784.11 |

Example 4B

A strengthened glass-ceramic substrate was coated with the optical film structure of Table 7 below, designated Ex. 4B. In particular, the optical film structure of Ex. 4B has a total of 17 layers with a total thickness of 2884.04 nm, including alternating high and low refractive index layers, a low RI layer in contact with the substrate (i.e., layer 17 with a thickness of 25.0 nm) and an oxide-containing capping layer at the outermost position of the stack (i.e., layer 1 with a thickness of 124.93 nm). As compared to the cover article of Ex. 4, the cover article in this example (Ex. 4B) possesses a strengthened glass-ceramic substrate, while the optical film structures of these examples remain the same.

Figure 10A:
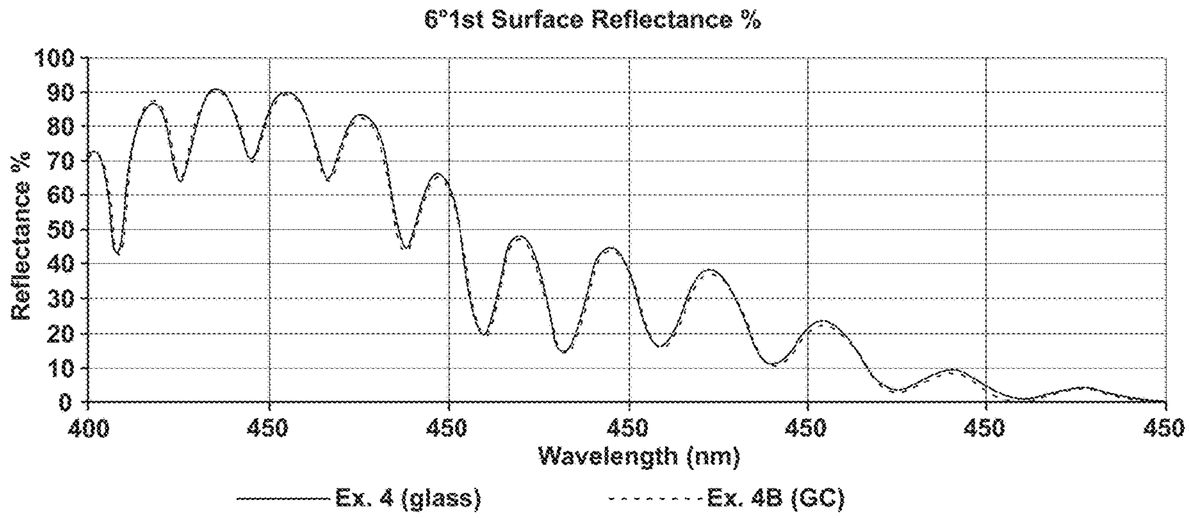
FIG. 10A is a plot of first-surface reflectance over the visible and near-infrared spectrums at a near-normal angle of incidence) (~6° for two cover articles of the disclosure.
Figure 10B:
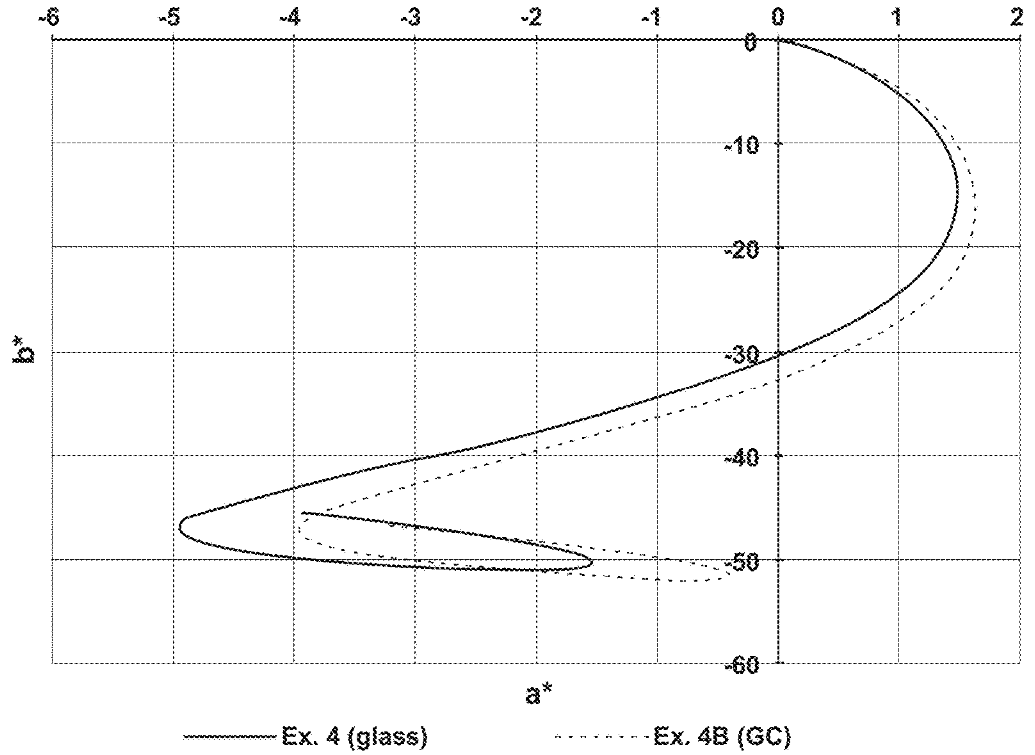
FIG. 10B is a plot of first-surface reflected color (a* and b*) from a D65 illumination source over viewing angles from 0° to 90° exhibited by the cover articles of FIG. 10A.

Referring to FIG. 10A, a plot is provided of first-surface reflectance over the visible and near-infrared spectrums at a near-normal angle of incidence) (~6° for the cover article of this example with a glass-ceramic substrate and the example with a strengthened glass substrate (Ex. 4). Referring to FIG. 10B, a plot is provided of first-surface reflected color (a* and b*) from a D65 illumination source over viewing angles from 0° to 90° exhibited by the two cover articles of this example (i.e., Exs. 4 and 4B). As is evident from FIGS. 10A and 10B, it can be seen that even with the same layer thicknesses of the optical film structure and no further optical tuning that the design performance of this optical film structure design matches almost identically and can easily be applied to glass ceramic substrates.

TABLE 7

| Ex. 4B, Cover Article | | | | |
|---|---|---|---|---|
| Layer | Material | Refractive Index | Extinction Coefficient | Physical Thickness (nm) |
| | Air | 1 | 0 | |
| 1 | $SiO_2$ | 1.47624 | 0 | 124.93 |
| 2 | $SiN_x$ | 2.01355 | 0.00003 | 2000 |
| 3 | $SiO_2$ | 1.47624 | 0 | 44.1 |
| 4 | $SiN_x$ | 2.01355 | 0.00003 | 46.98 |
| 5 | $SiO_2$ | 1.47624 | 0 | 65.41 |
| 6 | $SiN_x$ | 2.01355 | 0.00003 | 36.83 |
| 7 | $SiO_2$ | 1.47624 | 0 | 8.13 |
| 8 | $SiN_x$ | 2.01355 | 0.00003 | 29.91 |

TABLE 7-continued

| Ex. 4B, Cover Article | | | | |
|---|---|---|---|---|
| Layer | Material | Refractive Index | Extinction Coefficient | Physical Thickness (nm) |
| 9 | $SiO_2$ | 1.47624 | 0 | 42.11 |
| 10 | $SiN_x$ | 2.01355 | 0.00003 | 56.94 |
| 11 | $SiO_2$ | 1.47624 | 0 | 62.38 |
| 12 | $SiN_x$ | 2.01355 | 0.00003 | 65.85 |
| 13 | $SiO_2$ | 1.47624 | 0 | 77.39 |
| 14 | $SiN_x$ | 2.01355 | 0.00003 | 66.88 |
| 15 | $SiO_2$ | 1.47624 | 0 | 71.81 |
| 16 | $SiN_x$ | 2.01355 | 0.00003 | 59.39 |
| 17 | $SiO_2$ | 1.47624 | 0 | 25 |
| 18 | Glass ceramic substrate | 1.5516 | 0 | 2.16 mm |
| | Air | 1 | 0 | |
| Total Thickness of Optical Film Structure | | | | 2884.04 |

Example 5

A strengthened glass substrate was coated with the optical film structure of Table 8 below, designated Ex. 5. In particular, the optical film structure of Ex. 5 has a total of 13 layers with a total thickness of 2685.75 nm, including alternating high and low refractive index layers, a low RI layer in contact with the substrate (i.e., layer 13 with a thickness of 25.0 nm) and an oxide-containing capping layer at the outermost position of the stack (i.e., layer 1 with a thickness of 25.0 nm).

Figure 9A:
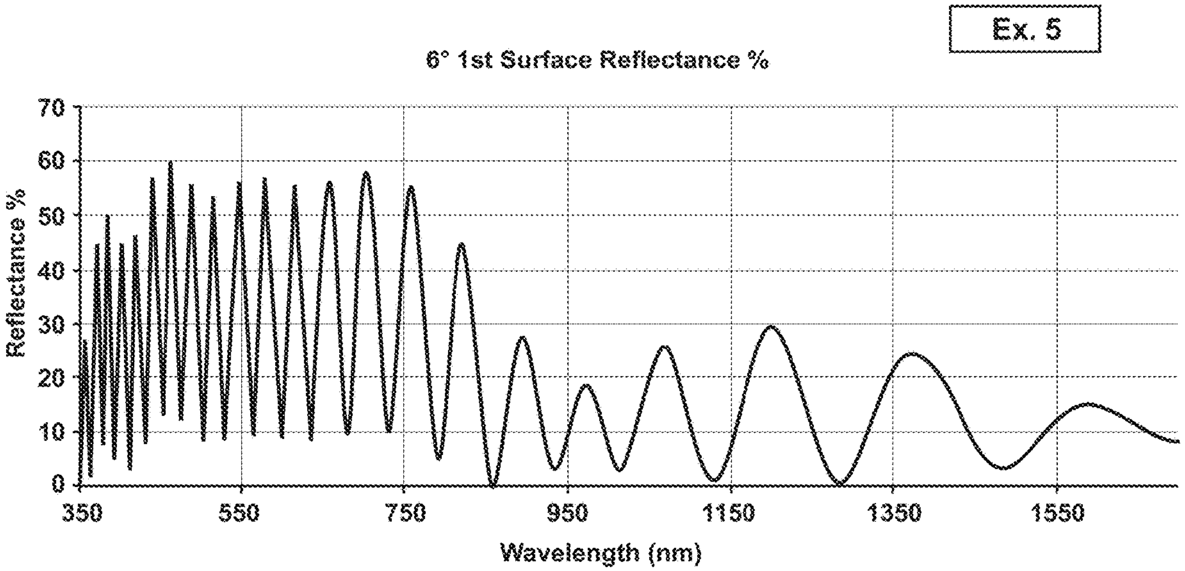
FIG. 9A is a plot of first-surface reflectance over the visible and near-infrared spectrums at a near-normal angle of incidence) (~6° for a cover article of the disclosure.

Referring to FIG. 9A, a plot is provided of first-surface reflectance over the visible and near-infrared spectrums at a near-normal angle of incidence) (~6° for this example cover article. As is evident from the figure, Ex. 5 exhibits an average reflectance across the visible spectrum (400 nm to 700 nm) of 36.05%.

Figure 9B:
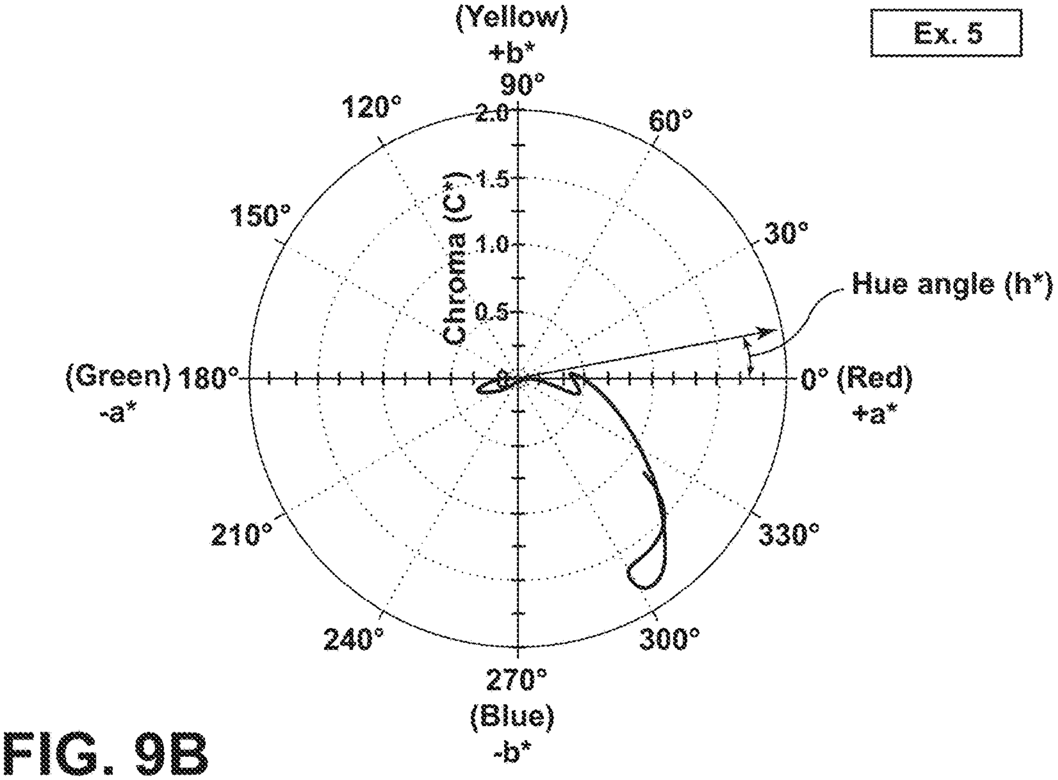
FIG. 9B is a Hue angle (h*) and Chroma (c*) plot over viewing angles from 0° to 90° exhibited by the cover article of FIG. 9A.

Referring to FIG. 9B, a plot is provided of Hue angle (h*) and Chroma (c*) over viewing angles from 0° to 90° for this example cover article. As is evident from FIG. 9B, this example exhibits a grey or silver hue with any Hue Angle (h*) and a max Chroma (c*) of less than 2 over the 0-90° viewing angle range, resulting in low saturation. Notably, the reflected color lies almost entirely on the L* axis which represents the black (0) to white (100) scale. L* values in the middle of this axis range result in a visually perceived silver color. In addition, this example exhibits a maximum Chroma (c*) of 1.84; a maximum saturation (s*) of 0.03; and L* at normal incident of 66.82.

Figure 9C:
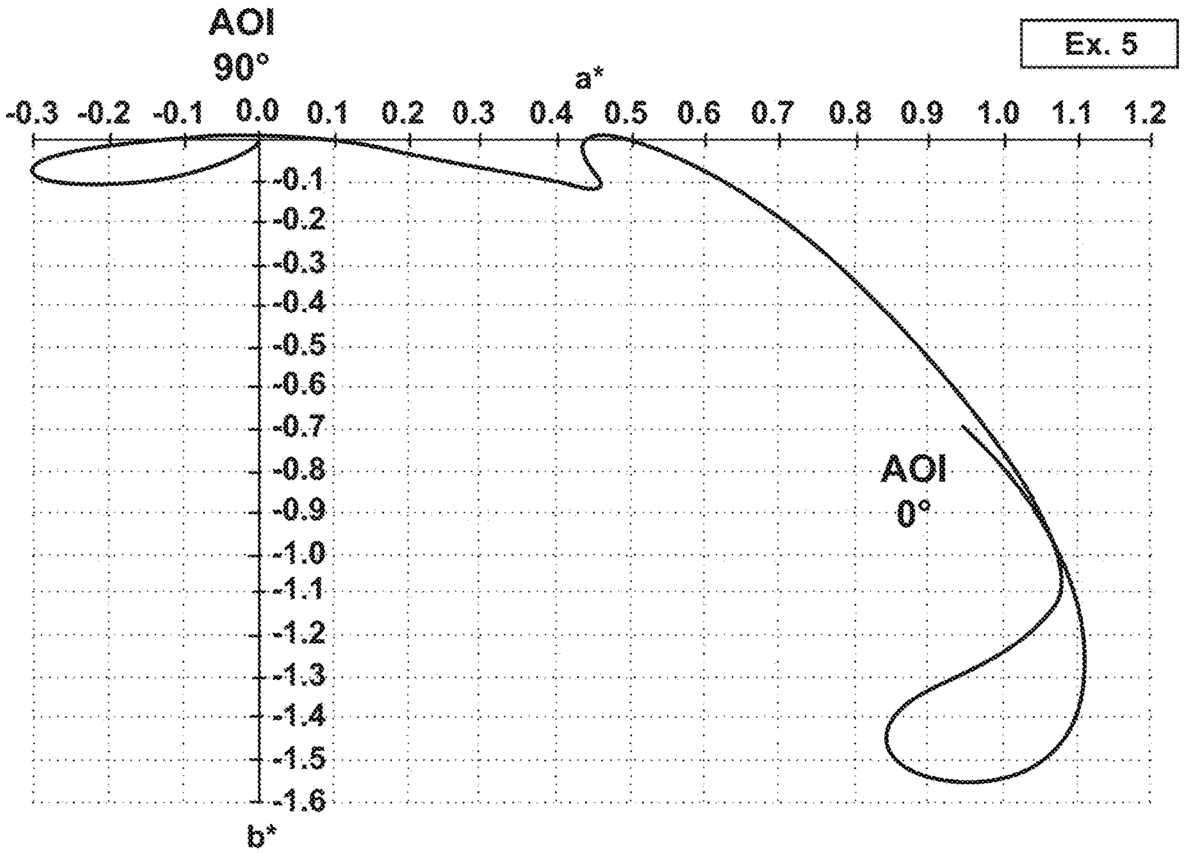
FIG. 9C is a plot of first-surface reflected color (a* and b*) from a D65 illumination source over viewing angles from 0° to 90° exhibited by the cover article of FIG. 9A.

Further, referring to FIG. 9C, a plot is provided of the first-surface reflected color (a* and b*) from a D65 illumination source over viewing angles from 0° to 90° for this example cover article. As is evident from this figure, this design (Ex. 5) shows a* and b* values near the origin at all viewing angles and thus such a low Chroma (c*) (resulting in low saturation) that the reflected color lies almost entirely on the L* axis which represents the black (0) to white (100) scale. L* values in the middle of this axis range result in a visually perceived silver color. Further, the Δ color a*b* (viewing angle) 0-30°= $\sqrt{(a_{max}^*-a_{min}^*)+(b_{max}^*-b_{min}^*)^2}=0.84$ (very little variation in color) for this example, as evident from FIG. 9C.

TABLE 8

| Ex. 5, Cover Article | | | | |
|---|---|---|---|---|
| Layer | Material | Refractive Index | Extinction Coefficient | Physical Thickness (nm) |
| | Air | 1 | 0 | |
| 1 | $SiO_2$ | 1.47624 | 0 | 25.00 |
| 2 | $SiN_x$ | 2.01355 | 0.00003 | 2000.00 |
| 3 | $SiO_2$ | 1.47624 | 0 | 56.60 |
| 4 | $SiN_x$ | 2.01355 | 0.00003 | 43.51 |
| 5 | $SiO_2$ | 1.47624 | 0 | 62.92 |
| 6 | $SiN_x$ | 2.01355 | 0.00003 | 78.84 |
| 7 | $SiO_2$ | 1.47624 | 0 | 91.43 |
| 8 | $SiN_x$ | 2.01355 | 0.00003 | 60.30 |
| 9 | $SiO_2$ | 1.47624 | 0 | 8.03 |
| 10 | $SiN_x$ | 2.01355 | 0.00003 | 15.52 |
| 11 | $SiO_2$ | 1.47624 | 0 | 112.09 |
| 12 | $SiN_x$ | 2.01355 | 0.00003 | 106.53 |
| 13 | $SiO_2$ | 1.47624 | 0 | 25.00 |
| 14 | Glass - Corning ® Gorilla ® Glass 3 | 1.50628 | 0 | 2.16 mm |
| | Air | 1 | 0 | |
| Total Thickness of Optical Film Structure | | | | 2685.75 |

Example 6

A strengthened glass substrate was coated with the optical film structure of Table 9 below, designated Ex. 6. In particular, the optical film structure of Ex. 6 has a total of 7 layers with a total thickness of 624.29 nm, including alternating high and low refractive index layers, a low RI layer in contact with the substrate (i.e., layer 7 with a thickness of 25.0 nm) and an oxide-containing capping layer at the outermost position of the stack (i.e., layer 1 with a thickness of 81.52 nm). Further, the optical film structure in Ex. 6 has a total of 56.21% high index material.

Figure 11A:
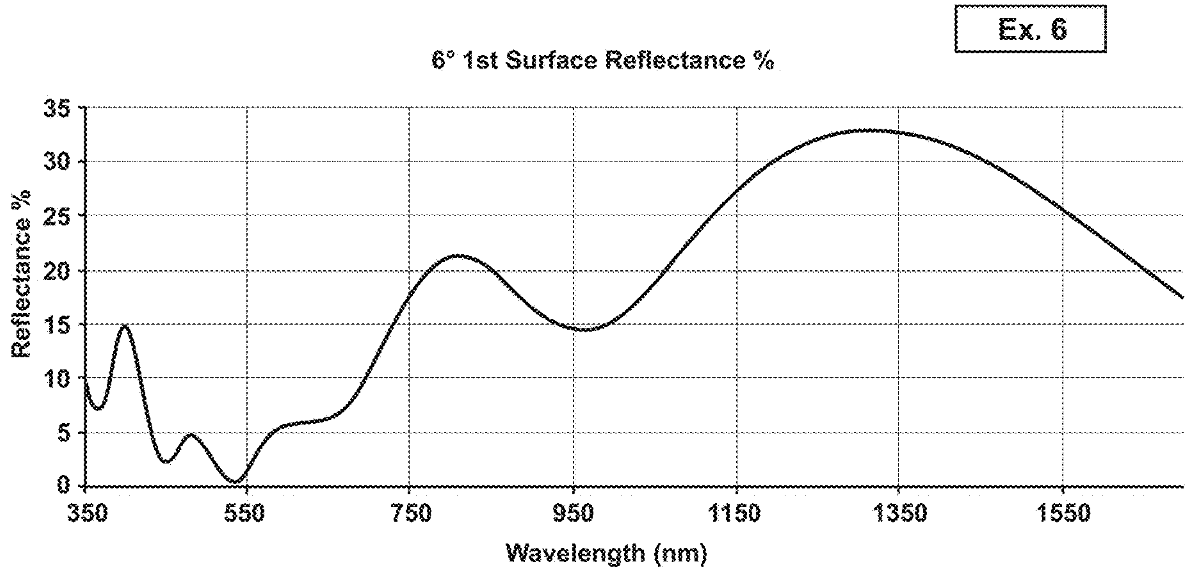
FIG. 11A is a plot of first-surface reflectance over the visible and near-infrared spectrums at a near-normal angle of incidence) (~6° for a cover article of the disclosure.

Referring to FIG. 11A, a plot is provided of first-surface reflectance over the visible and near-infrared spectrums at a near-normal angle of incidence) (~6° for this example cover article. As is evident from the figure, Ex. 6 exhibits a peak reflected wavelength of 700 nm with a reflectance of 56.21% at the peak reflected wavelength.

Figure 11B:
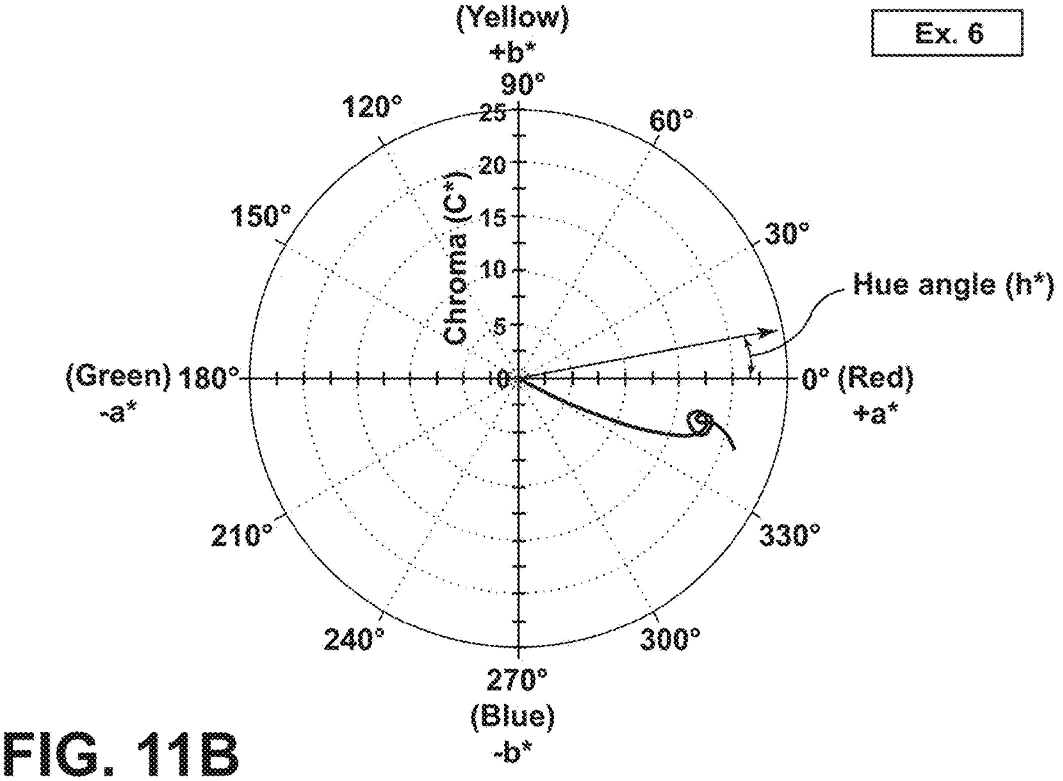
FIG. 11B is a Hue angle (h*) and Chroma (c*) plot over viewing angles from 0° to 90° exhibited by the cover article of FIG. 11A.
Figure 11C:
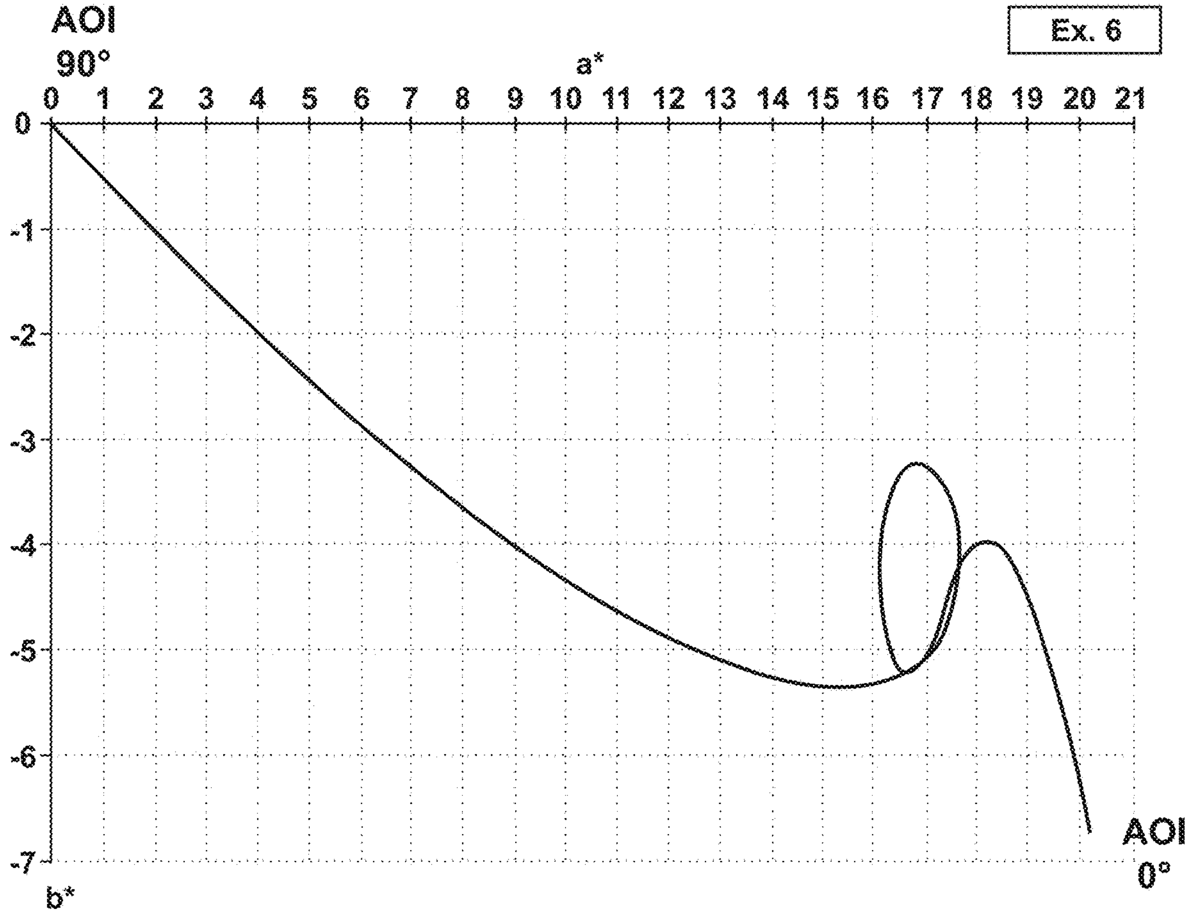
FIG. 11C is a plot of first-surface reflected color (a* and b*) from a D65 illumination source over viewing angles from 0° to 90° exhibited by the cover article of FIG. 11A.

Referring to FIG. 11B, a plot is provided of Hue angle (h*) and Chroma (c*) over viewing angles from 0° to 90° for this example cover article. Further, referring to FIG. 11C, a plot is provided of the first-surface reflected color (a* and b*) from a D65 illumination source over viewing angles from 0° to 90° for this example cover article. As is evident from FIGS. 11B and 11C, this example exhibits a pink color with a Hue Angle (h*) from 320-40°, with little to no change in Hue Angle (h*) over the 0-90° viewing angle range, and a high Chroma (c*) value resulting in high saturation. More specifically, this example exhibits a maximum Chroma (c*) of 21.27; a maximum saturation (s*) of 1.07; a variation in Hue Angle (h*) of 2.02° over a viewing angle range from 0-10°; a variation in Hue Angle (h*) of 6.16° over a viewing angle range from 0-30°; a variation in Hue Angle (h*) of 6.82° over a viewing angle range from 0-60°; and a variation in Hue Angle (h*) of 16.44° over a viewing angle range from 0-90°.

TABLE 9

| Ex. 6, Cover Article | | | | |
|---|---|---|---|---|
| Layer | Material | Refractive Index | Extinction Coefficient | Physical Thickness (nm) |
| | Air | 1 | 0 | |
| 1 | $SiO_2$ | 1.4501 | 0 | 81.52 |
| 2 | $SiO_xN_y$ | 2.04295 | 0.00015 | 112.68 |
| 3 | $SiO_2$ | 1.4501 | 0 | 158.85 |
| 4 | $SiO_xN_y$ | 2.04295 | 0.00015 | 65.65 |
| 5 | $SiO_2$ | 1.4501 | 0 | 8.01 |
| 6 | $SiO_xN_y$ | 2.04295 | 0.00015 | 172.57 |
| 7 | $SiO_2$ | 1.4501 | 0 | 25.00 |
| 8 | Glass - Corning ® Gorilla ® Glass 3 | 1.50628 | 0 | .33 mm |
| | Air | 1 | 0 | |
| | Total Thickness of Optical Film Structure | | | 624.29 |

Example 7

A strengthened glass substrate was coated with the optical film structure of Table 10 below, designated Ex. 7. In particular, the optical film structure of Ex. 7 has a total of 5 layers with a total thickness of 636.94 nm, including alternating high and low refractive index layers, a low RI layer in contact with the substrate (i.e., layer 5 with a thickness of 25.0 nm) and an oxide-containing capping layer at the outermost position of the stack (i.e., layer 1 with a thickness of 92.27 nm). Further, the optical film structure in Ex. 7 has a total of 76.23% high index material.

Figure 12A:
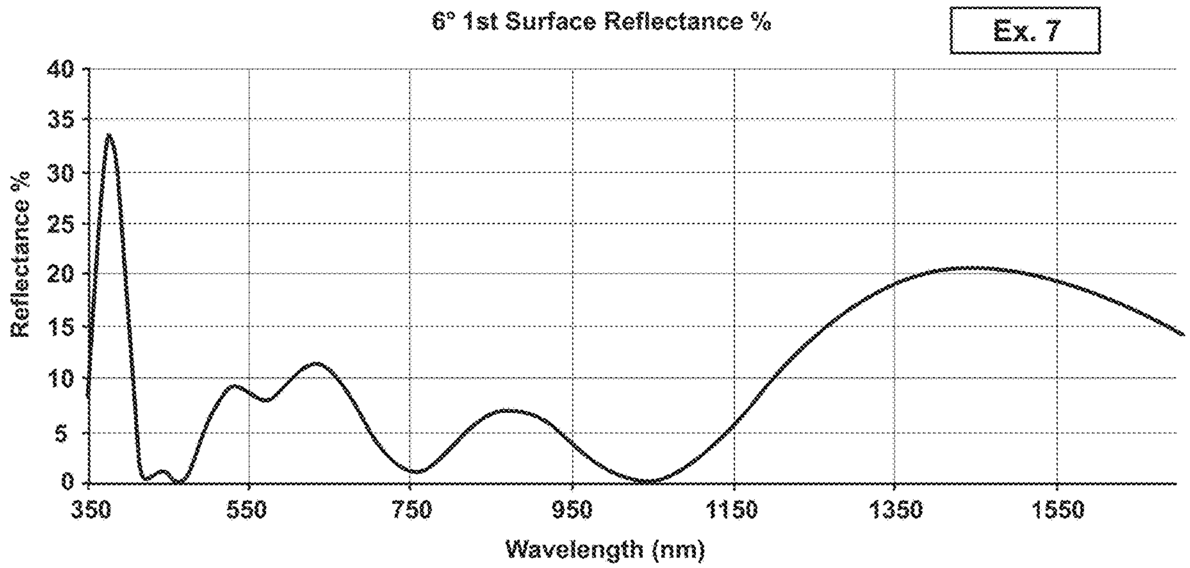
FIG. 12A is a plot of first-surface reflectance over the visible and near-infrared spectrums at a near-normal angle of incidence) (~6° for a cover article of the disclosure.

Referring to FIG. 12A, a plot is provided of first-surface reflectance over the visible and near-infrared spectrums at a near-normal angle of incidence) (~6° for this example cover article. As is evident from the figure, Ex. 7 exhibits a peak reflected wavelength of 632 nm with a reflectance of 11.4% at the peak reflected wavelength.

Figure 12B:
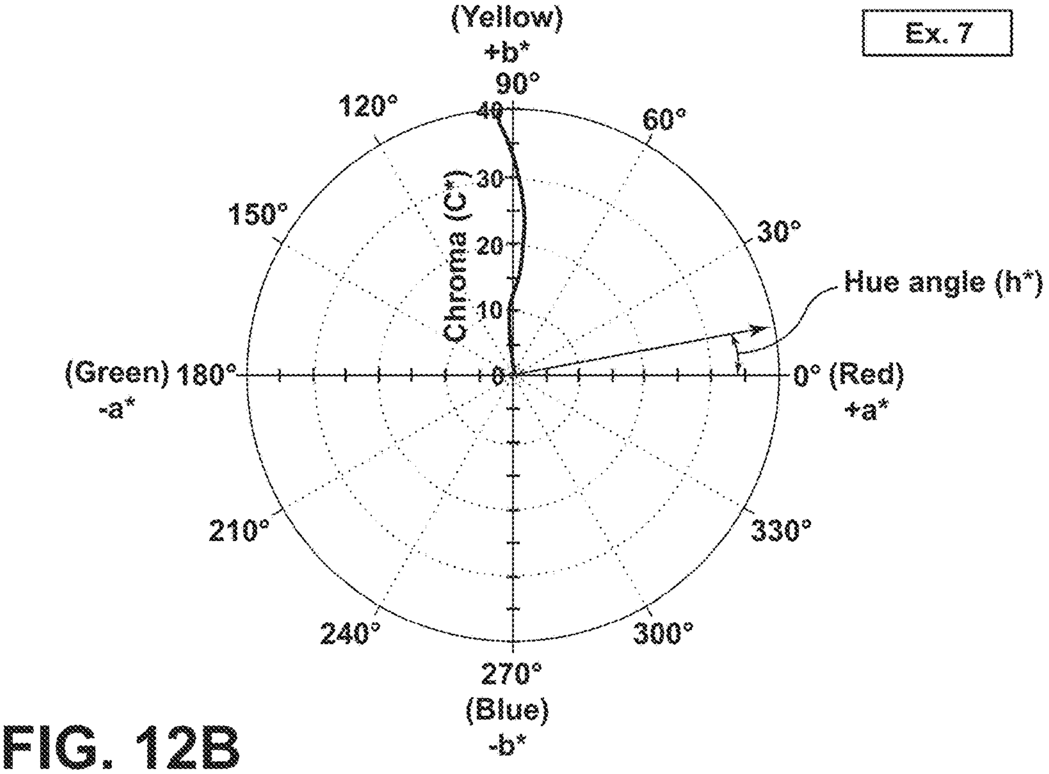
FIG. 12B is a Hue angle (h*) and Chroma (c*) plot over viewing angles from 0° to 90° exhibited by the cover article of FIG. 12A.
Figure 12C:
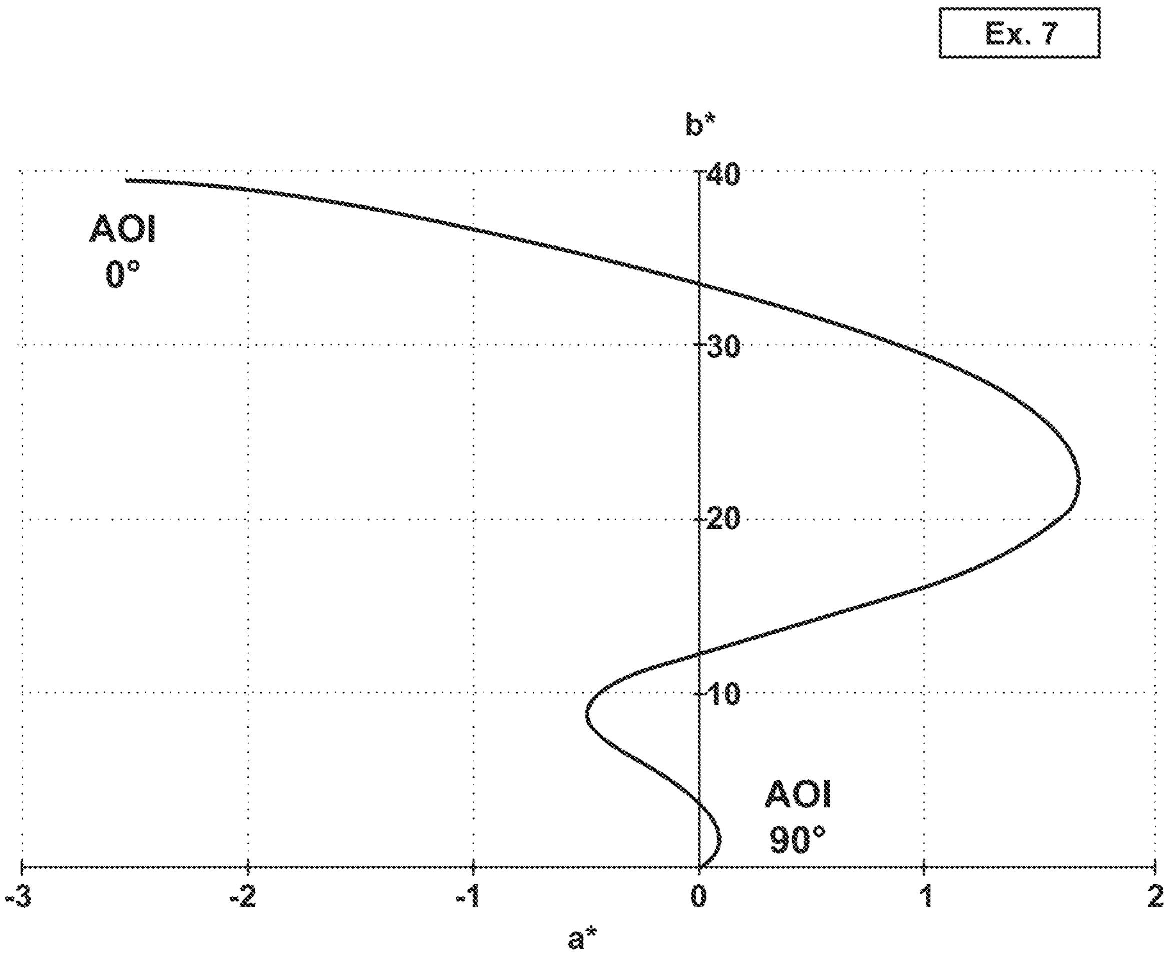
FIG. 12C is a plot of first-surface reflected color (a* and b*) from a D65 illumination source over viewing angles from 0° to 90° exhibited by the cover article of FIG. 12A.

Referring to FIG. 12B, a plot is provided of Hue angle (h*) and Chroma (c*) over viewing angles from 0° to 90° for this example cover article. Further, referring to FIG. 12C, a plot is provided of the first-surface reflected color (a* and b*) from a D65 illumination source over viewing angles from 0° to 90° for this example cover article. As is evident from FIGS. 12B and 12C, this example exhibits a yellow color with a Hue Angle (h*) from 40-125°, with little to no change in Hue Angle (h*) over the 0-90° viewing angle range, and a high Chroma (c*) value resulting in high saturation. More specifically, this example exhibits a maximum Chroma (c*) of 39.49; a maximum saturation (s*) of 1.15; a variation in Hue Angle (h*) of 0.12° over a viewing angle range from 0-10°; a variation in Hue Angle (h*) of 2.84° over a viewing angle range from 0-30°; a variation in Hue Angle (h*) of 8.21° over a viewing angle range from 0-60°; and a variation in Hue Angle (h*) of 9.30° over a viewing angle range from 0-90°.

TABLE 10

| Ex. 7, Cover Article | | | | |
|---|---|---|---|---|
| Layer | Material | Refractive Index | Extinction Coefficient | Physical Thickness (nm) |
| | Air | 1 | 0 | |
| 1 | $SiO_2$ | 1.4501 | 0 | 92.27 |
| 2 | $SiO_xN_y$ | 2.02562 | 0.00029 | 247.49 |
| 3 | $SiO_2$ | 1.4501 | 0 | 34.10 |
| 4 | $SiO_xN_y$ | 2.02562 | 0.00029 | 238.07 |

TABLE 10-continued

| Ex. 7, Cover Article | | | | |
|---|---|---|---|---|
| Layer | Material | Refractive Index | Extinction Coefficient | Physical Thickness (nm) |
| 5 | $SiO_2$ | 1.4501 | 0 | 25.00 |
| 6 | Glass - Corning ® Gorilla ® Glass 3 | 1.50628 | 0 | .33 mm |
| | Air | 1 | 0 | |
| | Total Thickness of Optical Film Structure | | | 636.94 |

Example 8

A strengthened glass substrate was coated with the optical film structure of Table 11 below, designated Ex. 8. In particular, the optical film structure of Ex. 8 has a total of 7 layers with a total thickness of 686.55 nm, including alternating high and low refractive index layers, a low RI layer in contact with the substrate (i.e., layer 7 with a thickness of 25.0 nm) and an oxide-containing capping layer at the outermost position of the stack (i.e., layer 1 with a thickness of 12.62 nm). Further, the optical film structure in Ex. 8 has a total of 64.51% high index material.

Figure 13A:
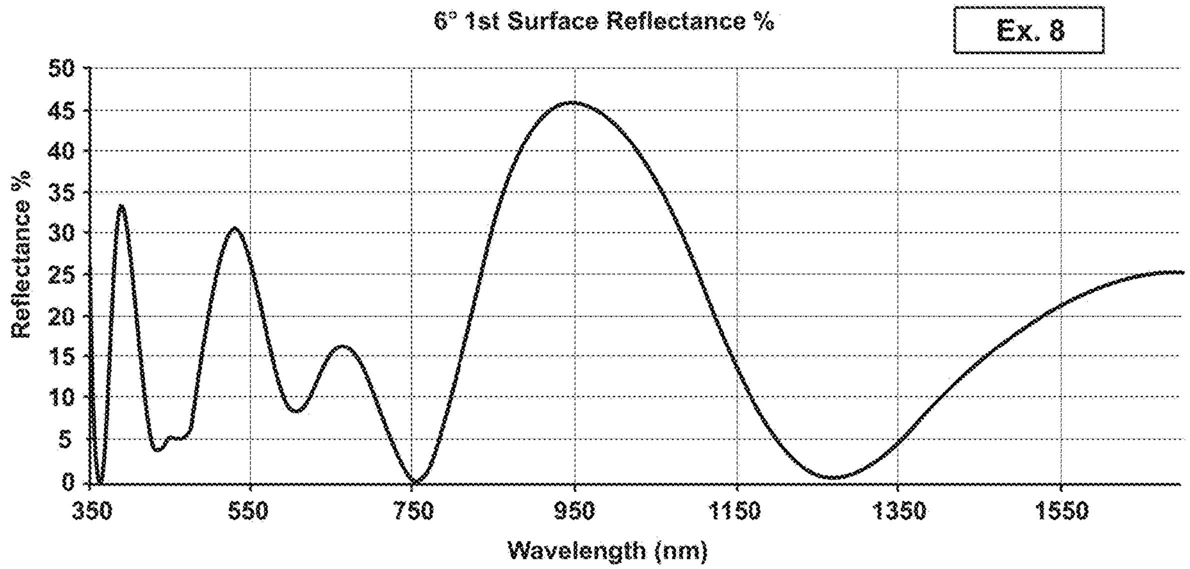
FIG. 13A is a plot of first-surface reflectance over the visible and near-infrared spectrums at a near-normal angle of incidence) (~6° for a cover article of the disclosure.

Referring to FIG. 13A, a plot is provided of first-surface reflectance over the visible and near-infrared spectrums at a near-normal angle of incidence) (~6° for this example cover article. As is evident from the figure, Ex. 8 exhibits a peak reflected wavelength of 529 nm with a reflectance of 30.5% at the peak reflected wavelength.

Figure 13B:
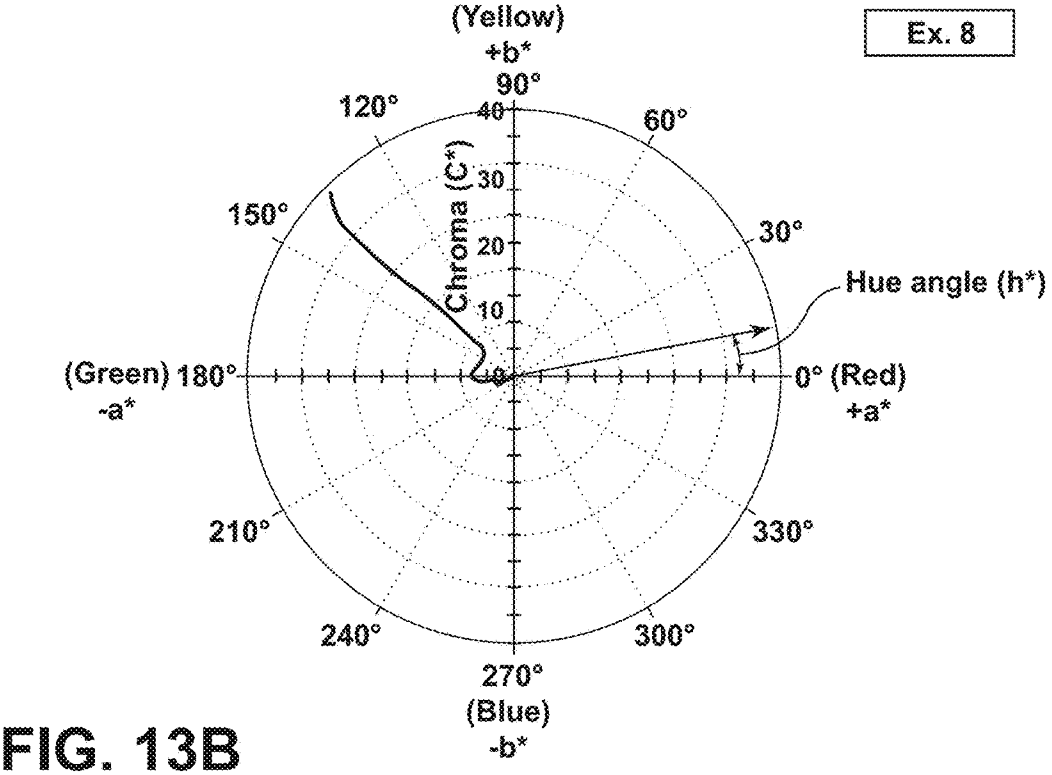
FIG. 13B is a Hue angle (h*) and Chroma (c*) plot over viewing angles from 0° to 90° exhibited by the cover article of FIG. 13A.
Figure 13C:
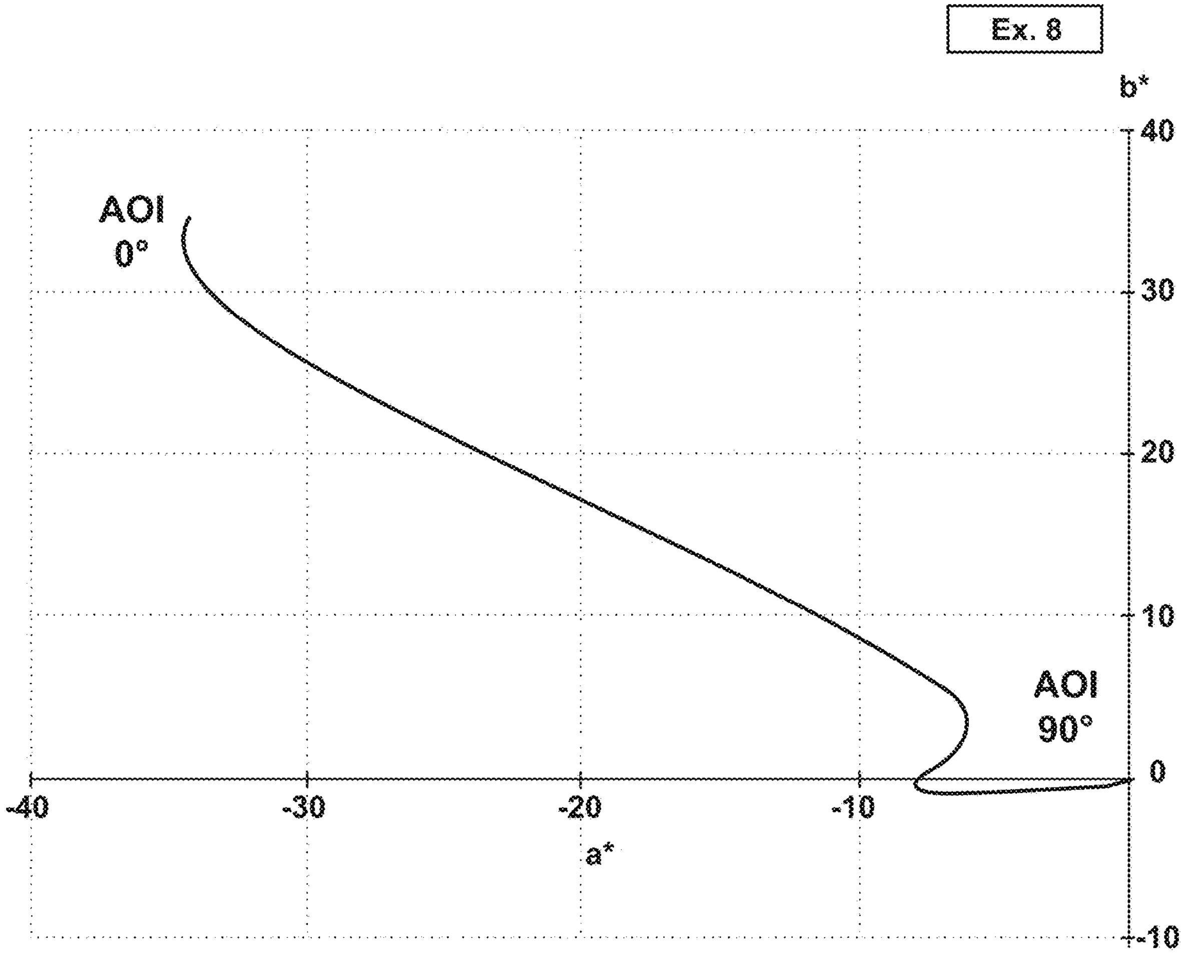
FIG. 13C is a plot of first-surface reflected color (a* and b*) from a D65 illumination source over viewing angles from 0° to 90° exhibited by the cover article of FIG. 13A.

Referring to FIG. 13B, a plot is provided of Hue angle (h*) and Chroma (c*) over viewing angles from 0° to 90° for this example cover article. Further, referring to FIG. 13C, a plot is provided of the first-surface reflected color (a* and b*) from a D65 illumination source over viewing angles from 0° to 90° for this example cover article. As is evident from FIGS. 13B and 13C, this example exhibits a green color with a Hue Angle (h*) from 135-200°, with little to no change in Hue Angle (h*) over the 0-90° viewing angle range, and a high Chroma (c*) value resulting in high saturation. More specifically, this example exhibits a maximum Chroma (c*) of 48.59; a maximum saturation (s*) of 0.95; a variation in Hue Angle (h*) of 0.91° over a viewing angle range from 0-10°; a variation in Hue Angle (h*) of 4.83° over a viewing angle range from 0-30°; a variation in Hue Angle (h*) of 26.42° over a viewing angle range from 0-60°; and a variation in Hue Angle (h*) of 105.27° over a viewing angle range from 0-90°.

TABLE 11

| Ex. 8, Cover Article | | | | |
|---|---|---|---|---|
| Layer | Material | Refractive Index | Extinction Coefficient | Physical Thickness (nm) |
| | Air | 1 | 0 | |
| 1 | $SiO_2$ | 1.4501 | 0 | 12.62 |
| 2 | $SiO_xN_y$ | 2.04295 | 0.00015 | 216.65 |
| 3 | $SiO_2$ | 1.4501 | 0 | 13.48 |
| 4 | $SiO_xN_y$ | 2.04295 | 0.00015 | 108.54 |
| 5 | $SiO_2$ | 1.4501 | 0 | 192.57 |
| 6 | $SiO_xN_y$ | 2.04295 | 0.00015 | 117.69 |

TABLE 11-continued

| Ex. 8, Cover Article | | | | |
|---|---|---|---|---|
| Layer | Material | Refractive Index | Extinction Coefficient | Physical Thickness (nm) |
| 7 | $SiO_2$ | 1.4501 | 0 | 25.00 |
| 8 | Glass - Corning ® Gorilla ® Glass 3 | 1.50628 | 0 | .33 mm |
| | Air | 1 | 0 | |
| | Total Thickness of Optical Film Structure | | | 686.55 |

Example 9

A strengthened glass substrate was coated with the optical film structure of Table 12 below, designated Ex. 9. In particular, the optical film structure of Ex. 9 has a total of 7 layers with a total thickness of 458.83 nm, including alternating high and low refractive index layers, a low RI layer in contact with the substrate (i.e., layer 7 with a thickness of 25.25 nm) and an oxide-containing capping layer at the outermost position of the stack (i.e., layer 1 with a thickness of 8.00 nm). Further, the optical film structure in Ex. 9 has a total of 71.13% high index material.

Figure 14A:
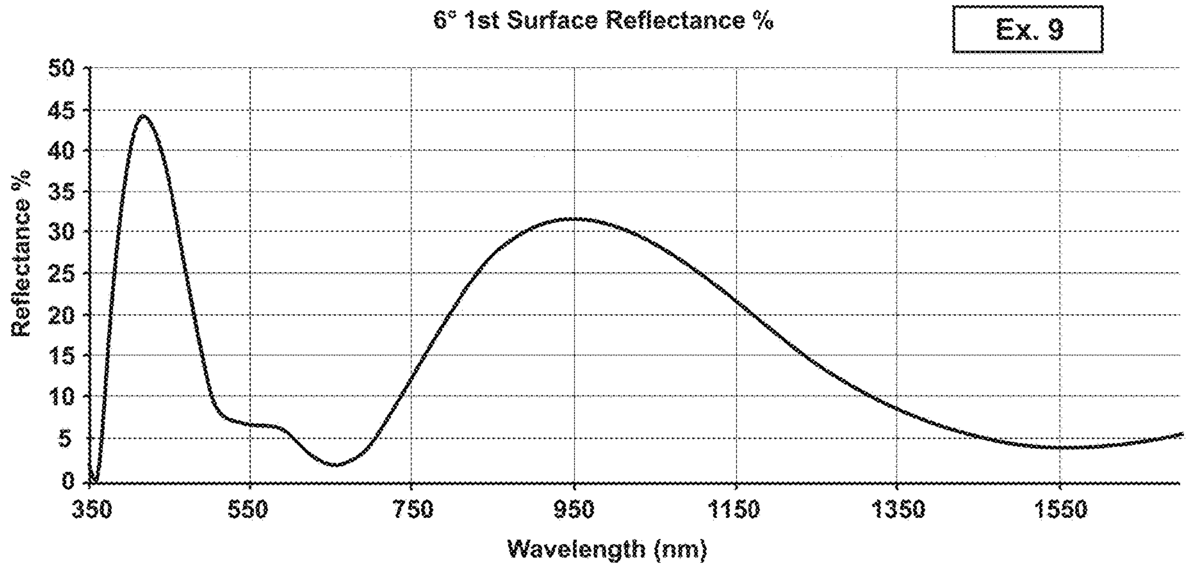
FIG. 14A is a plot of first-surface reflectance over the visible and near-infrared spectrums at a near-normal angle of incidence) (~6° for a cover article of the disclosure.

Referring to FIG. 14A, a plot is provided of first-surface reflectance over the visible and near-infrared spectrums at a near-normal angle of incidence) (~6° for this example cover article. As is evident from the figure, Ex. 9 exhibits a peak reflected wavelength of 418 nm with a reflectance of 43.9% at the peak reflected wavelength.

Figure 14B:
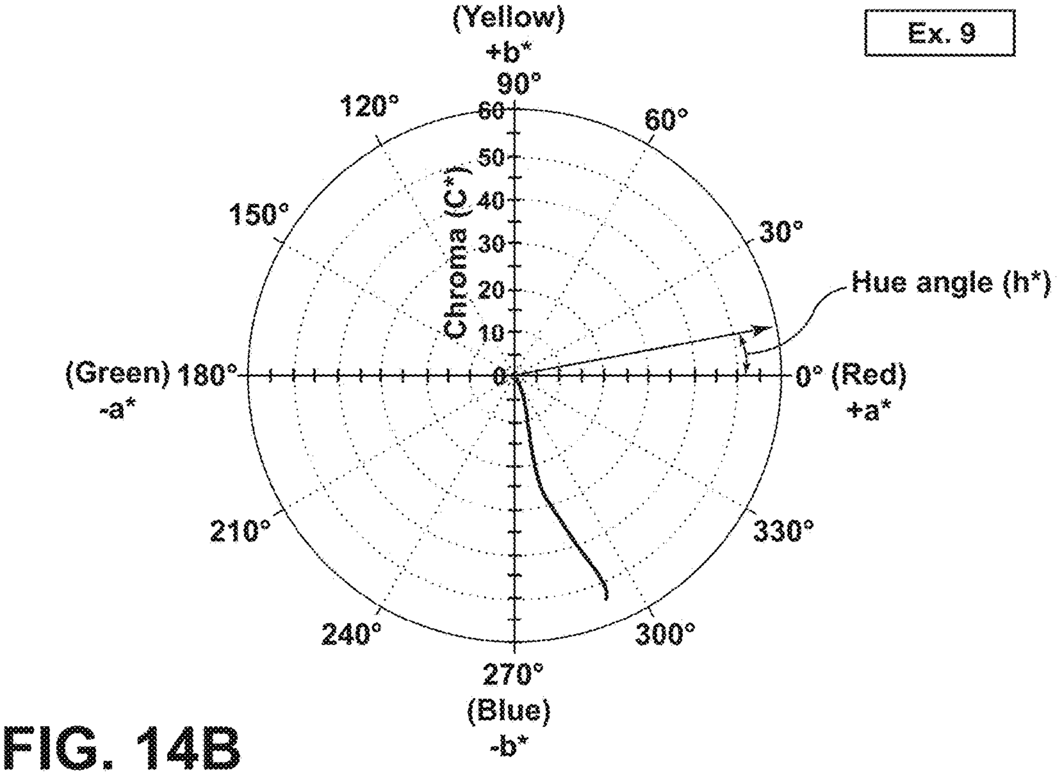
FIG. 14B is a Hue angle (h*) and Chroma (c*) plot over viewing angles from 0° to 90° exhibited by the cover article of FIG. 14A.
Figure 14C:
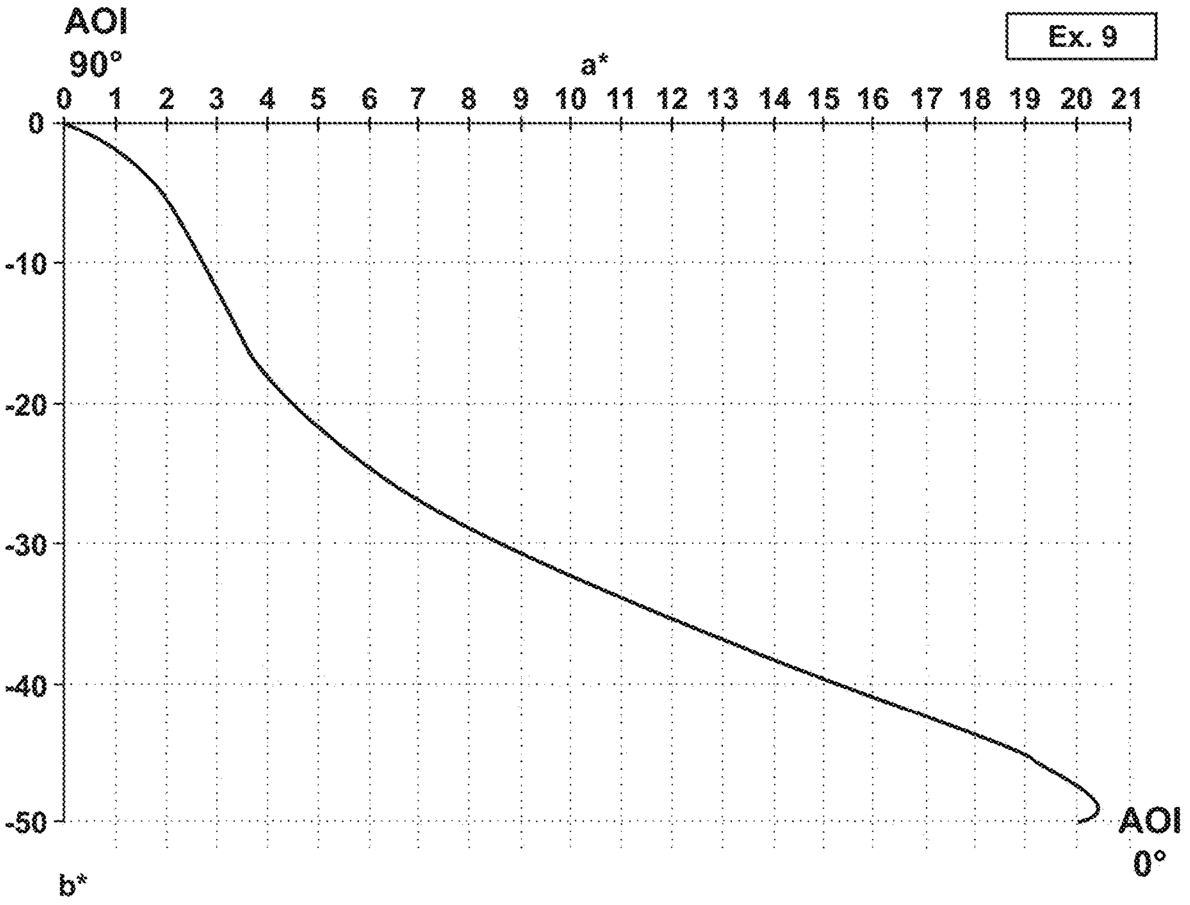
FIG. 14C is a plot of first-surface reflected color (a* and b*) from a D65 illumination source over viewing angles from 0° to 90° exhibited by the cover article of FIG. 14A.

Referring to FIG. 14B, a plot is provided of Hue angle (h*) and Chroma (c*) over viewing angles from 0° to 90° for this example cover article. Further, referring to FIG. 14C, a plot is provided of the first-surface reflected color (a* and b*) from a D65 illumination source over viewing angles from 0° to 90° for this example cover article. As is evident from FIGS. 14B and 14C, this example exhibits a blue or purple color with a Hue Angle (h*) from 200-325°, with little to no change in Hue Angle (h*) over the 0-90° viewing angle range, and a high Chroma (c*) value resulting in high saturation. More specifically, this example exhibits a maximum Chroma (c*) of 53.76; a maximum saturation (s*) of 1.53; a variation in Hue Angle (h*) of 0.34° over a viewing angle range from 0-10°; a variation in Hue Angle (h*) of 1.06° over a viewing angle range from 0-30°; a variation in Hue Angle (h*) of 10.19° over a viewing angle range from 0-60°; and a variation in Hue Angle (h*) of 30.81° over a viewing angle range from 0-90°.

TABLE 12

| Ex. 9, Cover Article | | | | |
|---|---|---|---|---|
| Layer | Material | Refractive Index | Extinction Coefficient | Physical Thickness (nm) |
| | Air | 1 | 0 | |
| 1 | $SiO_2$ | 1.4501 | 0 | 8.00 |
| 2 | $SiO_xN_y$ | 2.04295 | 0.00015 | 163.13 |
| 3 | $SiO_2$ | 1.4501 | 0 | 50.43 |
| 4 | $SiO_xN_y$ | 2.04295 | 0.00015 | 155.24 |
| 5 | $SiO_2$ | 1.4501 | 0 | 48.77 |
| 6 | $SiO_xN_y$ | 2.04295 | 0.00015 | 8.00 |

TABLE 12-continued

| Ex. 9, Cover Article | | | | |
|---|---|---|---|---|
| Layer | Material | Refractive Index | Extinction Coefficient | Physical Thickness (nm) |
| 7 | $SiO_2$ | 1.4501 | 0 | 25.25 |
| 8 | Glass - Corning ® Gorilla ® Glass 3 | 1.50628 | 0 | .33 mm |
| | Air | 1 | 0 | |
| | Total Thickness of Optical Film Structure | | | 458.83 |

Example 9A

A strengthened glass substrate was coated with the optical film structure of Table 13 below, designated Ex. 9A. In particular, the optical film structure of Ex. 9A has a total of 7 layers with a total thickness of 458.83 nm, including alternating high and low refractive index layers, a low RI layer in contact with the substrate (i.e., layer 7 with a thickness of 25.25 nm) and an oxide-containing capping layer at the outermost position of the stack (i.e., layer 1 with a thickness of 8.0 nm). As compared to the cover article of Ex. 9, the cover article in this example (Ex. 9A) possesses a strengthened glass-ceramic substrate, while the optical film structures of these examples remain the same.

Figure 16A:
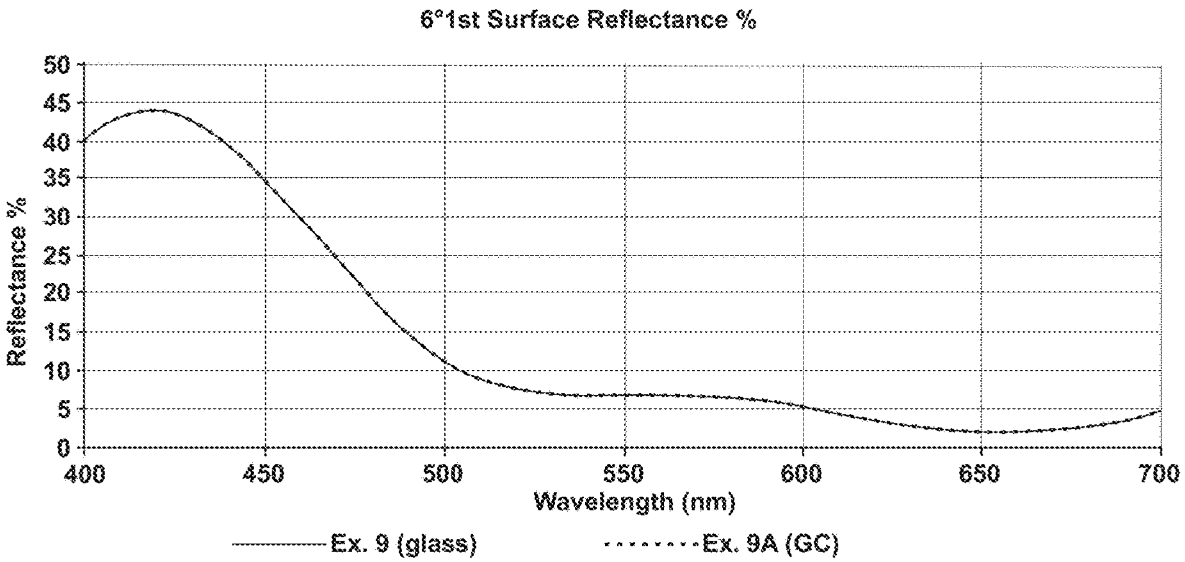
FIG. 16A is a plot of first-surface reflectance over the visible and near-infrared spectrums at a near-normal angle of incidence) (~6° for two cover articles of the disclosure.
Figure 16B:
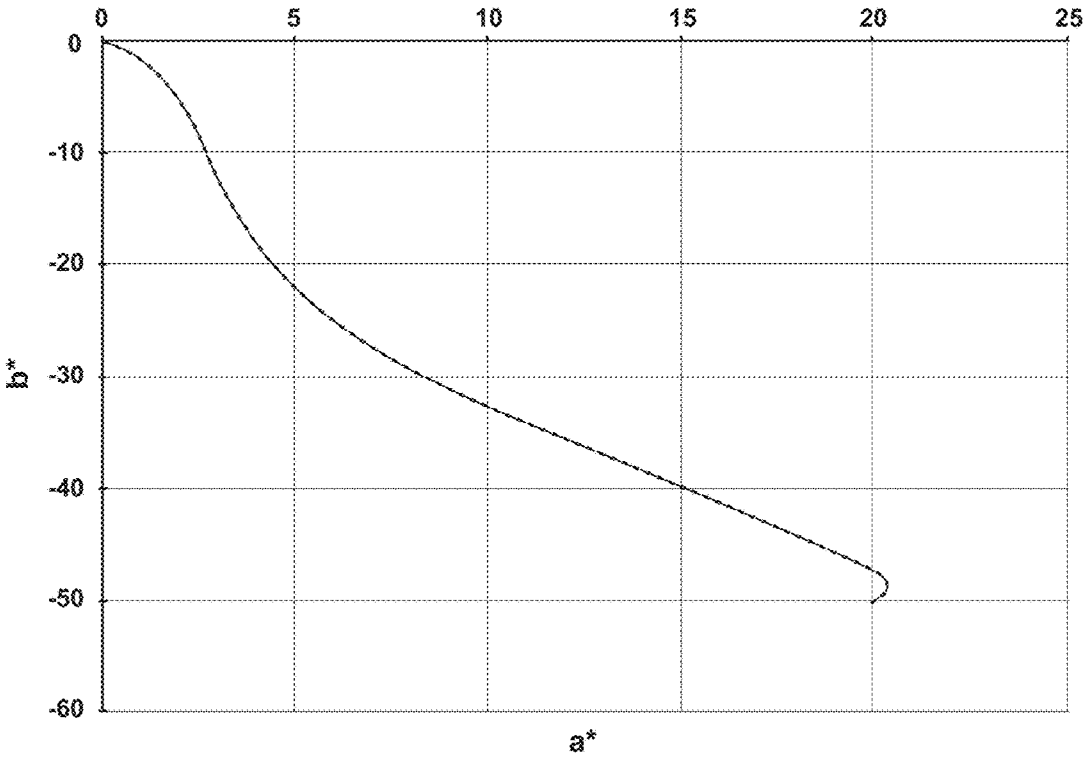
FIG. 16B is a plot of first-surface reflected color (a* and b*) from a D65 illumination source over viewing angles from 0° to 90° exhibited by the cover articles of FIG. 16A.

Referring to FIG. 16A, a plot is provided of first-surface reflectance over the visible and near-infrared spectrums at a near-normal angle of incidence) (~6° for the cover article of this example with a glass-ceramic substrate and the example with a strengthened glass substrate (Ex. 9). Referring to FIG. 16B, a plot is provided of first-surface reflected color (a* and b*) from a D65 illumination source over viewing angles from 0° to 90° exhibited by the two cover articles of this example (i.e., Exs. 9 and 9A). As is evident from FIGS. 16A and 16B, it can be seen that even with the same layer thicknesses of the optical film structure and no further optical tuning that the design performance of this optical film structure design matches almost identically and can easily be applied to glass ceramic substrates.

TABLE 13

| Ex. 9A, Cover Article | | | | |
|---|---|---|---|---|
| Layer | Material | Refractive Index | Extinction Coefficient | Physical Thickness (nm) |
| | Air | 1 | 0 | |
| 1 | $SiO_2$ | 1.4501 | 0 | 8.00 |
| 2 | $SiO_xN_y$ | 2.04295 | 0.00015 | 163.13 |
| 3 | $SiO_2$ | 1.4501 | 0 | 50.43 |
| 4 | $SiO_xN_y$ | 2.04295 | 0.00015 | 155.24 |
| 5 | $SiO_2$ | 1.4501 | 0 | 48.77 |
| 6 | $SiO_xN_y$ | 2.04295 | 0.00015 | 8.00 |
| 7 | $SiO_2$ | 1.4501 | 0 | 25.25 |
| 8 | Glass ceramic substrate | 1.5516 | 0 | .33 mm |
| | Air | 1 | 0 | |
| | Total Thickness of Optical Film Structure | | | 458.83 |

Example 10

A strengthened glass substrate was coated with the optical film structure of Table 14 below, designated Ex. 10. In particular, the optical film structure of Ex. 10 has a total of 7 layers with a total thickness of 679.7 nm, including alternating high and low refractive index layers, a low RI layer in contact with the substrate (i.e., layer 7 with a thickness of 25.0 nm) and an oxide-containing capping layer at the outermost position of the stack (i.e., layer 1 with a thickness of 65.18 nm).

Figure 15A:
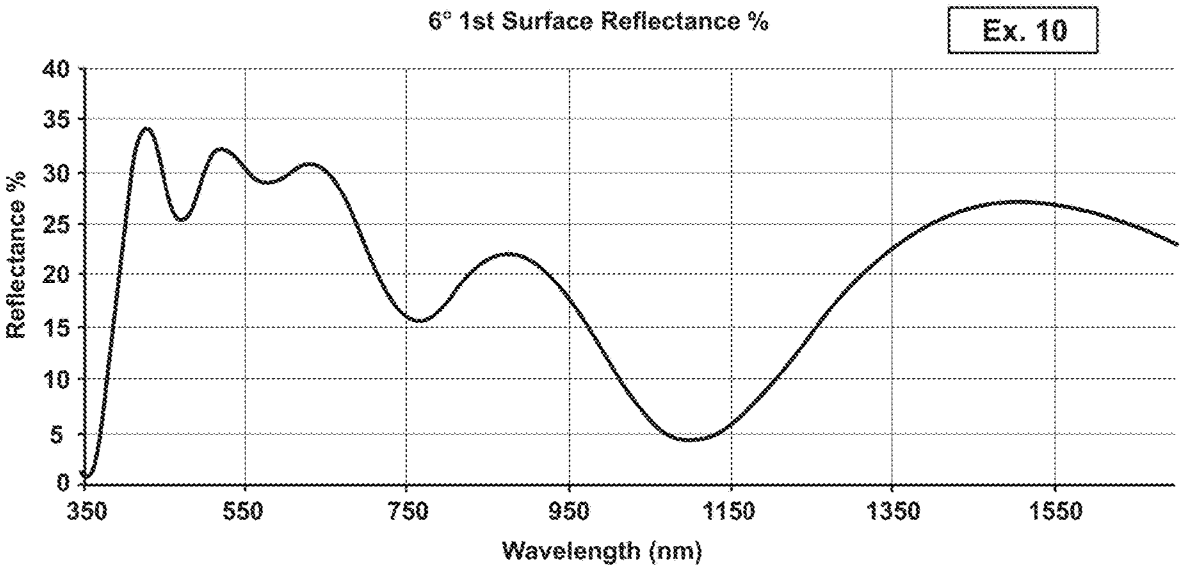
FIG. 15A is a plot of first-surface reflectance over the visible and near-infrared spectrums at a near-normal angle of incidence) (~6° for a cover article of the disclosure.

Referring to FIG. 15A, a plot is provided of first-surface reflectance over the visible and near-infrared spectrums at a near-normal angle of incidence) (~6° for this example cover article. As is evident from the figure, Ex. 10 exhibits an average reflectance across the visible spectrum (400 nm to 700 nm) of 29.28%.

Figure 15B:
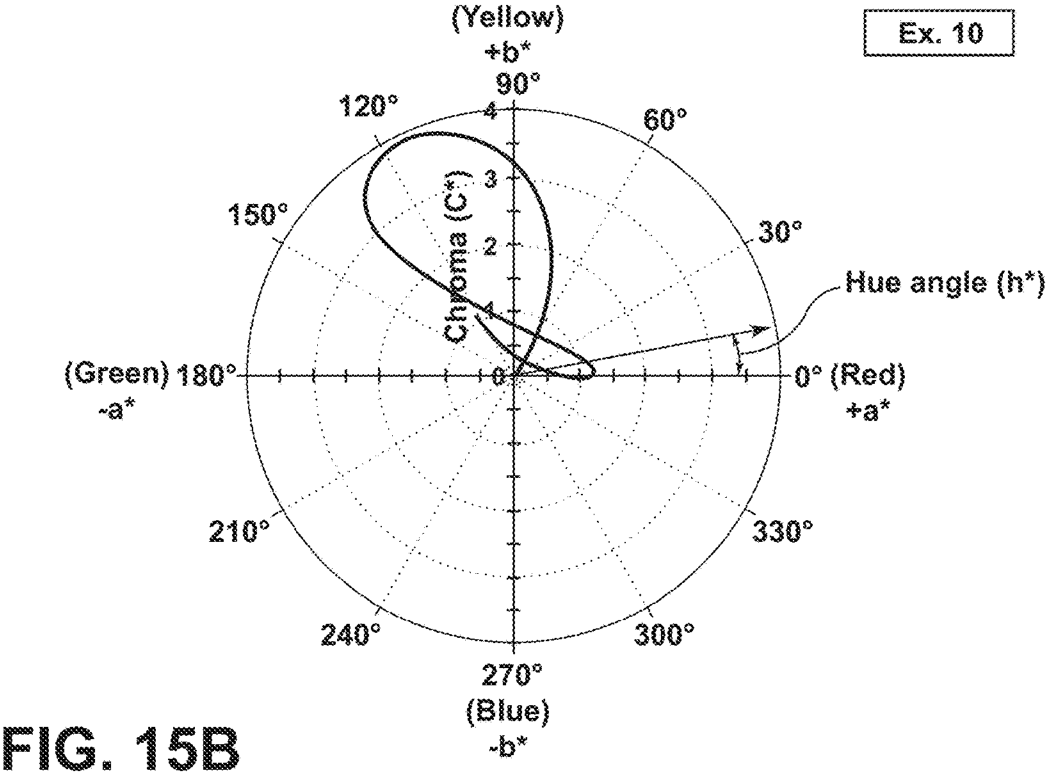
FIG. 15B is a Hue angle (h*) and Chroma (c*) plot over viewing angles from 0° to 90° exhibited by the cover article of FIG. 15A.

Referring to FIG. 15B, a plot is provided of Hue angle (h*) and Chroma (c*) over viewing angles from 0° to 90° for this example cover article. As is evident from FIG. 15B, this example exhibits a grey or silver hue with any Hue Angle (h*) and a max Chroma (c*) of less than 4 over the 0-90° viewing angle range, resulting in low saturation. Notably, the reflected color lies almost entirely on the L* axis which represents the black (0) to white (100) scale. L* values in the middle of this axis range result in a visually perceived silver color. In addition, this example exhibits a maximum Chroma (c*) of 3.89; a maximum saturation (s*) of 0.05; and L* at normal incident of 61.61.

Figure 15C:
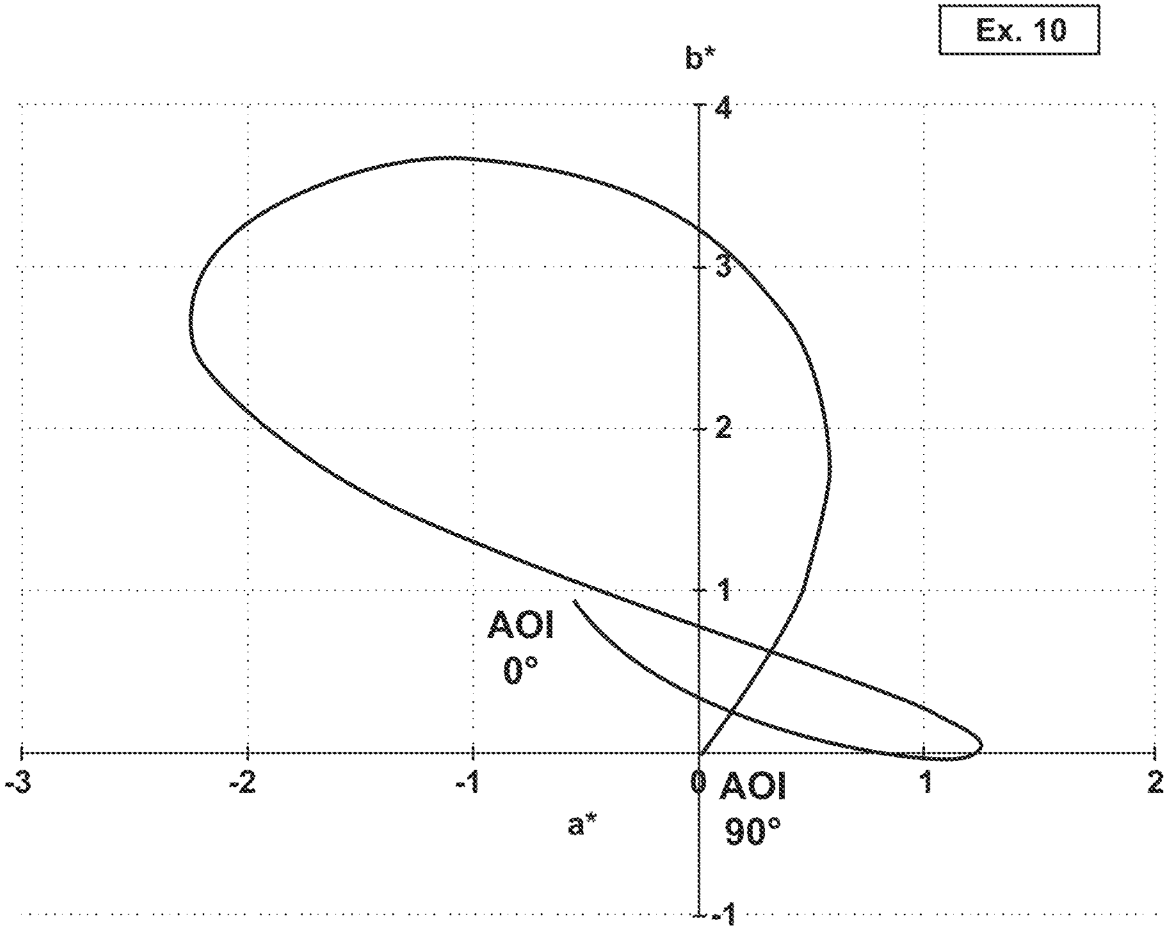
FIG. 15C is a plot of first-surface reflected color (a* and b*) from a D65 illumination source over viewing angles from 0° to 90° exhibited by the cover article of FIG. 15A.

Further, referring to FIG. 15C, a plot is provided of the first-surface reflected color (a* and b*) from a D65 illumination source over viewing angles from 0° to 90° for this example cover article. As is evident from this figure, this design (Ex. 10) shows a* and b* values near the origin at all viewing angles and thus such a low Chroma (c*) (resulting in low saturation) that the reflected color lies almost entirely on the L* axis which represents the black (0) to white (100) scale. L* values in the middle of this axis range result in a visually perceived silver color. Further, the A color a*b* (viewing angle) 0-30°= $\sqrt{(a_{max}^*-a_{min}^*)+(b_{max}^*-b_{min}^*)^2}$=1.52 (very little variation in color) for this example, as evident from FIG. 15C.

TABLE 14

| Ex. 10, Cover Article | | | | |
|---|---|---|---|---|
| Layer | Material | Refractive Index | Extinction Coefficient | Physical Thickness (nm) |
| | Air | 1 | 0 | |
| 1 | $SiO_2$ | 1.4501 | 0 | 65.18 |
| 2 | $SiO_xN_y$ | 2.02562 | 0.00029 | 120.00 |
| 3 | $SiO_2$ | 1.4501 | 0 | 93.58 |
| 4 | $SiO_xN_y$ | 2.02562 | 0.00029 | 63.68 |
| 5 | $SiO_2$ | 1.4501 | 0 | 83.72 |
| 6 | $SiO_xN_y$ | 2.0562 | 0.00029 | 228.54 |
| 7 | $SiO_2$ | 1.4501 | 0 | 25.00 |

TABLE 14-continued

| Ex. 10, Cover Article | | | | |
|---|---|---|---|---|
| Layer | Material | Refractive Index | Extinction Coefficient | Physical Thickness (nm) |
| 8 | Glass - Corning ® Gorilla ® Glass 3 | 1.50694 | 0 | .33 mm |
| | Air | 1 | 0 | |
| | Total Thickness of Optical Film Structure | | | 679.7 |

Summary of Optical and Mechanical Properties of Exs. 1-10

Optical and mechanical properties are summarized below in Tables 15A-15E for Exs. 1-10. Tables 15A-C below show selected reflectance attributes of the cover article and optical film structures of the preceding examples. Of these metrics, some of the most important to note are the normal incidence (0 degree) Chroma (c*) value, the normal incidence Hue Angle (h*) value, and the variation in Hue Angle (h*) ("delta h*") over viewing angle ranges from 0-30, 0-60, and 0-90 degrees. Color metrics listed in Tables 15A-C are for first-surface (surface of substrate with optical film structure) reflectance, unless otherwise noted. Further, unless otherwise noted, all color values are reported using the CIE D65 illuminant.

With further regard to Tables 15A-C below, normal incident color coordinates are provided with max Chroma (c*), Hue Angle (h*), and calculated saturation (s*). Also provided are particularly attractive performance parameters of these designs showing minimal variance in Hue Angle in different ranges of incident viewing angles. In addition, the silver and grey designs (Exs. 5 and 10) have very low max Chroma (c*) values. In contrast to the other color designs (Exs. 1-4 and 6-9), low max Chroma (c*) is of higher importance than Hue Angle (h*) for the designs that target a silver or grey hue.

The top six examples in these tables are cover articles consistent with the designs detailed earlier and depicted in FIG. 1A. The bottom five examples in these tables are cover articles that are consistent with the designs detailed earlier and depicted in FIG. 1B. In addition, the variation in Hue Angle (h*) (also referred to as "reflectance delta hue (h*)" in these tables) for 0-30 degree viewing angles may be less than 15, less than 10, less than 8, less than 6, or even less than 5 degrees. Reflectance delta hue (h*) for 0-60 degree viewing angles may be less than 50, less than 40, less than 30, less than 20, less than 10, or even less than 5 degrees. As-calculated reflectance values are listed in Tables 15A-C for Exs. 1-10; however, the examples with cells denoted as (**) are indicative of a particular parameter that is not relevant to the particular example (e.g., variation/delta of hue angle for neutral grey or silver examples).

TABLE 15A

| Reflectance Properties of Cover Articles (Exs. 1-10) | | | | | | |
|---|---|---|---|---|---|---|
| Example | Peak Reflected Wavelength (nm) 6° AOI | Peak Reflectance (%) @ stated wavelength 6° AOI | Reflectance 0° Photopic Y (%) | Reflectance 0° L* | Reflectance 0° a* | Reflectance 0° b* |
| Ex. 4 - Blue | 435 | 90.2 | 33.07 | 64.22 | −3.95 | −45.49 |
| Ex. 4A - Blue, thin capping | 439 | 90.3 | 36.56 | 66.94 | −1.11 | −40.99 |
| Ex. 3 - Green | 532 | 35.5 | 16.33 | 47.40 | −45.78 | 40.76 |
| Ex. 5 - Silver | ** | Ave (400-700 nm) = 36.06 | 36.39 | 66.8 | 0.95 | −0.69 |
| Ex. 2 - Yellow | 691 | 29.1 | 13.20 | 43.07 | 1.68 | 46.39 |
| Ex. 1 - Pink | 684 | 57.4 | 17.40 | 48.76 | 15.88 | −6.85 |

TABLE 15A-continued

Reflectance Properties of Cover Articles (Exs. 1-10)

| Example | Peak Reflected Wavelength (nm) 6° AOI | Peak Reflectance (%) @ stated wavelength 6° AOI | Reflectance 0° Photopic Y (%) | Reflectance 0° L* | Reflectance 0° a* | Reflectance 0° b* |
|---|---|---|---|---|---|---|
| Ex. 9 - Blue | 418 | 43.9 | 8.56 | 35.12 | 20.00 | −49.9 |
| Ex. 8 - Green | 529 | 30.6 | 19.43 | 51.19 | −34.29 | 24.43 |
| Ex. 10 - Silver | ** | Ave (400-700 nm) = 29.28 | 29.95 | 61.61 | −0.56 | 0.93 |
| Ex. 7 - Yellow | 632 | 11.4 | 8.17 | 34.32 | −2.52 | 39.39 |
| Ex. 6 - Pink | 700 | 11.1 | 2.95 | 19.85 | 20.18 | −6.71 |

TABLE 15B

Reflectance Properties of Cover Articles (Exs. 1-10)

| Example | Reflectance 0° Chroma (c*) (ab) | Reflectance 0° Hue Angle (h*) (ab) (°) | Reflectance Max Chroma (c*) (ab) | Reflectance L* @ Max Chroma (c*) (ab) | Reflectance Max Saturation (s*) (ab) |
|---|---|---|---|---|---|
| Ex. 4 - Blue | 45.76 | −94.95 | 51.13 | 54.97 | 0.93 |
| Ex. 4A - Blue, thin capping | 41.00 | −91.55 | 43.64 | 62.31 | 0.70 |
| Ex. 3 - Green | 61.30 | 138.32 | 62.72 | 46.13 | 1.36 |
| Ex. 5 - Silver | 1.17 | −36.23 | 1.84 | 66.96 | 0.03 |
| Ex. 2 - Yellow | 46.43 | 87.93 | 46.43 | 43.07 | 1.08 |
| Ex. 1 - Pink | 17.29 | −23.34 | 17.29 | 48.76 | 0.35 |
| Ex. 9 - Blue | 53.76 | −68.16 | 53.76 | 35.12 | 1.53 |
| Ex. 8 - Green | 48.59 | 134.88 | 48.59 | 51.19 | 0.95 |
| Ex. 10 - Silver | 1.09 | 120.95 | 3.89 | 72.53 | 0.05 |
| Ex. 7 - Yellow | 39.47 | 93.67 | 39.49 | 34.35 | 1.15 |
| Ex. 6 - Pink | 21.27 | −18.40 | 21.27 | 19.85 | 1.07 |

TABLE 15C

Reflectance Properties of Cover Articles (Exs. 1-10)

| Example | Reflectance delta hue 0-10° AOI (°) | Reflectance delta hue 0-30° AOI (°) | Reflectance delta hue 0-60° AOI (°) | Reflectance delta hue 0-90° AOI (°) | Normal Δ color a*b* (0-30° AOI) |
|---|---|---|---|---|---|
| Ex. 4 Blue | 0.86 | 3.24 | 4.33 | 26.82 | ** |
| Ex. 4A - Blue, thin capping | 0.95 | 3.81 | 3.82 | 12.45 | ** |
| Ex. 3 - Green | 1.67 | 11.4 | 39.13 | 304.15 | ** |
| Ex. 5 - Silver | ** | ** | ** | ** | 0.84 |
| Ex. 2 - Yellow | 0.67 | 3.18 | 3.43 | 5.08 | ** |
| Ex. 1 - Pink | 0.51 | 5.15 | 16.57 | 38.04 | ** |
| Ex. 9 - Blue | 0.34 | 1.06 | 10.19 | 30.81 | ** |
| Ex. 8 - Green | 0.91 | 4.83 | 26.42 | 105.27 | ** |
| Ex. 10 - Silver | ** | ** | ** | ** | 1.52 |
| Ex. 7 - Yellow | 0.12 | 2.84 | 8.21 | 9.30 | ** |
| Ex. 6 - Pink | 2.02 | 6.16 | 6.82 | 16.45 | ** |

Transmittance properties for the cover article examples (Exs. 1-10) are provided below in Table 15D. Normal incident color coordinates are provided with max Chroma (c*), Hue Angle (h*), and calculated saturation (s*). The top six examples in these tables are cover articles consistent with the designs detailed earlier and depicted in FIG. 1A. The bottom five examples in these tables are cover articles that are consistent with the designs detailed earlier and depicted in FIG. 1B. In some applications, such as dead-front display applications, photopic average transmittance (Y) may be greater than 60%, 70%, 80%, or 85%. Transmitted color may in some cases have a Chroma (c*) value that is less than 20, less than 15, less than 10, less than 8, or even less than 5. As-calculated transmittance measurements are listed in Table 15D for Exs. 1-10.

TABLE 15D

Transmittance Properties of Cover Articles (Exs. 1-10)

| Example | Transmittance 0° Photopic Y (%) | Transmittance 0° L* | Transmittance 0° a* | Transmittance 0° b* | Transmittance 0° Chroma (c*) (ab) | Transmittance 0° Hue Angle (h*) (ab) (°) |
|---|---|---|---|---|---|---|
| Ex. 4 - Blue | 63.78 | 83.85 | 1.83 | 58.10 | 58.12 | 88.19 |
| Ex. 4A - Blue, thin capping | 60.46 | 82.09 | 0.15 | 55.25 | 55.25 | 89.84 |
| Ex. 3 - Green | 79.90 | 91.64 | 12.17 | −7.44 | 14.26 | −31.44 |
| Ex. 5 - Silver | 60.69 | 82.21 | −1.05 | 2.07 | 2.32 | 116.99 |
| Ex. 2 - Yellow | 82.96 | 93.00 | −0.75 | −6.67 | 6.71 | −96.41 |
| Ex. 1 - Pink | 78.75 | 91.12 | −6.40 | 4.25 | 7.68 | 146.43 |
| Ex. 9 - Blue | 87.57 | 94.98 | −4.51 | 19.11 | 19.64 | 103.27 |
| Ex. 8 - Green | 77.11 | 90.37 | 11.23 | −8.67 | 14.19 | −37.67 |
| Ex. 10 - Silver | 66.86 | 85.43 | 0.23 | 0.08 | 0.24 | 19.32 |
| Ex. 7 - Yellow | 87.71 | 95.04 | 0.38 | −3.95 | 3.97 | −84.53 |
| Ex. 6 - Pink | 92.93 | 97.20 | −2.28 | 1.14 | 2.55 | 153.56 |

Mechanical properties for the cover article examples (Exs. 1-10) are provided below in Table 15E. The cover article designs consistent with those depicted in FIG. 1A (Exs. 1-5) use a layer configuration that includes a 2000 nm scratch resistant layer at the top of the optical film structure which aids these articles in exhibiting their overall high hardness value. The cover article designs consistent with those depicted in FIG. 1B (Exs. 6-10) use a layer configuration where the high index layers collectively act as the scratch resistant layer and comprise >50% of the overall volume or thickness of the optical film structure stack. Further, the optical film structures of these designs have an outermost high index hard layer maintaining a thickness greater than the outermost low index layer which also assists these articles in exhibiting their overall high hardness value. Completed hardness measurements are listed in Table 15E (right-most column), and the examples with cells denoted as (**) do not have completed hardness measurements. Other columns in Table 15E denote structural parameters of the particular examples that are modeled (e.g., total thickness of optical film structure, nm; % high RI material, etc.).

TABLE 15E

Mechanical Properties of Cover Articles (Exs. 1-10)

| Example | Cover Article Design | # Layers in Optical Film Structure | Total thickness of Optical Film Structure (nm) | % high RI material ($SiO_xN_y$) | Max Measured Berkovich Hardness (GPa) |
|---|---|---|---|---|---|
| Ex. 4 - Blue | FIG. 1A | 17 | 2884 | ** | ~16 |
| Ex. 4A - Blue, thin capping | FIG. 1A | 17 | 2784 | ** | ** |
| Ex. 3 - Green | FIG. 1A | 17 | 3213 | ** | 19.38 |
| Ex. 5 - Silver | FIG. 1A | 13 | 2686 | ** | 21.07 |
| Ex. 2 - Yellow | FIG. 1A | 9 | 2685 | ** | 18.73 |
| Ex. 1 - Pink | FIG. 1A | 13 | 3584 | ** | 18.5 |
| Ex. 9 - Blue | FIG. 1B | 7 | 459 | 71.1 | ** |
| Ex. 8 - Green | FIG. 1B | 7 | 687 | 64.5 | ** |
| Ex. 10 - Silver | FIG. 1B | 7 | 680 | 60.6 | ** |
| Ex. 7 - Yellow | FIG. 1B | 5 | 637 | 76.2 | ** |
| Ex. 6 - Pink | FIG. 1B | 7 | 624 | 56.2 | ** |

The various features described in the specification may be combined in any and all combinations, for example, as listed in the following embodiments. It should also be appreciated that in the above embodiments, if desired, the B-side (i.e., the inner primary surface 114) of the substrate 110 may comprise a surface treatment to provide additional, desired appearance(s). For example, these surface treatments can include as-engineered surface roughness levels, additional dielectric layer(s) and/or ink layer(s).

Embodiment 1. A cover article is provided that includes: a substrate comprising an outer primary surface and an inner primary surface, the outer and inner primary surfaces are opposite of one another; and an optical film structure comprising an outermost surface disposed on the outer or inner primary surface of the substrate. The optical film structure comprises a plurality of alternating high refractive index and low refractive index layers. Each of the high refractive index layers has a refractive index greater than a refractive index of each of the low refractive index layers. Further, the cover article exhibits a substantially constant hue in reflectance with a D65 illuminant, as given by an exhibited color with a variation in Hue Angle (h*) of less than 50 degrees over a viewing angle range from 0 to 60 degrees.

Embodiment 2. The cover article of Embodiment 1 is provided, wherein the cover article exhibits a substantially constant hue in reflectance with a D65 illuminant, as given by an exhibited color with a variation in Hue Angle (h*) of less than 225 degrees over a viewing angle range from 0 to 90 degrees.

Embodiment 3. The cover article of Embodiment 1 or Embodiment 2 is provided, wherein the cover article exhibits a substantially constant hue in reflectance with a D65 illuminant, as given by an exhibited color with a variation in Hue Angle (h*) of less than 15 over a viewing angle range from 0 to 30 degrees.

Embodiment 4. The cover article of any one of Embodiments 1-3 is provided, wherein the cover article exhibits an average photopic transmittance of greater than 60% at a normal viewing angle of about 0 degrees.

Embodiment 5. The cover article of any one of Embodiments 1-4 is provided, wherein the cover article exhibits a substantially constant hue in reflectance with a D65 illuminant, as given by an exhibited pink or red color with a Hue angle (h*) of from 320 degrees to 40 degrees and a Chroma (c*) of greater than 15.

Embodiment 6. The cover article of any one of Embodiments 1-4 is provided, wherein the cover article exhibits a substantially constant hue in reflectance with a D65 illuminant, as given by an exhibited yellow color with a Hue angle (h*) of from 40 degrees to 135 degrees and a Chroma (c*) of greater than 15.

Embodiment 7. The cover article of any one of Embodiments 1-4 is provided, wherein the cover article exhibits a substantially constant hue in reflectance with a D65 illuminant, as given by an exhibited green color with a Hue angle (h*) of from 135 degrees to 200 degrees and a Chroma (c*) of greater than 15.

Embodiment 8. The cover article of any one of Embodiments 1-4 is provided, wherein the cover article exhibits a substantially constant hue in reflectance with a D65 illuminant, as given by an exhibited blue or purple color with a Hue angle (h*) of from 200 degrees to 320 degrees and a Chroma (c*) of greater than 15.

Embodiment 9. A cover article is provided that includes: a substrate comprising an outer primary surface and an inner primary surface, wherein the outer and inner primary surfaces are opposite of one another; and an optical film structure comprising an outermost surface disposed on the outer or inner primary surface of the substrate. The optical film structure comprises a plurality of alternating high refractive index and low refractive index layers. Each of the high refractive index layers has a refractive index greater than a refractive index of each of the low refractive index layers. The optical film structure has a physical thickness that ranges from 1000 nm to 4000 nm. One of the high refractive index layers is a scratch resistant layer having a physical thickness from 500 nm to 3000 nm. One of the low refractive index layers is a capping layer disposed over the scratch resistant layer. A portion of the plurality of alternating high refractive index and low refractive index layers is between the scratch resistant layer and the substrate. The optical film structure exhibits a hardness of at least 12 GPa, as measured with a Berkovich Indenter Hardness Test from the outermost surface of the optical film structure to a depth from about 100 nm to about 300 nm. Further, the cover article exhibits a substantially constant hue in reflectance with a D65 illuminant, as given by an exhibited color with a variation in Hue Angle (h*) of less than 50 degrees over a viewing angle range from 0 to 60 degrees.

Embodiment 10. The cover article of Embodiment 9 is provided, wherein the cover article exhibits a substantially constant hue in reflectance with a D65 illuminant, as given by an exhibited color with a variation in Hue Angle (h*) of less than 20 degrees over a viewing angle range from 0 to 60 degrees.

Embodiment 11. The cover article of Embodiment 10 is provided, wherein the scratch resistant layer is a nitride or an oxyntride and has a physical thickness from 800 nm to 2500 nm, and wherein the capping layer is an oxide.

Embodiment 12. The cover article of any one of Embodiments 9-11 is provided, wherein the capping layer is in contact with the scratch resistant layer, is the outermost layer of the optical film structure, and has a physical thickness of from 20 nm to 250 nm.

Embodiment 13. The cover article of any one of Embodiments 9-11 is provided, wherein the capping layer is the only layer over the scratch resistant layer with a physical thickness of greater than 20 nm.

Embodiment 14. The cover article of any one of Embodiments 9-13 is provided, wherein one of the low refractive index layers is in contact with the outer or inner primary surface of the substrate, and the optical film structure comprises 5 to 19 layers.

Embodiment 15. The cover article of any one of Embodiments 9-14 is provided, wherein the cover article exhibits a substantially constant hue in reflectance with a D65 illuminant, as given by an exhibited pink or red color with a Hue angle (h*) of from 320 degrees to 40 degrees and a Chroma (c*) of greater than 15.

Embodiment 16. The cover article of any one of Embodiments 9-14 is provided, wherein the cover article exhibits a substantially constant hue in reflectance with a D65 illuminant, as given by an exhibited yellow color with a Hue angle (h*) of from 40 degrees to 135 degrees and a Chroma (c*) of greater than 15.

Embodiment 17. The cover article of any one of Embodiments 9-14 is provided, wherein the cover article exhibits a substantially constant hue in reflectance with a D65 illuminant, as given by an exhibited green color with a Hue angle (h*) of from 135 degrees to 200 degrees and a Chroma (c*) of greater than 15.

Embodiment 18. The cover article of any one of Embodiments 9-14 is provided, wherein the cover article exhibits a substantially constant hue in reflectance with a D65 illuminant, as given by an exhibited blue or purple color with a Hue angle (h*) of from 200 degrees to 320 degrees and a Chroma (c*) of greater than 15.

Embodiment 19. A cover article is provided that includes: a substrate comprising an outer primary surface and an inner primary surface, wherein the outer and inner primary surfaces are opposite of one another; and an optical film structure comprising an outermost surface disposed on the outer or inner primary surface of the substrate. The optical film structure comprises a plurality of alternating high refractive index and low refractive index layers. Each of the high refractive index layers has a refractive index greater than a refractive index of each of the low refractive index layers. The optical film structure has a physical thickness that ranges from 250 nm to 1000 nm. The optical film structure exhibits a hardness of at least 8 GPa, as measured with a Berkovich Indenter Hardness Test from the outermost surface of the optical film structure to a depth from about 100 nm to about 300 nm. Further, the cover article exhibits a substantially constant hue in reflectance with a D65 illuminant, as given by an exhibited color with a variation in Hue Angle (h*) of less than 50 degrees over a viewing angle range from 0 to 60 degrees.

Embodiment 20. The cover article of Embodiment 19 is provided, wherein each of the high refractive index layers is a nitride or an oxyntride and the low refractive index layers is an oxide.

Embodiment 21. The cover article of Embodiment 19 or Embodiment 20 is provided, wherein one of the low refractive index layers is in contact with the outer or inner primary surface of the substrate, and the optical film structure comprises 5 to 12 layers.

Embodiment 22. The cover article of any one of Embodiments 19-21 is provided, wherein the high refractive index layers collectively comprise greater than 50% of the volume or physical thickness of the optical film structure.

Embodiment 23. The cover article of any one of Embodiments 19-22 is provided, wherein the cover article exhibits a substantially constant hue in reflectance with a D65 illuminant, as given by an exhibited pink or red color with a Hue angle (h*) of from 320 degrees to 40 degrees and a Chroma (c*) of greater than 15.

Embodiment 24. The cover article of any one of Embodiments 19-22 is provided, wherein the cover article exhibits a substantially constant hue in reflectance with a D65 illuminant, as given by an exhibited yellow color with a Hue angle (h*) of from 40 degrees to 135 degrees and a Chroma (c*) of greater than 15.

Embodiment 25. The cover article of any one of Embodiments 19-22 is provided, wherein the cover article exhibits a substantially constant hue in reflectance with a D65 illuminant, as given by an exhibited green color with a Hue angle (h*) of from 135 degrees to 200 degrees and a Chroma (c*) of greater than 15.

Embodiment 26. The cover article of any one of Embodiments 19-22 is provided, wherein the cover article exhibits a substantially constant hue in reflectance with a D65 illuminant, as given by an exhibited blue or purple color with a Hue angle (h*) of from 200 degrees to 320 degrees and a Chroma (c*) of greater than 15.

Embodiment 27. A cover article is provided that includes: a substrate comprising an outer primary surface and an inner primary surface, wherein the outer and inner primary surfaces are opposite of one another; and an optical film structure comprising an outermost surface disposed on the outer or inner primary surface of the substrate. The optical film structure comprises a plurality of alternating high refractive index and low refractive index layers. Each of the high refractive index layers has a refractive index greater than a refractive index of each of the low refractive index layers. Further, the cover article exhibits a substantially neutral color in reflectance with a D65 illuminant, as given by an exhibited grey hue or silver hue, each with a Chroma (c*) of less than 10.

Embodiment 28. The cover article of Embodiment 27 is provided, the cover article exhibits a substantially neutral color in reflectance with a D65 illuminant, as given by an exhibited grey hue or silver hue, each with a Chroma (c*) of less than 5.

Embodiment 29. The cover article of any one of Embodiments 26-27 is provided, wherein the optical film structure has a physical thickness that ranges from 1000 nm to 4000 nm, one of the high refractive index layers is a scratch resistant layer having a physical thickness from 500 nm to 3000 nm, one of the low refractive index layers is a capping layer disposed over the scratch resistant layer, a portion of the plurality of alternating high refractive index and low refractive index layers is between the scratch resistant layer and the substrate, and the optical film structure exhibits a hardness of at least 12 GPa, as measured with a Berkovich Indenter Hardness Test from the outermost surface of the optical film structure to a depth from about 100 nm to about 300 nm.

Embodiment 30. The cover article of any one of Embodiments 26-27 is provided, wherein the optical film structure has a physical thickness that ranges from 250 nm to 1000 nm, and the optical film structure exhibits a hardness of at least 8 GPa, as measured with a Berkovich Indenter Hardness Test from the outermost surface of the optical film structure to a depth from about 100 nm to about 300 nm.

What is claimed is:

1. A cover article, comprising:

a substrate comprising an outer primary surface and an inner primary surface, wherein the outer and inner primary surfaces are opposite of one another; and an optical film structure comprising an outermost surface disposed on the outer or inner primary surface of the substrate, wherein the optical film structure comprises a plurality of alternating high refractive index and low refractive index layers, wherein each of the high refractive index layers has a refractive index greater than a refractive index of each of the low refractive index layers, and wherein the cover article exhibits a substantially constant hue in reflectance with a D65 illuminant, as given by an exhibited color with a variation in Hue Angle (h*) of less than 50 degrees over a viewing angle range from 0 to 60 degrees, and wherein the cover article exhibits a substantially constant hue in reflectance with a D65 illuminant, as given by an exhibited pink or red color with a Hue angle (h*) of from 320 degrees to 40 degrees and a Chroma (c*) of greater than 15.

2. The cover article of claim 1, wherein the cover article exhibits a substantially constant hue in reflectance with a D65 illuminant, as given by an exhibited color with a variation in Hue Angle (h*) of less than 225 degrees over a viewing angle range from 0 to 90 degrees.

3. The cover article of claim 1, wherein the cover article exhibits a substantially constant hue in reflectance with a D65 illuminant, as given by an exhibited color with a variation in Hue Angle (h*) of less than 15 over a viewing angle range from 0 to 30 degrees.

4. The cover article of claim 1, wherein the cover article exhibits an average photopic transmittance of greater than 60% at a normal viewing angle of about 0 degrees.

5. A cover article, comprising:

a substrate comprising an outer primary surface and an inner primary surface, wherein the outer and inner primary surfaces are opposite of one another; and an optical film structure comprising an outermost surface disposed on the outer or inner primary surface of the substrate, wherein the optical film structure comprises a plurality of alternating high refractive index and low refractive index layers, wherein each of the high refractive index layers has a refractive index greater than a refractive index of each of the low refractive index layers, wherein the cover article exhibits a substantially constant hue in reflectance with a D65 illuminant, as given by an exhibited color with a variation in Hue Angle (h*) of less than 50 degrees over a viewing angle range from 0 to 60 degrees, and wherein the cover article exhibits a substantially constant hue in reflectance with a D65 illuminant, as given by an exhibited yellow color with a Hue angle (h*) of from 40 degrees to 135 degrees and a Chroma (c*) of greater than 15.

6. A cover article, comprising:

a substrate comprising an outer primary surface and an inner primary surface, wherein the outer and inner primary surfaces are opposite of one another; and an optical film structure comprising an outermost surface disposed on the outer or inner primary surface of the substrate, wherein the optical film structure comprises a plurality of alternating high refractive index and low refractive index layers, wherein each of the high refractive index layers has a refractive index greater than a refractive index of each of the low refractive index layers, wherein the cover article exhibits a substantially constant hue in reflectance with a D65 illuminant, as given by an exhibited color with a variation in Hue Angle (h*) of less than 50 degrees over a viewing angle range from 0 to 60 degrees, and wherein the cover article exhibits a substantially constant hue in reflectance with a D65 illuminant, as given by an exhibited green color with a Hue angle (h*) of from 135 degrees to 200 degrees and a Chroma (c*) of greater than 15.

7. A cover article, comprising:

a substrate comprising an outer primary surface and an inner primary surface, wherein the outer and inner primary surfaces are opposite of one another; and an optical film structure comprising an outermost surface disposed on the outer or inner primary surface of the substrate, wherein the optical film structure comprises a plurality of alternating high refractive index and low refractive index layers, wherein each of the high refractive index layers has a refractive index greater than a refractive index of each of the low refractive index layers, wherein the cover article exhibits a substantially constant hue in reflectance with a D65 illuminant, as given by an exhibited color with a variation in Hue Angle (h*) of less than 50 degrees over a viewing angle range from 0 to 60 degrees, and wherein the cover article exhibits a substantially constant hue in reflectance with a D65 illuminant, as given by an exhibited blue or purple color with a Hue angle (h*) of from 200 degrees to 320 degrees and a Chroma (c*) of greater than 15.

8. A cover article, comprising:

a substrate comprising an outer primary surface and an inner primary surface, wherein the outer and inner primary surfaces are opposite of one another; and an optical film structure comprising an outermost surface disposed on the outer or inner primary surface of the substrate, wherein the optical film structure comprises a plurality of alternating high refractive index and low refractive index layers, wherein each of the high refractive index layers has a refractive index greater than a refractive index of each of the low refractive index layers, wherein the optical film structure has a physical thickness that ranges from 1000 nm to 4000 nm, wherein one of the high refractive index layers is a scratch resistant layer having a physical thickness from 500 nm to 3000 nm, wherein one of the low refractive index layers is a capping layer disposed over the scratch resistant layer, wherein a portion of the plurality of alternating high refractive index and low refractive index layers is between the scratch resistant layer and the substrate, wherein the optical film structure exhibits a hardness of at least 12 GPa, as measured with a Berkovich Indenter Hardness Test from the outermost surface of the optical film structure to a depth from about 100 nm to about 300 nm, wherein the cover article exhibits a substantially constant hue in reflectance with a D65 illuminant, as given by an exhibited color with a variation in Hue Angle (h*) of less than 50 degrees over a viewing angle range from 0 to 60 degrees, and wherein the cover article exhibits one of the following:

a substantially constant hue in reflectance with a D65 illuminant, as given by an exhibited pink or red color with a Hue angle (h*) of from 320 degrees to 40 degrees and a Chroma (c*) of greater than 15, a substantially constant hue in reflectance with a D65 illuminant, as given by an exhibited yellow color with a Hue angle (h*) of from 40 degrees to 135 degrees and a Chroma (c*) of greater than 15, a substantially constant hue in reflectance with a D65 illuminant, as given by an exhibited green color with a Hue angle (h*) of from 135 degrees to 200 degrees and a Chroma (c*) of greater than 15, and a substantially constant hue in reflectance with a D65 illuminant, as given by an exhibited blue or purple color with a Hue angle (h*) of from 200 degrees to 320 degrees and a Chroma (c*) of greater than 15.

9. The cover article of claim 8, wherein the cover article exhibits a substantially constant hue in reflectance with a D65 illuminant, as given by an exhibited color with a variation in Hue Angle (h*) of less than 20 degrees over a viewing angle range from 0 to 60 degrees.

10. The cover article of claim 8, wherein the scratch resistant layer is a nitride or an oxynitride and has a physical thickness from 800 nm to 2500 nm, and wherein the capping layer is an oxide.

11. The cover article of claim 8, wherein the capping layer is in contact with the scratch resistant layer, is the outermost layer of the optical film structure, and has a physical thickness of from 20 nm to 250 nm.

12. The cover article of claim 8, wherein the capping layer is the only layer over the scratch resistant layer with a physical thickness of greater than 20 nm.

13. The cover article of claim 8, wherein one of the low refractive index layers is in contact with the outer or inner primary surface of the substrate, and the optical film structure comprises 5 to 19 layers.

14. A cover article, comprising:

a substrate comprising an outer primary surface and an inner primary surface, wherein the outer and inner primary surfaces are opposite of one another; and an optical film structure comprising an outermost surface disposed on the outer or inner primary surface of the substrate, wherein the optical film structure comprises a plurality of alternating high refractive index and low refractive index layers, wherein each of the high refractive index layers has a refractive index greater than a refractive index of each of the low refractive index layers, wherein the optical film structure has a physical thickness that ranges from 250 nm to 1000 nm, wherein the optical film structure exhibits a hardness of at least 8 GPa, as measured with a Berkovich Indenter Hardness Test from the outermost surface of the optical film structure to a depth from about 100 nm to about 300 nm, wherein the cover article exhibits a substantially constant hue in reflectance with a D65 illuminant, as given by an exhibited color with a variation in Hue Angle (h*) of less than 50 degrees over a viewing angle range from 0 to 60 degrees, and wherein the cover article exhibits one of the following:

a substantially constant hue in reflectance with a D65 illuminant, as given by an exhibited pink or red color with a Hue angle (h*) of from 320 degrees to 40 degrees and a Chroma (c*) of greater than 15, a substantially constant hue in reflectance with a D65 illuminant, as given by an exhibited yellow color with a Hue angle (h*) of from 40 degrees to 135 degrees and a Chroma (c*) of greater than 15, a substantially constant hue in reflectance with a D65 illuminant, as given by an exhibited green color with a Hue angle (h*) of from 135 degrees to 200 degrees and a Chroma (c*) of greater than 15, and a substantially constant hue in reflectance with a D65 illuminant, as given by an exhibited blue or purple color with a Hue angle (h*) of from 200 degrees to 320 degrees and a Chroma (c*) of greater than 15.

15. The cover article of claim 14, wherein each of the high refractive index layers is a nitride or an oxynitride and the low refractive index layers is an oxide.

16. The cover article of claim 14, wherein one of the low refractive index layers is in contact with the outer or inner primary surface of the substrate, and the optical film structure comprises 5 to 12 layers.

17. The cover article of claim 14, wherein the high refractive index layers collectively comprise greater than 50% of the volume or physical thickness of the optical film structure.

* * * * *